(12) United States Patent
Phillips

(10) Patent No.: US 6,370,459 B1
(45) Date of Patent: Apr. 9, 2002

(54) FEEDBACK AND SERVO CONTROL FOR ELECTRIC POWER STEERING SYSTEMS

(75) Inventor: Edward H. Phillips, Troy, MI (US)

(73) Assignee: Techco Corporation, Southfield, MI (US)

( * ) Notice: Subject to any disclaimer, the term of this patent is extended or adjusted under 35 U.S.C. 154(b) by 0 days.

(21) Appl. No.: 09/744,062

(22) PCT Filed: Jul. 21, 1999

(86) PCT No.: PCT/US99/16407

§ 371 Date: Jan. 18, 2001

§ 102(e) Date: Jan. 18, 2001

(87) PCT Pub. No.: WO00/05124

PCT Pub. Date: Feb. 3, 2000

Related U.S. Application Data
(60) Provisional application No. 60/093,557, filed on Jul. 21, 1998.

(51) Int. Cl.[7] .................................................. B62D 5/04
(52) U.S. Cl. ........................... 701/41; 701/42; 180/443; 180/446
(58) Field of Search ...................... 701/41, 42; 180/412, 180/413, 422, 443, 444, 446, 447

(56) References Cited

U.S. PATENT DOCUMENTS

| | | | |
|---|---|---|---|
| 4,509,611 A | | 4/1985 | Kade et al. |
| 4,653,601 A | | 3/1987 | Nakamura et al. |
| 4,715,461 A | | 12/1987 | Shimizu |
| 4,724,810 A | | 2/1988 | Poirier et al. |
| 4,753,310 A | | 6/1988 | Hashimoto |
| 4,757,869 A | * | 7/1988 | Morishita et al. ............. 701/41 |
| 4,828,065 A | | 5/1989 | Ishihara et al. |
| 4,855,655 A | | 8/1989 | Shimizu |
| 4,926,956 A | | 5/1990 | Duffy |
| 4,946,001 A | * | 8/1990 | Taniguchi et al. ............ 701/41 |
| 5,029,660 A | | 7/1991 | Raad et al. |
| 5,076,381 A | | 12/1991 | Daido et al. |
| 5,151,860 A | | 9/1992 | Taniguchi et al. |
| 5,198,981 A | | 3/1993 | Collier-Hallman et al. |
| 5,202,830 A | | 4/1993 | Tsurumiya et al. |
| 5,224,564 A | | 7/1993 | Duffy |
| 5,257,828 A | | 11/1993 | Miller et al. |
| 5,259,473 A | | 11/1993 | Nishimoto |
| 5,307,892 A | | 5/1994 | Phillips |
| 5,473,539 A | * | 12/1995 | Shimizu et al. ............... 701/41 |
| 5,659,473 A | * | 8/1997 | Noro et al. .................. 180/422 |
| 5,732,373 A | * | 3/1998 | Endo ........................... 701/41 |

FOREIGN PATENT DOCUMENTS

| | | |
|---|---|---|
| JP | 4 353189 | 5/1991 |
| JP | 05 244652 | 2/1992 |
| JP | 5 279706 | 4/1992 |

\* cited by examiner

*Primary Examiner*—Gary Chin
(74) *Attorney, Agent, or Firm*—Gifford, Krass, Groh, Sprinkle, Anderson & Citkowski, P.C.

(57) ABSTRACT

Vehicle power steering systems (710, 760, 810 and 910) achieve substantially linear control relationships between and applied steering torque input Ts and a resulting steering force output, that is, a powered assist to vehicle steering. Impedance matching means utilized for coupling an electric motor (26) to the steering load respectively include speed reduction means (712), torque summing means (812) and force generating means (912) in the systems (710, 760, 810 and 910). The speed reduction means (712) comprises gear reduction means (722) and a supplemental pinion. The torque summing means (812) comprises steering column (814) coupled gear reduction means (822), and, the force generating means (912) comprises hydraulic transmission means including a power cylinder (18). The systems (710, 760, 810 and 910) are preferably regenerative. The systems (710, 716, 810 and 910) each utilize internal closed-loop servo control of the electric motor (26) to substantially eliminate stability control problems including, for example, a low frequency stability control problem which has typically not been overcome in prior EPS systems.

4 Claims, 26 Drawing Sheets

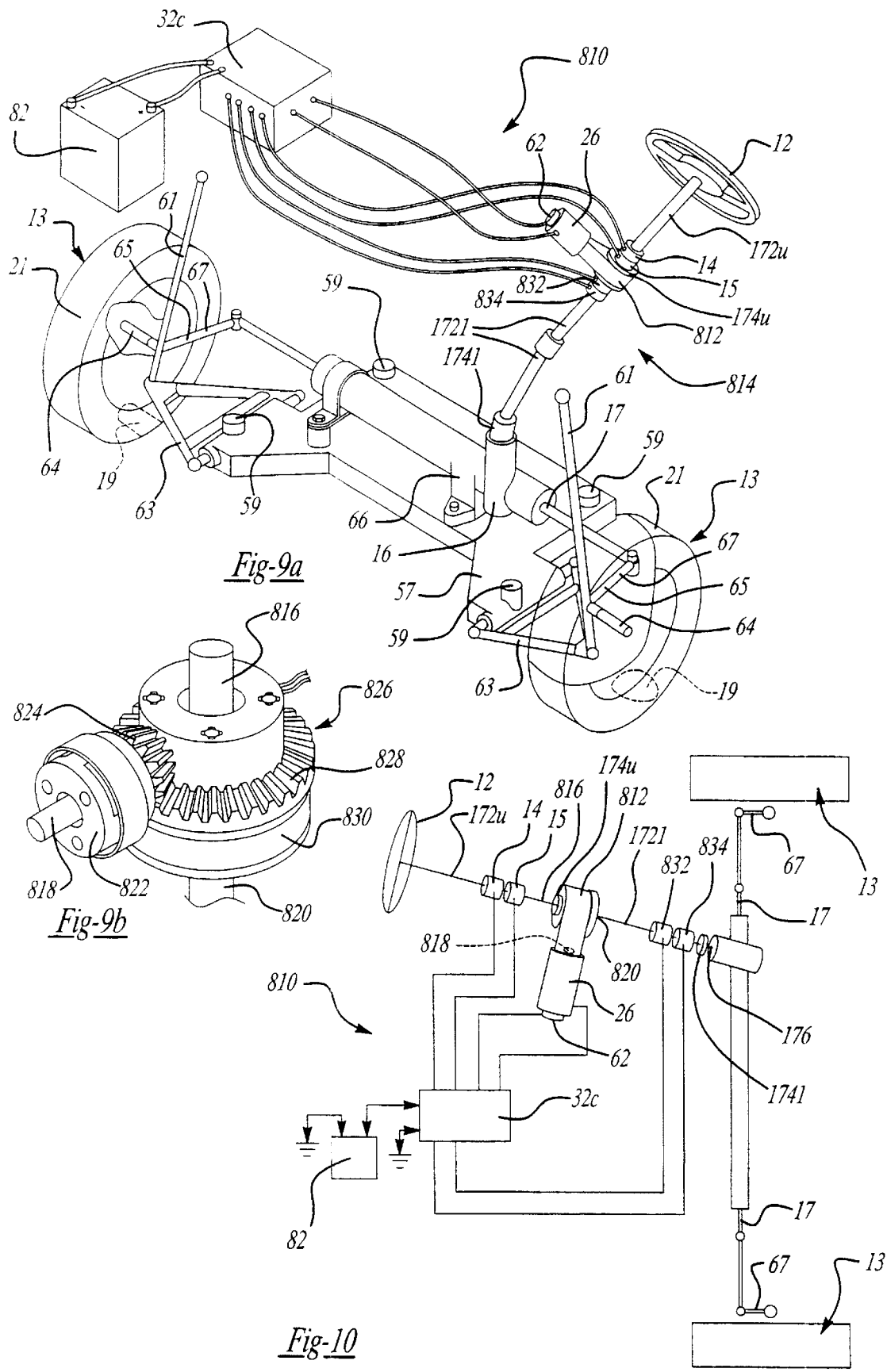

FEEDBACK AND SERVO CONTROL FOR ELECTRIC POWER STEERING SYSTEMS

This application claims benefit of Provisional Application Ser. No. 60/093,557 filed Jul. 21, 1998.

BACKGROUND OF THE INVENTION

I. Field of the Invention

The present invention relates generally to power steering systems for vehicles, and more particularly to electrically powered steering systems which include an electric drive motor for providing a powered assist to the steering gear of the host vehicle.

II. Description of the Prior Art

A variety of electrically powered steering systems (known commonly as electric power steering systems or "EPS systems") have been proposed for providing a powered assist to the steering of a motor vehicle. Conventional rack-and-pinion steering systems include a primary pinion/rack gear mesh interface for coupling the steering wheel of the vehicle to the steering system. EPS systems include an electric drive motor having a rotating element which is additionally mechanically or hydraulically coupled to the rack of the steering gear. EPS systems are said to provide fuel efficiency enhancement amounting to between about 2½ and 5 percent; this enhancement is usually on the lower end of this range for relatively larger vehicles. EPS systems are also said to incorporate software which is easily programmable to provide selected steering characteristics for any particular vehicular application. However, despite overall industry developmental commitments to date on the order of a billion dollars (U.S.), no EPS system is currently offered for sale in a mass produced automobile in the United States.

There are a variety of reasons why EPS systems are not provided on automobiles in this country. One reason is that EPS systems are generally subject to an "auto-steer" problem, in which an unintended steering event is possible. Another reason is that EPS systems generally provide unsatisfactory tactile feedback (or "feel") during use; colloquially, EPS systems simply "feel funny" in operation. The art generally does not satisfactorily indicate the source or sources of these tactile feedback problems.

It is believed herein that the auto-steer problem occurs because the drive motor of such systems is directly linked to the host vehicle's steering linkage and both the magnitude and the direction of steering boost are determined in an open-loop manner. Moreover, prior EPS systems appear to lack even minimal safety feedback information, such as full time independent verification that instant values of the actual assistive force have been properly generated. Errors in the proper generation of the assistive force are not sensed by the driver and remain uncorrected by the system. Other complaints about prior BPS systems include "motor cogging," lack of return ability and poor steering response to small input signals.

Several methods are known for coupling the electric drive motor of an EPS system to the steering linkage of the host vehicle. Preferred is a method comprising a hydraulic transmission for connecting the electric drive motor to the vehicle's steering gear as disclosed in companion U.S. Provisional Patent Application Serial No. 60/090,311 entitled "Feedback and Servo Control for Electric Power Steering System with Hydraulic Transmission". The whole of that provisional patent application is expressly incorporated by reference herein. Specifically, that provisional patent application discloses connecting the electric drive motor to the vehicle's steering gear via the motor driving a pump which, in turn, is fluidly coupled to a cylinder portion of the steering gear.

Of course, a variety of mechanical methods is known for coupling the electric drive motor of an EPS system to the steering linkage of the host vehicle. One method entails the use of a drive motor having a hollow rotor in which the rack shaft of a rack-and-pinion steering gear is concentrically disposed. The drive motor and rack shaft are connected by a ball screw and ball nut assembly, the ball screw being positioned on the rack in place of the conventional power cylinder, and the ball nut being engaged with the ball screw and supporting one end of the rotor. The other end of the rotor is supported by a thrust bearing. Other methods for coupling the drive motor to the steering linkage include coupling the drive motor to a second gear rack, via a gear train and a second pinion/rack gear mesh interface generally similar to the primary pinion/rack gear mesh interface utilized for coupling the steering wheel to the steering system, or coupling the drive motor directly to the steering shaft via a gear train. The ball screw/ball nut configuration is problematic because it couples the motor torque into the rack along with the desired axial thrust. This torque is quite sufficient to overcome the preload of the rack into the pinion so additional rotational constraint must be applied to the rack. This causes an over constraint in the gear mesh interface relationship between the pinion and the rack which results in stick-slip tactile characteristics felt at the steering wheel.

Similarly, adding a second pinion/rack gear mesh interface provides over constraint between either pinion/rack gear mesh with similar deleterious results. If the second pinion/rack gear mesh is loaded by a yoke mechanism there is additional Coulomb friction which adversely effects return ability. Coupling the drive motor directly to the steering shaft via a gear train is limited to vehicles with light steering loads because of wear limitations in the primary pinion/rack gear mesh. With either gear train, backlash becomes a tactile issue because it can be felt at the steering wheel. And if such a gear train were loaded sufficiently to eliminate the backlash, sufficient coulomb friction would be added as to adversely effect on-center feel.

Perhaps most significantly, previously known EPS systems have serious tactile problems at very low frequencies, in particular, on the general order of 1 Hz. This includes system resonance, also typical of many standard power steering systems, which is apparently ignored within the art but can readily be recognized by a driver sensing an "over-center" type of instability wherein the driver must tightly grip the steering wheel in order to maintain precise control of vehicle tracking. Further exacerbating the tactile feel issue in EPS systems is another low frequency resonance traceable to the moment of inertia of the system's electric motor. This resonance also occurs at a frequency in the general order of 1 Hz, but instead results in a "notch" in the tactile characteristics.

One attempt to address some of these problems is provided in U.S. Pat. No. 5,473,539 (Shimizu et al., Dec. 5, 1995). That patent discloses an electrically operated power steering apparatus in a motor vehicle having a steering system. The apparatus comprises a steering torque detector for detecting a manual steering torque applied to the steering system, an electric motor for generating an assistive torque to be transmitted as a steering assistive force to the steering system, and an actual assistive torque detector which detects an actual assistive steering torque which is actually transmitted from the electric motor to the steering system. The apparatus also comprises a controller which generates a target value for the assistive torque to be generated by the electric motor, and which generates a control signal based on the difference between the actual assistive steering torque detected by the actual assistive torque detector and the target value, the control signal then being used to energize the electric motor.

In a first embodiment, the patent discloses an actual assistive torque detector 22 coupling the nut 11a of a ball screw mechanism 11 to a rack shaft 7 of the steering system, the assistive torque of the electric motor 10 being applied to the rack shaft 7 through the ball screw mechanism 11. The patent indicates that the actual assistive torque detector 22 may be a pressure sensor comprising a resistance wire strain gage. In a second embodiment, the detector 22 is replaced with an actual assistive torque estimator which estimates an actual assistive torque from the voltage across the electric motor and the current through it. Because the detector 22 and the estimator provide quantitative information about the magnitude of the actual assistive torque, quantitative information which is necessary for the rest of the disclosed parts of the system to act in the manner described in the patent, the detector 22 and estimator do more than merely "detect" or respond to the presence or absence of an actual assistive torque; instead, they actually measure or estimate its value. A third embodiment in the patent attempts to give the driver of the vehicle a comfortable feel of steering action by providing a high- and/or a low pass filter in the actual assistive torque detector. The disclosed purpose of such filters is to reduce the purported noise from harmonics which are generated in the system upon differentiation for conversion from a rotational angular speed into a rotational angular acceleration, such that the estimator takes into account the inertial torque and the viscosity torque with respect to the motor torque within the system, based on the motor current and the rotational angular speed.

This patent appears to reflect a belief throughout the automotive industry that the issue of poor tactile feedback can and should be addressed by increasingly complicated software control schemes wherein the applied steering boost is made to model the input steering effort. Such efforts, however, have lead to enormous development expenditures without commensurate results; the art appears to provide no guidance as to actually solving the low frequency problems described above.

The related problem of steering shudder was addressed by the method and apparatus for enhancing stability in servo systems disclosed in U.S. Pat. No. 5,544,715 (E. H. Phillips, Aug. 13, 1996). The whole of that patent is expressly incorporated by reference herein. The patent discloses the use of series damping devices to form compliant couplings having series damping characteristics, used either for mounting hydro-mechanically driven actuators, or for coupling them to load elements which they position. The series damping absorbed sufficient energy to provide adequate gain and phase margins for the feedback characteristics of systems utilizing such actuators, so as to substantially prevent the occurrence of high frequency shudder. Of particular interest are the general steering system characteristics described in the specification of the '715 patent and depicted in the block diagram shown in FIG. 3 of that patent. The '715 patent discloses mechanical devices and methods for achieving servo control of the open-loop feedback characteristics present in general steering systems.

Many prior EPS systems appear to experience only marginally stable control and suffer a resultant amplification of external disturbances to them. While general techniques for achieving servo control in other systems are discussed in a variety of textbooks, the application of such techniques to EPS systems would require a knowledge (presently not possessed in the art) of precisely where undesired resonances arise in EPS systems. More particularly, an introduction to servo control which can easily be understood by a novice in this field can be found in a "crib" text book by DiStefano, Stubberud, and Williams entitled *Schaum's Outline of Theory and Problems of Feedback and Control Systems* and published by the McGraw-Hill Book Company. As pointed out in that book, any servo system having a feedback loop can oscillate via self excitation at any frequency whereat unity gain in the opened feedback loop coincides with an odd multiple of 180° phase shift of that opened feedback loop's phase angle. The prior EPS systems mentioned above appear to be characterized by the near confluence of these conditions, with the resulting marginally stable control and amplification of external disturbances mentioned above.

The block diagram shown in FIG. 3 of the '715 patent is both complex and complicated, and discloses several feedback paths inherent in a variety of steering systems. However, block diagrams like that shown in FIG. 3 of the '715 patent can be reduced via appropriate algebraic manipulation to substantially simpler diagrams like that shown in FIG. 4 of the '715 patent. By such algebraic manipulation, all of the forward gain factors can be considered as being comprised within a single forward gain block "G", while all of the feedback gain factors can be considered as being comprised within a single feedback gain block "H".

The closed loop gain ratio O/I of a system whose analysis is reduced in this manner can be determined by the formula:

$$\frac{O}{I} = \frac{G}{1+GH}$$

wherein O is a particular output value of the system, I is a particular input value for the system, G is the forward gain value and H is the feedback gain value. It should be readily apparent that the closed loop gain ratio O/I becomes unstable at any frequency or frequencies where the open loop gain GH attains a value of minus 1, that is, where the absolute value of GH has a value of 1 and its phase angle is equal to an odd multiple of 180°; the denominator of the ratio O/I rapidly approaches zero, so that the gain rapidly approaches infinity. Similarly, the closed loop gain ratio O/I is at best only marginally stable at any frequency or frequencies where the open loop gain GH attains a value which is close to (but not equal to) minus 1. Failure to counteract or otherwise address any particular resonance associated with an open loop gain GH value close to minus 1 would result in such a system having marginal stability. Unfortunately, one such shortcoming appears to be typical of prior EPS systems, since it appears that the art as a whole has failed to recognize or correctly analyze the source of the resonance which causes the low frequency stability control problems mentioned above.

It would be highly advantageous to provide methods and apparatus for substantially eliminating stability problems in EPS systems, and, in particular, for substantially eliminating the low frequency stability control problems mentioned above. It would also be highly advantageous to provide full time independent verification of instant values of steering boost in EPS systems in order to substantially eliminate concerns relating to auto-steer. It would also be advantageous for such a system to achieve a substantially linear control relationship between an applied steering torque input and a resulting steering force output, and thereby achieve an optimum tactile relationship between a vehicle, the vehicle driver and the steering system of the vehicle. It would be still further advantageous for such a system to operate in a regenerative manner and enjoy all of the benefits of a regenerative system.

SUMMARY OF THE INVENTION

These and other objects are achieved in EPS systems according to the present invention, in which feedback signals are either derived from a calculated torque signal, generated torque signals or a generated force signal, which signals are representative either of steering assist force or of total steering force, and use the derived feedback signals in a feedback manner so as to provide servo control over the steering force output of the systems. Such control is implemented over electric motors in preferred, and first, second and third alternate preferred embodiments of the present invention via impedance matching means for providing assisted steering. In the preferred and first alternate preferred embodiments speed reduction means provide a controlled steering assist component only, while in the second and third alternate preferred embodiments torque summing means and force generating means respectively provide controlled assisted steering comprising mechanical steering force components as well as steering assist force components.

The present invention resides, in part, in the recognition that the various problems mentioned above with regard to EPS systems are feedback control issues which are better addressed via appropriate hardware and servo control, rather than by more complex software control as has been done in prior EPS systems. The present invention also resides, in part, in the recognition that the reflected moment of inertia of the electric motor of such systems is in resonance with the series combination of various spring-like elements included in the steering load path. More particularly, it is believed herein that a primary reason for such tactile feedback problems is a low frequency resonance between the reflected moment of inertia of such a system's electric motor and the spring-like steering load itself. As may be more clearly understood with reference to the block diagram shown in FIG. 3 of the '715 patent and the associated discussion in the specification of that patent, the most compliant one of these spring-like elements (and therefore the dominant one of them) is generally formed by system compliance beyond the dirigible wheels. Depending upon vehicle speed, this compliance is formed by a parallel relationship between tire sidewall stiffness and tire patch loading characteristics. For most non-zero vehicle speeds, the dominant system compliance (i.e., the inverse of stiffness) is related to the product of centrifugal force and caster offset. The EPS systems of the present invention simply treat whichever combination yields such compliance as a spring, and generate a servo-controlled steering assist force in a stable manner for providing a powered assist to steering the host vehicle.

The power steering systems of the present invention include a primary applied steering torque sensor that generates an applied steering torque signal $V_{TT1}$ and supplies that signal to an electronic control means. The electronic control means processes that signal and utilizes it in an internal feedback loop comprising the impedance matching means for selectively generating the steering assist force respectively comprised in the preferred, first alternate preferred, second alternate preferred and third alternate preferred embodiments of the present invention. The electronic control means compensates the applied steering torque signal $V_{TT1}$, obtains a tachometer signal $V_t$ (in a manner described in more detail below) and subtracts the tachometer signal $V_t$ from the compensated torque signal, yielding an internal feedback loop input signal $V_i$. The electronic control means further obtains a steering assist force dependent internal loop feedback signal $V_f$ (again, in any of the four embodiments described in more detail below) and subtracts the internal loop feedback signal $V_f$ from the internal feedback loop input signal $V_i$, yielding an error signal $V_e$. The electronic control means then determines an internal control gain value ICG dependent upon the instant applied steering torque signal $V_{TT1}$, the speed of the host vehicle and other desirable parameters, and multiplies the error signal $V_e$ by the internal control gain value ICG to yield an internal error signal $V_{es}$. The electronic control means amplifies the internal error signal $V_{es}$ to yield an internal drive signal $V_d$, which the electronic control means uses to operate the electric motor. The electric motor is directly coupled to the impedance matching means. A calculated net torque provides an assist torque signal $V_{TT2}$ in the preferred embodiment of the present invention. On the other hand, an assist torque signal $V_{TT2}'$ is provided by a torque sensor in the first alternate preferred embodiment. And, torque and force sensors generate torque and force signals $V_{TT6}$ and $V_{FT1}$, respectively utilized in the second alternate preferred and third alternate preferred embodiments. These signals are indicative of either the appropriate torque $T_a$ or $T_{ao}$, or force $F_r$ value attained by the transmission means wherein $T_a$ refers to assist torque values attained in the preferred and first alternate preferred embodiments, $T_{ao}$ refers to total torque, or assisted output torque values attained in the second alternate preferred embodiment, and $F_r$ refers to steering rack output forces attained in the third alternate preferred embodiment of the present invention. Finally, the torque or force value attained by the impedance matching means is multiplied by a feedback factor comprising the inverse of the internal control gain value ICG to form the internal, torque or force-dependent loop feedback signal $V_f$ which is fed back for subtraction from $V_i$ to yield the error signal $V_e$.

The above mentioned calculated net torque can be determined from the electric motor input voltage and current as follows: Calculated motor air gap torque is directly determined from the product of the motor's torque constant and the input current. Calculated rotor accelerating torque is determined from the product of the rotor inertia and differential of the motor's rotational speed (the rotational speed having a rad./sec. dimension) with respect to time. The motor's rotational speed is determined form the product of the motor's back EMF and the inverse of the motor's voltage constant. The motor's back EMF, in turn, is determined by subtracting the I R drop from the input voltage, where I is the motor current an R is the motor resistance. The calculated net torque then, is simply the difference between the calculated motor air gap torque and the calculated rotor accelerating torque.

The power steering systems of the present invention thus yield controlled torque or force $T_a$, $T_{ao}$ or $F_r$ values which, other than for very short term effects such as during the rotor acceleration mentioned above, are linearly related to the product of the instant applied steering torque signal $V_{TT1}$ and the instant control gain value ICG. In this manner, the power steering systems of the present invention isolate the electric motor within its own internal feedback loop. The input to the internal loop is linearly related to the applied steering torque signal $V_{TT1}$ generated by the applied steering torque sensor, and the output is the torque or force $T_a$, $T_{ao}$ or $F_r$. As mentioned above, the torque $T_a$ may either be a calculated value or measured by a torque sensor while the torque or force $T_{ao}$ or $F_r$ is necessarily measured by a torque or force sensor. The internal loop functions such that the moment of inertia of the rotor of the electric motor is effectively decoupled from the overall control loop. This generates an optimum tactile relationship between a vehicle, the vehicle's driver and the steering system of the vehicle.

It is highly preferred that the power steering systems of the present invention include a redundant applied steering torque sensor. Such a redundant steering torque sensor prevents system runaway in case the primary applied steering torque sensor should fail in such a way as to give a fixed, non-zero value to the applied steering torque $T_s$. Since an indication of merely the magnitude of the applied steering torque might be adequate for this purpose, the redundant applied steering torque sensor could be the sensor disclosed in co-pending Provisional U.S. patent application Ser. No. 60/070,732 entitled "Adjustable, Preloaded Transducer, Especially in a Sensor for Measuring Applied Steering Torque" (E. H. Phillips, filed Jan. 7, 1998). The whole of that provisional patent application is expressly incorporated by reference herein. Preferably, however, the redundant applied steering torque sensor is constructed in the same manner as, and operates on the same principle as, the primary applied steering torque sensor.

Also preferably, the electronic control means and electric motor in the systems of the present invention are capable of handling regenerative electric power so as to enable the recovery of power returned to the system whenever the steering load actively centers the steering rack. In general, this requires the impedance matching means to transmit power in either direction.

As described above, the electric motor drives the impedance matching means so as to provide torque or force in a directionally servo controlled manner with reference to the tachometer feedback information and the torque or force-dependent loop feedback signal $V_f$. One control problem arising from the use of conventional torque or force sensors for this purpose is the need to calibrate them with reference to zero value. Advantageously, torque sensors for this purpose are constructed according to the teachings of U.S. Pat. No. 5,351,555 by I. J. Garshelis entitled "Circularly Magnetized Non-Contact Torque Sensor and Method for Measuring Torque Using Same" because such devices inherently tend to have a zero output when unstressed. Thus, such devices are preferably utilized for measuring $T_a$ and $T_{ao}$.

Otherwise (and possibly in addition to utilizing such devices), zero drift can be suppressed by passing the sensor output signal through a high pass filter having a very low corner frequency. Such a high pass filter can be implemented in software as an equivalent to a series capacitor followed by a parallel resistor to ground. The equivalent transfer function for this circuit is $s/(\omega_c+s)$ where s is the first-order Laplace variable and $\omega_c$ is the desired filter corner frequency in rad./sec. The Laplace variable s is also referred to as the complex-frequency variable; as explained in detail in chapters 15 through 17 of H. H. Skilling, *Electrical Engineering Circuits* (John Wiley & Sons, Inc., New York, N.Y., 1957). The time constant associated with this circuit is $1/\omega_c$. In configuring such a high pass filter, this time constant should be made longer than any expected steering event (i.e., such as using a time constant of 100 sec.).

In a first aspect, then, the preferred embodiment of the present invention is directed to a power steering system for a vehicle having dirigible wheels, comprising: a speed reduction means having input and output nodes, and adapted to supply a powered assist to steering the dirigible wheels of the vehicle via torque delivered from the output node upon the supply of torque to the input node; a primary applied steering torque sensor which generates an applied torque signal $V_{TT1}$ in response to at least an applied steering torque $T_s$; means for calculating the assist torque $T_a$ delivered from the output node which generates a feedback signal $V_f$; an electric motor operatively connected to and capable of reversibly driving the speed reduction means via the input node; and an electronic control means to which the primary applied steering torque sensor is operatively connected, and which utilizes the applied torque signal $V_{TT1}$ and the feedback signal $V_f$ as input information for controlling actuation of the electric motor; wherein the electronic control means establishes servo control over the powered assist to steering supplied by the speed reduction means in dependence upon the feedback signal $V_f$ representative of the assist torque $T_a$ calculated by the electronic control means.

In a second aspect, then, the first alternate preferred embodiment of the present invention is directed to a power steering system for a vehicle having dirigible wheels, comprising: a speed reduction means having input and output nodes, and adapted to supply a powered assist to steering the dirigible wheels of the vehicle via torque delivered from the output node upon the supply of torque to the input node; a primary applied steering torque sensor which generates an applied torque signal $V_{TT1}$ in response to at least an applied steering torque $T_s$; a primary assist torque sensor sensing the assist torque $T_a$ delivered from the output node which generates a feedback signal $V_f$; an electric motor operatively connected to and capable of reversibly driving the speed reduction means via the input node; and an electronic control means to which the primary assist torque sensor and the primary applied steering torque sensor are operatively connected, and which utilizes the applied torque signal $V_{TT1}$ and the feedback signal $V_f$ as input information for controlling actuation of the electric motor; wherein the electronic control means establishes servo control over the powered assist to steering supplied by the speed reduction means in dependence upon the feedback signal $V_f$ representative of the assist torque $T_a$ sensed by the primary assist torque sensor.

In a third aspect, the second alternative preferred embodiment of the present invention is directed to a power steering system for a vehicle having dirigible wheels, comprising: a torque summing means having applied torque input, electric motor input and output nodes, and adapted to supply assisted output torque for steering the dirigible wheels of the vehicle upon the supply of torque to the input node; a primary applied steering torque sensor which generates an applied torque signal $V_{TT1}$ in response to at least an applied steering torque $T_s$; a primary output torque sensor sensing the assisted output torque $T_{ao}$ delivered from the output node; an electric motor operatively connected to and capable of reversibly driving the torque summing means via the electric motor input node; and an electronic control means to which the primary output torque sensor and the primary applied steering torque sensor are operatively connected, and which utilizes the applied torque signal $V_{TT1}$ and the feedback signal $V_f$ as input information for controlling actuation of the electric motor; wherein the electronic control means establishes servo control over the assisted output torque for steering the dirigible wheels supplied by the torque summing means in dependence upon the feedback signal $V_f$ representative of the assisted output torque $T_{ao}$ sensed by the primary output torque sensor.

In a fourth aspect, the third alternative preferred embodiment of the present invention is directed to a power steering system for a vehicle having dirigible wheels, comprising: a steering force generating means having applied torque input, electric motor input and steering force output nodes, and adapted to supply assisted steering force for steering the dirigible wheels of the vehicle upon the supply of torque to the input node; a primary applied steering torque sensor which generates a signal $V_{TT1}$ in response to at least an applied steering torque $T_s$; a primary steering force sensor sensing the steering force $F_r$ delivered from the steering force output node; an electric motor operatively connected to and capable of reversibly driving the steering force generating means via the electric motor input node; and an electronic control means to which the primary steering force sensor and the primary applied steering torque sensor are operatively connected, and which utilizes the applied torque signal $V_{TT1}$ and the feedback signal $V_f$ as input information for controlling actuation of the electric motor; wherein the electronic control means establishes servo control over the assisted steering force for steering the dirigible wheels supplied by the steering force generating means in dependence upon the feedback signal $V_f$ representative of the steering force $F_r$ sensed by the primary output torque sensor.

In any of these systems, the electronic control means of the system establishes closed loop servo control over the electric motor in dependence upon the torque or force $T_a$, $T_{ao}$ or $F_r$, calculated or sensed by the appropriate one of the primary assist torque, assisted output torque or steering force sensors, and achieves a substantially linear relationship between the applied steering torque $T_s$ and the torque or force $T_a$, $T_{ao}$ or $F_r$, supplied by the speed reduction, torque summing or steering force generating means, respectively. Preferably, the electronic control means generates an error signal $V_e$ in response to at least the generation of the applied torque signal $V_{TT1}$ by the primary applied steering torque sensor, the error signal $V_e$ being dependent upon the torque or force $T_a$, $T_a$ or $F_r$, calculated or sensed by the appropriate one of the primary assist torque, assisted output torque or steering force sensors. The electronic control means determines an internal control loop gain value ICG as a function of at least vehicle speed, the internal control loop gain value ICG being further related to the applied torque signal $V_{TT1}$ generated by the primary applied steering torque sensor, multiplies the error signal $V_e$ by the internal control loop gain value ICG to generate an internal error signal $V_{es}$ which is amplified to form an internal drive signal $V_d$ and causes the electric motor to drive the speed reduction, torque summing or steering force generating means in a manner which generates the torque or force $T_a$, $T_{ao}$ or $F_r$, sensed by the appropriate one of the primary assist torque, assisted output torque or steering force sensors in accordance with internal error signal $V_{es}$. More preferably, the electronic control means 32 generates the error signal $V_e$ by compensating the signal $V_{TT1}$ generated by the primary applied steering torque sensor to yield a compensated steering torque signal $V_c$, subtracting from the compensated steering torque signal $V_c$ a tachometer signal $V_t$, (representative of steering movement of the dirigible wheels) to yield an input signal $V_i$, obtaining a torque or force-dependent loop feedback signal $V_f$ and subtracting the feedback signal $V_f$ from the input signal $V_i$ to yield the error signal $V_e$.

It should be clear that, in none of these aspects of the invention (as well as in the fifth, sixth, seventh and eighth aspects of the invention described below) no target value for any system parameter is ever established at all for control purposes. This is completely unlike the system disclosed in the Shimizu et al. '539 patent.

The power steering systems of these aspects of the present invention preferably further comprise an actuation speed calculation means operatively comprised within the electronic control means for providing the tachometer signal $V_t$ representative of steering movement of the dirigible wheels. The electronic control means subtracts the tachometer signal $V_t$ so provided from the compensated steering torque signal $V_c$ during control of actuation of the electric motor. As mentioned above, the actuation speed calculating means can conveniently comprise calculation of the rotational speed of the electric motor via the product of the motor's back EMF and the inverse of the motor's voltage constant, or, alternately a tachometer can be utilized for measuring the rotational speed of at least one of the vehicle's steering wheel and the electric motor.

The power steering systems of the present invention preferably comprise redundant measures for confirming proper operation of the system, its component elements and the electronic control means. For example, each of the systems preferably comprises a redundant applied steering torque sensor which is connected to the electronic control means and which generates a redundant signal $V_{TT3}$ in response to the applied steering torque $T_s$. The electronic control means then terminates the powered assist provided by the system when the redundant signal $V_{TT3}$ from the redundant applied steering torque sensor fails to correlate with the signal $V_{TT1}$ from the primary applied steering torque sensor.

Similarly, the power steering system of the preferred embodiment of the present invention preferably further utilizes the electronic control means for calculating an expected but fictitious assist torque signal $V_{TT4}$ as a function of the signal $V_{TT1}$ generated by the primary applied steering torque sensor; compares the instant value of the calculated assist torque signal $V_{TT2}$ with the expected but fictitious assist torque signal $V_{TT4}$; and terminates the powered assist provided by the system when the calculated assist torque signal $V_{TT2}$ fails to correlate with the expected but fictitious assist torque signal $V_{TT4}$. It is important to note that this calculation of an expected but fictitious assist torque signal $V_{TT4}$ is not used as a target for controlling the electric motor, but only for generating the feedback signal $V_f$.

Also similarly, each of the power steering systems of the first, second and third alternate preferred embodiments of the present invention preferably farther comprises a means for providing a redundant measure of the torque or force $T_a$, $T_{ao}$ or $F_r$. The means for providing a redundant measure of the torque or force $T_a$, $T_{ao}$ or $F_r$ conveniently comprise like sensors to those sensors used for providing the primary measurement of the torque or force $T_a$, $T_{ao}$ or $F_r$. The means for providing a redundant measure of the torque or force $T_a$, $T_{ao}$ or $F_r$ respectively generate a redundant assist torque signal $V_{TT5}$, a redundant assisted output torque signal $V_{TT8}$, or a redundant steering force signal $V_{FT3}$. As before, the electronic control means terminates the powered assist provided by the system when the redundant measure of the torque or force $T_a$, $T_{ao}$ or $F_r$ fails to correlate with the torque or force $T_a$, $T_{ao}$ or $F_r$ sensed by the appropriate one of the primary assist torque, assisted output torque or steering force sensors.

More preferably, in each of the power steering systems of the first, second and third alternate preferred embodiments of the present invention the electronic control means calculates an expected but fictitious assist torque signal $V_{TT4}$, assisted output torque signal $V_{TT7}$, or steering force signal $V_{FT2}$ as a function of the signal $V_{TT1}$ generated by the primary applied steering torque sensor; compares the signal $V_{TT2}$, $V_{TT6}$ or $V_{FT1}$, and the redundant signal $V_{TT4}$, $V_{TT8}$ or $V_{FT3}$ provided by the means for providing the same, to the expected but fictitious signal $V_{TT4}$, $V_{TT7}$ or $V_{FT2}$; and terminates the powered assist provided by the system when either the primary, or redundant measure of the torque or force $T_a$, $T_{ao}$ or $F_r$ fails to correlate with the appropriate expected but fictitious signal $V_{TT4}$, $V_t$ or $V_t$ calculated by the electronic control means. It is important to note that this calculation of an expected but fictitious signal $V_{TT4}$, $V_{TT7}$ or $V_{FT2}$ is not used as a target for controlling the electric motor, but only for indicating when the system is not operating properly.

Preferably, each of the systems also comprises clutch means, or functionally clutch-like means, for disconnecting the electric motor and as much of the impedance matching means as possible from remaining portions of the power steering system should the powered assist to steering provided by the system fail. Also preferably, the clutch means, or functionally clutch-like means is spring-biased to achieve such disconnection in a fail-safe manner if the system should fail. ("Fail" includes actual system failure or the intentional termination of the powered assist provided by the system.)

The power steering system is preferably a regenerative system similar to that disclosed in co-pending Provisional U.S. patent application Ser. No. 60/073,560, entitled "Regenerative Power Steering System Including Solenoid-Actuated Four-Way Cross-Over Valve" (E. H. Phillips, filed Feb. 3, 1998. The whole of that provisional patent application is expressly incorporated by reference herein. Thus, it is preferred that the system of the present invention is regenerative and alternatively operable in an unassisted straight steering mode, a powered assist mode in which the powered assist is provided by the electric motor during entry of the vehicle into a turn and an energy regeneration mode which recovers energy while the vehicle exits a turn. The electronic control means controls the electric motor so as to provide torque to the input or electric motor input node during the powered assist mode of the system, and permit the electric motor to generate energy recovered through the speed reduction, torque summing or steering force generation means via reversed torque during the energy regeneration mode of the system. One advantageous feature of the system is that the electric motor does not rotate during the straight steering mode of the system. The system includes an electrical energy means for storing and delivering electrical power, such that electrical energy is delivered from the electrical energy means to the electric motor during the powered assist mode of the system, and is stored to the electrical energy means by the electric motor during the energy regeneration mode of the system.

The electronic control means of any of the systems preferably employs signals representative of the torque or force $T_a$, $T_{ao}$ or $F_r$ respectively calculated or provided by the primary assist torque, assisted output torque or steering force sensor to counteract a resonance occurring predominantly between the moment of inertia of the rotor of the electric motor and a system spring rate presented by the steering load stiffness of the host vehicle. More particularly, the electronic control means treats the resonance as a resonance between a mass element predominated by the moment of inertia of the rotor of the electric motor and a theoretical spring element dominated by tire loading characteristics associated with the tires. The electronic control means then employs the torque or force signal $V_{TT2}$, $V_{TT2}'$, $V_{TT7}$ or $V_{FT2}$ respectively calculated or provided by the primary assist torque sensor, assisted output torque sensor or steering force sensor to control the electric motor so that the speed reduction, torque summing or steering force generating means is not driven in harmony with that resonance, or any other control system generated resonance. In particular, the electronic control means employs the signals representative of the torque or force $T_a$, $T_{ao}$ or $F_r$ within an internal servo control loop comprising the electric motor and the speed reduction, torque summing or steering force generating means to control the resulting torque or force $T_a$, $T_{ao}$ or $F_r$ as a selected function of the torque control signal according to the internal gain value ICG. Thus, the operation of the electric motor is controlled such that the speed reduction, torque summing or steering force generating means is not driven in harmony with that resonance, or any other control system generated resonance.

The electronic control means preferably provides for speed sensitive steering by reducing the internal gain value ICG as a selective function of vehicle speed. In addition, the electronic control means preferably provides compensation of at least one of the magnitude of the applied steering torque, the operation of the electric motor, and the torque or force signals $V_{TT2}$, $V_{TT2}'$, $V_{TT7}$ or $V_{FT2}$ calculated or measured by the appropriate one of the primary assist torque, assisted output torque or steering force sensors. More preferably, the compensation allows for stable operation of both the internal servo control loop and the overall system servo control loop with adequate phase and gain margins over the entire range of vehicle speed and other operational factors, such as a driver abruptly encountering glare ice on an otherwise dry roadway, and the like. In general, such operation requires selective manipulation of the compensation via selective variation of the corner frequencies of poles and/or zeros comprised in the compensation with respect to vehicle speed, in order to adjust for changes in the internal gain value ICG and the spring-like steering load. Preferably, the compensation of the magnitude of the applied steering torque predominantly or exclusively includes at least one pole, while the compensation of the internal servo control loop, between the input signal $V_i$ and the steering force assist ultimately supplied to the dirigible wheels by the system, is predominated by a low-frequency zero.

This latter compensation may be carried out either in the forward direction by compensating the internal error signal $V_{es}$, or in the feedback path. It has been found preferable to confine such the compensation of the internal servo control loop to the feedback path. As will be explained below, this is because all of the perturbing disturbance factors are present in the feedback path but are not yet directly present in the product of the internal gain value ICG and the error signal $V_e$ which forms the internal error signal $V_{es}$.

The electronic control means also preferably employs the torque or force signals $V_{TT2}$, $V_{TT2}'$, $V_{TT7}$ or $V_{FT2}$ respectively calculated or provided by one of the primary assist torque, assisted output torque or steering force sensors in establishing the internal servo control loop. $V_i$ is derived from the application of an applied steering torque $T_s$ to the steering wheel of the host vehicle. More particularly, the system preferably comprises either motor rotational speed calculation or a motor driven tachometer operatively connected to the electronic control means, which generates a signal $V_t$ representative of the rotational speed of the electric motor. The electronic control means subtracts $V_t$ from the compensated signal $V_c$ (generated together by the primary applied steering torque sensor and the electronic control means) and employs the resulting difference as the input signal $V_i$ to the internal servo control loop. $V_t$ is equal to $\theta_m s/K_c$, $\theta_m$ being a rotational position of the electric motor, $K_c$ being a tachometer feedback damping factor and s being the first-order Laplace variable. If the functions at issue are linear (as they are here), the first-order Laplace variable reduces to the first order derivative of those functions with respect to time. Herein, $s^2$ refers to the second-order Laplace variable, which similarly reduces to the second order derivative with respect to time. The reciprocals $1/s$ and $1/s^2$ reduce respectively to single and double integration with respect to time.

Once the electronic control means generates the input signal $V_i$ to the internal servo control loop, the electronic control means further generates (and preferably compensates) a signal representative of the torque or force $T_a$, $T_{ao}$ or $F_r$ respectively calculated or provided by one of the primary assist torque, assisted output torque or steering force sensors so as to give an internal loop feedback signal $V_f$, and subtracts the internal loop feedback signal $V_f$ from the input signal $V_i$ to the internal servo control loop so as to yield an error signal $V_e$ from which a drive signal $V_d$ for operating the electric motor is derived. The electronic control means further determines an internal control loop gain value ICG as a function of vehicle speed and the signal $V_{TT1}$, and operates the electric motor so as to generate a calculated or measured torque or force signal $V_{TT2}$, $V_{TT2}'$, $V_{TT7}$ or $V_{FT2}$ in accordance with an internal error signal $V_{es}$ equal to the product of the error signal $V_e$ and the internal control loop gain value ICG. (Alternately, compensation could be applied to that product to yield an internal modified error signal $V_{mes}$ that would then be used instead of $V_{es}$.)

In a fifth aspect, a preferred embodiment of the present invention is directed to a particular combination of the elements identified above. More particularly, in this fifth aspect, the present invention is directed to a power steering system for a vehicle having dirigible wheels, comprising: a speed reduction means having an input node and an output node and adapted to supply a powered assist to steering the dirigible wheels of the vehicle upon the application of torque to the input node; a primary applied steering torque sensor which generates a signal $V_{TT1}$ in response to at least an applied steering torque $T_s$; an electric motor operatively connected to and capable of reversibly driving the speed reduction means; a calculation of net torque delivered to the speed reduction means by the electric motor which thereby generates a value for, an assist torque signal $V_{TT2}$ related to assist torque $T_a$ delivered from the output node; an electronic control means for calculating the net torque and to which the primary applied steering torque sensor is operatively connected, and which controls actuation of the electric motor; a redundant applied steering torque sensor which generates a redundant applied torque signal $V_{TT3}$ in response to the applied steering torque $T_s$ and which is connected to the electronic control means; an actuation speed calculation means operatively comprised within the electronic control means for providing a tachometer signal $V_t$ representative of steering movement of the dirigible wheels; a calculated expected but fictitious value for an expected assist torque signal $V_{TT4}$ indicative of expected assist torque; wherein the electronic control means establishes servo control over the powered assist to steering supplied by the speed reduction means in dependence upon the assist torque signal $V_{TT2}$ generated by the calculated value therefore; wherein the electronic control means establishes closed loop servo control over the electric motor in dependence upon the assist torque signal $V_{TT2}$ generated by the calculated value therefore and achieves a substantially linear relationship between the applied steering torque $T_s$ and the powered assist to steering supplied by the speed reduction means; wherein the electronic control means generates an error signal $V_e$ in response to at least the generation of the applied torque signal $V_{TT1}$ by the primary applied steering torque sensor, the error signal $V_e$ being dependent upon the assist torque signal $V_{TT2}$ generated by the calculated value therefore; wherein the electronic control means determines an internal control loop gain value ICG as a function of at least vehicle speed, the internal control loop gain value ICG being further related to the signal $V_{TT1}$ generated by the primary applied steering torque sensor; and wherein the electronic control means multiplies the error signal $V_e$ by the internal control loop gain value ICG and causes the electric motor to drive the speed reduction means in a manner which generates an assist torque $T_a$ in accordance with the product of the error signal $V_e$ and the internal control loop gain value ICG; wherein the electronic control means generates the error signal $V_e$ by compensating the signal $V_{TT1}$ generated by the primary applied steering torque sensor to yield a compensated steering torque signal $V_c$; subtracting from the compensated steering torque signal $V_c$ a tachometer signal $V_t$, representative of steering movement of the dirigible wheels, to yield an input signal $V_i$; obtaining an assist torque-dependent internal loop feedback signal $V_f$ and subtracting the feedback signal $V_f$ from the input signal $V_i$ to yield the error signal $V_e$; wherein the electronic control means terminates the powered assist provided by the system when the redundant applied torque signal $V_{TT3}$ from the redundant applied steering torque sensor fails to correlate with the applied torque signal $V_{TT1}$ from the primary applied steering torque sensor; wherein the vehicle includes a steering wheel to which the primary applied steering torque sensor is operatively connected, and wherein the actuation speed calculation means calculates the rotational speed of the electric motor; wherein the electronic control means terminates the powered assist provided by the system when the expected but fictitious assist torque signal $V_{TT4}$ indicative of expected assist torque $T_a$ fails to correlate with the assist torque signal $V_{TT2}$ generated by the calculated value therefore which is indicative of the actual assist torque $T_a$; wherein the system is regenerative and alternatively operable in an unassisted straight steering mode, a powered assist mode in which the powered assist is provided by the speed reduction means during entry of the vehicle into a turn and an energy regeneration mode which recovers energy while the vehicle exits a turn; and wherein the electronic control means controls the electric motor so as to provide same direction rotative application of torque to the input node during the powered assist mode of the system, and permits the electric motor to generate energy recovered through the speed reduction means from a counter direction rotative application of torque during the energy regeneration mode of the system; wherein the vehicle presents a steering load stiffness to the power steering system; and wherein the electronic control means employs the calculated assist torque signal $V_{TT2}$ indicative of the actual assist torque $T_a$ to counteract an electromechanical resonance occurring predominantly between the moment of inertia of the rotor of the electric motor and a system spring rate presented by the steering load stiffness; wherein the electronic control means treats the electromechanical resonance as a resonance between a mass element predominated by the moment of inertia of the rotor of the electric motor and a theoretical spring element dominated by tire loading characteristics associated with the tires; and wherein the electronic control means employs the calculated assist torque signal $V_{TT2}$ indicative of the actual assist torque $T_a$ to control the electric motor so that the speed reduction means is not driven in harmony with the electromechanical resonance; wherein the electronic control means provides compensation of at least one of the magnitude of the applied steering torque $T_s$ and the operation of the electric motor or the assist torque signal $V_{TT2}$, and wherein the compensation of the magnitude of the applied steering torque $T_s$ predominantly includes at least one pole and the compensation of the operation of the electric motor or the assist torque signal $V_{TT2}$ is predominated by a low-frequency zero; wherein the vehicle includes a steering wheel, such that the application of an applied steering torque $T_s$ to the steering wheel results in the application by the system of a steering force assist to the dirigible wheels; wherein the electronic control means employs the calculated assist torque signal $V_{TT2}$ indicative of the actual assist torque $T_a$ to establish an internal servo control loop between the input signal $V_i$ derived from the application of an applied steering torque $T_s$ to the steering wheel and the steering force assist to the dirigible wheels, and wherein the speed reduction means and electric motor are disconnected from the remaining portions of the power steering system should the powered assist to steering provided by the system fail.

In a sixth aspect, a first alternate preferred embodiment of the present invention is directed to another particular combination of the elements identified above. More particularly, in this sixth aspect, the present invention is directed to a power steering system for a vehicle having dirigible wheels, comprising: a speed reduction means having an input node and an output node and adapted to supply a powered assist to steering the dirigible wheels of the vehicle upon the application of torque to the input node; a primary applied steering torque sensor which generates a signal $V_{TT1}$ in response to at least an applied steering torque $T_s$; a primary assist torque sensor which generates an assist torque signal $V_{TT2}'$ in response to assist torque $T_a$ delivered from the output node; an electric motor operatively connected to and capable of reversibly driving the speed reduction means; an electronic control means to which the primary assist torque sensor and the primary applied steering torque sensor are operatively connected, and which controls actuation of the electric motor; a redundant applied steering torque sensor which generates a redundant applied torque signal $V_{TT3}$ in response to the applied steering torque $T_s$ and which is connected to the electronic control means; an actuation speed calculation means operatively comprised within the electronic control means for providing a tachometer signal $V_t$ representative of steering movement of the dirigible wheels; a calculated expected but fictitious value for an expected assist torque signal $V_{TT4}$ indicative of expected assist torque; a redundant assist torque sensor for providing a redundant assist torque signal $V_{TT5}$ indicative of the actual assist torque; wherein the electronic control means establishes servo control over the powered assist to steering supplied by the speed reduction means in dependence upon the assist torque signal $V_{TT2}$ generated by the primary assist torque sensor; wherein the electronic control means establishes closed loop servo control over the electric motor in dependence upon the assist torque signal $V_{TT2}$ generated by the primary assist torque sensor and achieves a substantially linear relationship between the applied steering torque $T_s$ and the powered assist to steering supplied by the speed reduction means; wherein the electronic control means generates an error signal $V_e$ in response to at least the generation of the applied torque signal $V_{TT1}$ by the primary applied steering torque sensor, the error signal $V_e$ being dependent upon the assist torque signal $V_{TT2}$ generated by the primary assist torque sensor; wherein the electronic control means determines an internal control loop gain value ICG as a function of at least vehicle speed, the internal control loop gain value ICG being further related to the signal $V_{TT1}$ generated by the primary applied steering torque sensor; and wherein the electronic control means multiplies the error signal $V_e$ by the internal control loop gain value ICG and causes the electric motor to drive the speed reduction means in a manner which generates an assist torque $T_a$ at the primary assist torque sensor in accordance with the product of the error signal $V_e$ and the internal control loop gain value ICG; wherein the electronic control means generates the error signal $V_e$ by compensating the signal $V_{TT1}$ generated by the primary applied steering torque sensor to yield a compensated steering torque signal $V_c$; subtracting from the compensated steering torque signal $V_c$ a tachometer signal $V_t$, representative of steering movement of the dirigible wheels, to yield an input signal $V_i$; obtaining an assist torque-dependent internal loop feedback signal $V_f$ and subtracting the feedback signal $V_f$ from the input signal $V_i$ to yield the error signal $V_e$; wherein the electronic control means terminates the powered assist provided by the system when the redundant applied torque signal $V_{TT3}$ from the redundant applied steering torque sensor fails to correlate with the applied torque signal $V_{TT1}$ from the primary applied steering torque sensor; wherein the vehicle includes a steering wheel to which the primary applied steering torque sensor is operatively connected, and wherein a tachometer redundantly measures the rotational speed of at least one of the steering wheel and the electric motor; wherein the electronic control means terminates the powered assist provided by the system when either the calculated expected by fictitious assist torque signal $V_{TT4}$ or the redundant assist torque signal $V_{TT5}$ indicative of the actual assist torque $T_a$ fails to correlate with the assist torque signal $V_{TT2}$ generated by the primary assist torque sensor also indicative of the actual assist torque $T_a$; wherein the system is regenerative and alternatively operable in an unassisted straight steering mode, a powered assist mode in which the powered assist is provided by the speed reduction means during entry of the vehicle into a turn and an energy regeneration mode which recovers energy while the vehicle exits a turn; and wherein the electronic control means controls the electric motor so as to provide same direction rotative application of torque to the input node during the powered assist mode of the system, and permits the electric motor to generate energy recovered through the speed reduction means from a counter direction rotative application of torque during the energy regeneration mode of the system; wherein the vehicle presents a steering load stiffness to the power steering system; and wherein the electronic control means employs the assist torque signal $V_{TT2}$ generated by the primary asset torque sensor to counteract an electro-mechanical resonance occurring predominantly between the moment of inertia of the electric motor and a system spring rate presented by the steering load stiffness; wherein the electronic control means treats the electro-mechanical resonance as a resonance between a mass element predominated by the moment of inertia of the rotor of the electric motor and a theoretical spring element dominated by tire loading characteristics associated with the tires; and wherein the electronic control means employs the assist torque signal $V_{TT2}$ generated by the primary assist torque sensor to control the electric motor so that the speed reduction means is not driven in harmony with the electro-mechanical resonance; wherein the electronic control means provides compensation of at least one of the magnitude of the applied steering torque $T_s$, and the operation of the electric motor or the assist torque signal $V_{TT2}$ generated by the primary assist torque sensor, and wherein the compensation of the magnitude of the applied steering torque $T_s$ predominantly includes at least one pole and the compensation of the operation of the electric motor or the assist torque signal $V_{TT2}$ is predominated by a low-frequency zero; wherein the vehicle includes a steering wheel, such that the application of an applied steering torque $T_s$ to the steering wheel results in the application by the system of a steering force assist to the dirigible wheels; wherein the electronic control means employs the assist torque signal $V_{TT2}$ generated by the primary assist torque sensor to establish an internal servo control loop between the input signal $V_i$ derived from the application of an applied steering torque $T_s$ to the steering wheel and the steering force assist to the dirigible wheels, and wherein the speed reduction means and electric motor are disconnected from the remaining portions of the power steering system should the powered assist to steering provided by the system fail.

In a seventh aspect, a second alternative preferred embodiment of the present invention is directed to another particular combination of the elements identified above. More particularly, in this seventh aspect, the present invention is directed to a power steering system for a vehicle having dirigible wheels, comprising: a torque summing means having an applied torque input node, an electric motor input node and an output node and adapted to supply a powered assist to steering the dirigible wheels of the vehicle upon the application of torque to the applied torque input node; a primary applied steering torque sensor which generates a signal $V_{TT1}$ in response to at least an applied steering torque $T_s$; a primary assisted output torque sensor which generates an assisted output torque signal $V_{TT6}$ in response to assisted output torque $T_{ao}$ delivered from the output node; an electric motor operatively connected to the electric motor input node and capable of reversibly driving the torque summing means; an electronic control means to which the primary assisted torque sensor and the primary applied steering torque sensor are operatively connected, and which controls actuation of the electric motor; a redundant applied steering torque sensor which generates a redundant applied torque signal $V_{TT3}$ in response to the applied steering torque $T_s$ and which is connected to the electronic control means; an actuation speed calculation means operatively comprised within the electronic control means for providing a tachometer signal $V_t$ representative of steering movement of the dirigible wheels; a calculated expected by fictitious assist torque signal $V_{TT7}$ indicative of the expected value for the assisted output torque, and a redundant assisted output torque sensor for providing a redundant assisted output torque signal $V_{TT8}$ indicative of the actual assisted output torque $T_{ao}$; wherein the electronic control means establishes servo control over the powered assist to steering supplied by the torque summing means in dependence upon the assisted output torque signal $V_{TT6}$ generated by the primary assisted output torque sensor; wherein the electronic control means establishes closed loop servo control over the electric motor in dependence upon the assisted output torque signal $V_{TT6}$ generated by the primary assisted output torque sensor and achieves a substantially linear relationship between the applied steering torque $T_s$ and the powered assist to steering supplied by the torque summing means; wherein the electronic control means generates an error signal $V_e$ in response to at least the generation of the applied torque signal $V_{TT1}$ by the primary applied steering torque sensor, the error signal $V_e$ being dependent upon the assisted output torque signal $V_{TT6}$ generated by the primary assisted output torque sensor; wherein the electronic control means determines an internal control loop gain value ICG as a function of at least vehicle speed, the internal control loop gain value ICG being further related to the signal $V_{TT1}$ generated by the primary applied steering torque sensor; and wherein the electronic control means multiplies the error signal $V_e$ by the internal control loop gain value ICG and causes the electric motor to drive the speed reduction means in a manner which generates an assisted output torque at the primary assisted output torque sensor in accordance with the product of the error signal $V_e$ and the internal control loop gain value ICG; wherein the electronic control means generates the error signal $V_e$ by compensating the signal $V_{TT1}$ generated by the primary applied steering torque sensor to yield a compensated steering torque signal $V_c$; subtracting from the compensated steering torque signal $V_c$ a tachometer signal $V_t$, representative of steering movement of the dirigible wheels, to yield an input signal $V_i$; obtaining an assisted output torque-dependent internal loop feedback signal $V_f$ and subtracting the feedback signal $V_f$ from the input signal $V_i$ to yield the error signal $V_e$; wherein the electronic control means terminates the powered assist provided by the system when the redundant applied torque signal $V_{TT3}$ from the redundant applied steering torque sensor fails to correlate with the applied torque signal $V_{TT1}$ from the primary applied steering torque sensor; wherein the vehicle includes a steering wheel to which the primary applied steering torque sensor is operatively connected, and wherein a tachometer redundantly measures the rotational speed of at least one of the steering wheel and the electric motor; wherein the electronic control means terminates the powered assist provided by the system when either the calculated expected but fictitious signal $V_{TT7}$ indicative of the expected assisted output torque or the redundant assisted output torque signal $V_{TT8}$ indicative of the actual assisted output torque $T_{ao}$ provided by the redundant assisted output torque sensor fails to correlate with the assisted output torque signal $V_{TT6}$ generated by the primary assisted output torque sensor also indicative of the actual assisted output torque $T_{ao}$; wherein the system is regenerative and alternatively operable in an unassisted straight steering mode, a powered assist steering mode in which the assisted output torque is provided by the torque summing means during entry of the vehicle into a turn and an energy regeneration mode which recovers energy while the vehicle exits a turn; and wherein the electronic control means controls the electric motor so as to provide same direction rotative application of torque to the electric motor input node during the powered assist mode of the system, and permits the electric motor to generate energy recovered through the torque summing means from a counter direction rotative application of torque during the energy regeneration mode of the system; wherein the vehicle presents a steering load stiffness to the power steering system; and wherein the electronic control means employs the assisted output torque signal $V_{TT6}$ generated by the primary assisted output torque sensor to counteract an electromechanical resonance occurring predominantly between the moment of inertia of the rotor of the electric motor and a system spring rate presented by the steering load stiffness; wherein the electronic control means treats the electromechanical resonance as a resonance between a mass element predominated by the moment of inertia of the rotor of the electric motor and a theoretical spring element dominated by tire loading characteristics associated with the tires; and wherein the electronic control means employs the assisted output torque signal $V_{TT6}$ generated by the primary assisted output torque sensor to control the electric motor so that the torque summing means is not driven in harmony with the electromechanical resonance; wherein the electronic control means provides compensation of at least one of the magnitude of the applied steering torque $T_s$, and the operation of the electric motor or the assisted output torque signal $V_{TT6}$ generated by the primary assisted output torque sensor, and wherein the compensation of the magnitude of the applied steering torque $T_s$ predominantly includes at least one pole and the compensation of the operation of the electric motor or the assisted output torque signal $V_{TT6}$ is predominated by a low-frequency zero; wherein the vehicle includes a steering wheel, such that the application of an applied steering torque $T_s$ to the steering wheel results in the application by the system of an assisted steering force to the dirigible wheels; and wherein the electronic control means employs the assisted output torque signal $V_{TT6}$ generated by the primary assisted output torque sensor to establish an internal servo control loop between the input signal $V_i$ derived from the application of an applied steering torque $T_s$ to the steering wheel and the assisted steering force to the dirigible wheels, and wherein the torque summing means and electric motor are disconnected from the remaining portions of the power steering system should the powered assist to steering provided by the system fail.

In an eighth aspect, a third alternative preferred embodiment of the present invention is directed to yet another particular combination of the elements identified above. More particularly, in this eighth aspect, the present invention is directed to a power steering system for a vehicle having dirigible wheels, comprising: a steering force generating means having an applied torque input node, an electric motor input node and a steering force output node and adapted to supply a powered assist to steering the dirigible wheels of the vehicle upon the application of torque to the applied torque input node; a primary applied steering torque sensor which generates a signal $V_{TT1}$ in response to at least an applied steering torque $T_s$; a primary steering force sensor which generates a steering force signal $V_{FT1}$ in response to steering force $F_r$ delivered from the steering force output node; an electric motor operatively connected to the electric motor input node and capable of reversibly driving the steering force generating means; an electronic control means to which the primary steering force sensor and the primary applied steering torque sensor are operatively connected, and which controls actuation of the electric motor; a redundant applied steering torque sensor which generates a redundant applied torque signal $V_{TT3}$ in response to the applied steering torque $T_s$ and which is connected to the electronic control means; an actuation speed calculation means operatively comprised within the electronic control means for providing a tachometer signal $V_t$ representative of steering movement of the dirigible wheels; a calculated expected but fictitious signal $V_{FT2}$ indicative of the expected steering force, and a redundant steering force sensor for providing a redundant steering force signal $V_{FT3}$ indicative of the actual steering force $F_r$; wherein the electronic control means establishes servo control over the powered assist to steering supplied by the steering force generating means in dependence upon the steering force signal $V_{FT1}$ generated by the primary steering force sensor; wherein the electronic control means establishes closed loop servo control over the electric motor in dependence upon the steering force signal $V_{FT1}$ generated by the primary steering force sensor and achieves a substantially linear relationship between the applied steering torque $T_s$ and the powered assist to steering supplied by the steering force generating means; wherein the electronic control means generates an error signal $V_e$ in response to at least the generation of the applied torque signal $V_{TT1}$ by the primary applied steering torque sensor, the error signal $V_e$ being dependent upon the steering force signal $V_{FT1}$ generated by the primary steering force sensor; wherein the electronic control means determines an internal control loop gain value ICG as a function of at least vehicle speed, the internal control loop gain value ICG being further related to the signal $V_{TT1}$ generated by the primary applied steering torque sensor; and wherein the electronic control means multiplies the error signal $V_e$ by the internal control loop gain value ICG and causes the electric motor to drive the steering force generation means in a manner which generates a steering force $F_r$ at the primary steering force sensor in accordance with the product of the error signal $V_e$ and the internal control loop gain value ICG; wherein the electronic control means generates the error signal $V_e$ by compensating the signal $V_{TT1}$ generated by the primary applied steering torque sensor to yield a compensated steering torque signal $V_c$; subtracting from the compensated steering torque signal $V_c$ a tachometer signal $V_t$, representative of steering movement of the dirigible wheels, to yield an input signal $V_i$; obtaining an steering force-dependent internal loop feedback signal $V_f$ and subtracting the feedback signal $V_f$ from the input signal $V_i$ to yield the error signal $V_e$; wherein the electronic control means terminates the powered assist provided by the system when the redundant applied torque signal $V_{TT3}$ from the redundant applied steering torque sensor fails to correlate with the applied torque signal $V_{TT1}$ from the primary applied steering torque sensor; wherein the vehicle includes a steering wheel to which the primary applied steering torque sensor is operatively connected, and wherein a tachometer redundantly measures the rotational speed of at least one of the steering wheel and the electric motor; wherein the electronic control means terminates the powered assist provided by the system when either the calculated expected but redundant signal $V_{FT2}$ indicative of the expected steering force or the redundant steering force signal $V_{FT3}$ indicative of the actual steering force $F_r$ provided by the redundant steering force sensor fails to correlate with the steering force signal $V_{FT1}$ generated by the primary steering force sensor also indicative of the actual steering force $F_r$; wherein the system is regenerative and alternatively operable in an unassisted straight steering mode, a power assisted steering mode in which the steering force is provided by the steering force generating means during entry of the vehicle into a turn and an energy regeneration mode which recovers energy while the vehicle exits a turn; and wherein the electronic control means controls the electric motor so as to provide same direction rotative application of torque to the electric motor input node during the powered assist mode of the system, and permits the electric motor to generate energy recovered through the steering force generating means from a counter direction rotative application of torque during the energy regeneration mode of the system; wherein the vehicle presents a steering load stiffness to the power steering system; and wherein the electronic control means employs the steering force signal $V_{FT1}$ generated by the primary steering force sensor to counteract an electromechanical resonance occurring predominantly between the moment of inertia of the rotor of the electric motor and a system spring rate presented by the steering load stiffness; wherein the electronic control means treats the electromechanical resonance as a resonance between a mass element predominated by the moment of inertia of the rotor of the electric motor and a theoretical spring element dominated by tire loading characteristics associated with the tires; and wherein the electronic control means employs the steering force signal $V_{FT1}$ generated by the primary steering force sensor to control the electric motor so that the steering force generating means is not driven in harmony with the electromechanical resonance; wherein the electronic control means provides compensation of at least one of the magnitude of the applied steering torque $T_s$, and the operation of the electric motor or the assisted output torque signal $V_{FT1}$ generated by the primary steering force sensor, and wherein the compensation of the magnitude of the applied steering torque $T_s$ predominantly includes at least one pole and the compensation of the operation of the electric motor or the steering force signal $V_{TT6}$ is predominated by a low-frequency zero; wherein the vehicle includes a steering wheel, such that the application of an applied steering torque $T_s$ to the steering wheel results in the application by the system of an assisted steering force $F_r$ to the dirigible wheels; and wherein the electronic control means employs the steering force signal $V_{FT1}$ generated by the primary steering force sensor to establish an internal servo control loop between the input signal $V_i$ derived from the application of an applied steering torque $T_s$ to the steering wheel and the assisted steering force $F_r$ to the dirigible wheels, and wherein the electric motor is disconnected from the steering force generating means should the powered assist to steering provided by the system fail.

The power steering systems of the present invention possess several distinct advantages over prior EPS systems. For example, the systems of the present invention provide fall time independent verification of instant values of steering boost, substantially eliminating concerns relating to auto-steer. The systems of the present invention also substantially eliminate low frequency stability control problems previously encountered in EPS systems. Advantageously, the steering force outputs from the systems of the present invention are linearly related to the applied steering torque.

Of course, the systems of the present invention enjoy all of the advantages of a regenerative system. The power steering systems of the present invention possess high efficiency and recover a significant portion of the energy returned from the dirigible wheels when the host vehicle exits a turn. More particularly, the ability to handle regenerative power allows the systems of the present invention to operate in all four quadrants which permits smooth transition between powered assist and energy regeneration modes, and to permit good steering control both during operation in each of the modes and during transition between modes. Finally, the systems of the present invention allow safe operation of the vehicle during failure of the powered assist provided by the systems.

BRIEF DESCRIPTION OF THE DRAWING

A better understanding of the present invention will now be had with reference to the accompanying drawing, wherein like reference characters refer to like parts throughout the several views herein, and in which:

FIG. 9A is a perspective view of a portion of a host vehicle in which the second alternate preferred embodiment of the present invention is incorporated;

FIG. 9B is a cut away isometric view showing internal elements of one of the features comprised in FIG. 9A;

FIG. 10 is a schematic view of the second alternate preferred embodiment of the present invention;

DETAILED DESCRIPTION OF THE PREFERRED EMBODIMENT

Figure 1:
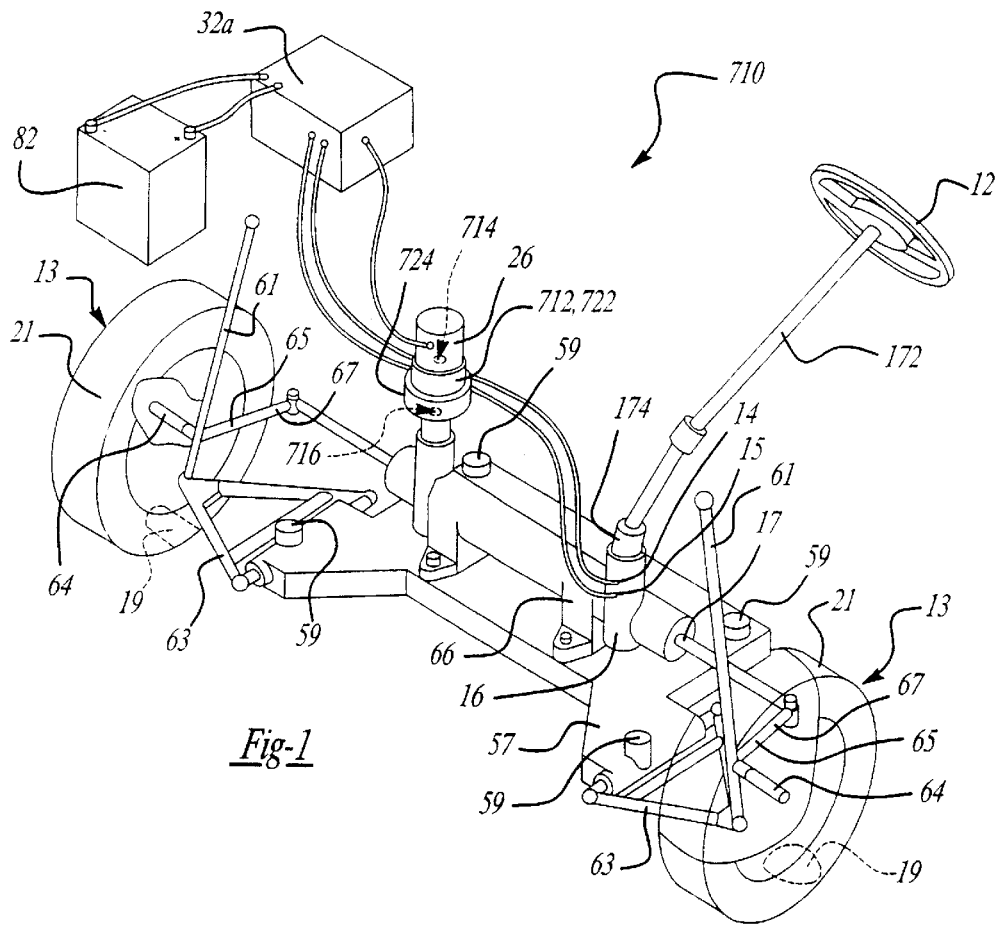
FIG. 1 is a perspective view of a portion of a host vehicle in which the preferred embodiment of the present invention is incorporated.

Vehicular power steering systems 710, 760, 810 and 910 in accordance with preferred, and first, second and third alternate preferred embodiments of the present invention are presented herein. Generally common to all of the vehicular power steering systems 710, 760, 810 and 910 are calculated and/or generated signals representative of either steering assist or total steering force. These signals are compensated by electronic control means 32a, 32b, 32c or 32d, respectively, to form feedback signals. The so derived feedback signals are utilized in a feedback manner in providing servo control over the steering force output of the systems. In each system, such control is implemented over an electric motor 26 in order to provide assisted steering via impedance matching means. In the preferred and first alternate preferred embodiments the impedance matching means comprises speed reduction means 712 which provide a controlled steering assist component only, while in the second and third alternate preferred embodiments the impedance matching means comprise torque summing means 812 and force generating means 912, respectively, which provide controlled assisted steering comprising mechanically derived and steering assist force components.

The vehicular power steering systems 710, 760, 810 and 910 are primarily differentiated one from another according to their control parameters, as is particularly explained below with reference to the block diagrams depicted in FIGS. 4A–4C, 8A–8C, 12A–12C, and 17A–17C. Specifically, vehicular power steering system 710 comprises the speed reduction means 712 and uses a feedback signal dependent upon a calculated torque signal; vehicular power steering system 760 also comprises the speed reduction means 712 but uses a feedback signal dependent upon a measured torque signal; vehicular power steering system 810 comprises the torque summing means 812 and uses a feedback signal dependent upon a measured torque signal; while vehicular power steering system 910 comprises the force generating means 912 and uses a feedback signal dependent upon the sum of two measured force signals. Although the vehicular power steering systems 710, 760, 810 and 910 are respectively depicted as component portions of specific electromechanical and electro-hydro-mechanical assemblies in FIGS. 1, 5, 9 and 13 herein, such electromechanical and electro-hydro-mechanical assemblies are considered exemplary only. The vehicular power steering systems 710, 760, 810 and 910 can, of course, each be constructed in compliance with a variety of such configurations which, for brevity, have not been shown herein, but are understood to broaden the application of the control concepts described below to any known electromechanical or electro-hydro-mechanical configuration for an EPS system.

Figure 2:
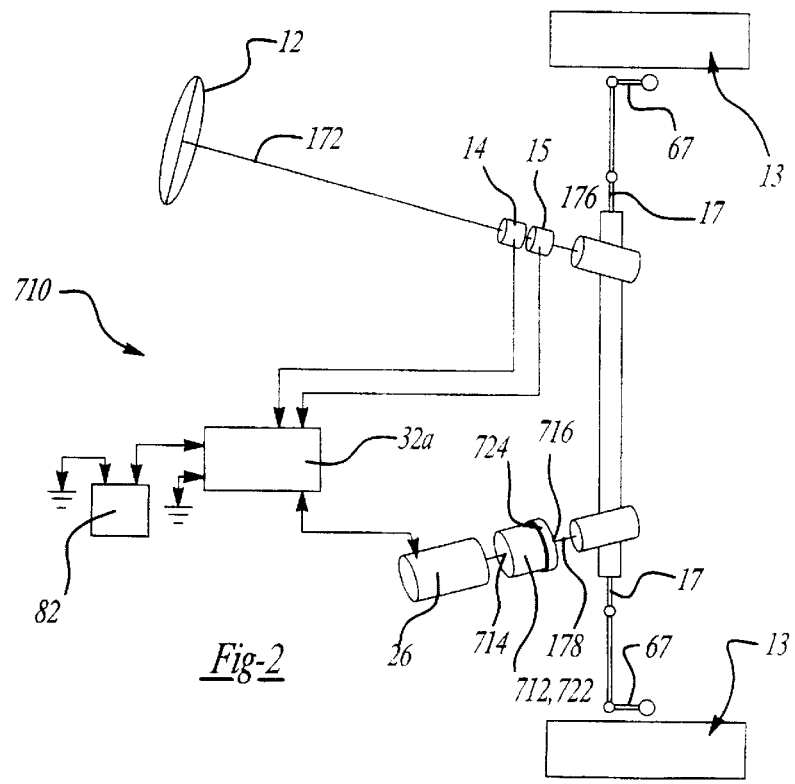
FIG. 2 is a schematic view of the preferred embodiment of the present invention.

With reference now to FIGS. 1 and 2, a vehicular power steering system 710 according to the preferred embodiment of the present invention is thereshown, in perspective and schematically, respectively, in conjunction with various constituents of the host vehicle in which the system 710 is located. More particularly, the system 710 is employed with a steering wheel 12 movable by a driver for steering the dirigible (steerable) wheels 13 of the vehicle. The steering wheel 12 is connected to the dirigible wheels 13 by a steering shaft 172 coupled to a suitable steering gear 16, for example, of the rack-and-pinion type, via a compliant coupling 174. As is standard, the steering gear 16 comprises a primary pinion shaft 176 principally contained within a steering gear housing 66 and engaged with a gear rack 17.

The purpose of the compliant coupling 174 is two fold. Firstly, it isolates the steering shaft 172 and steering wheel 12 from high frequency road induced vibration in a known manner. Secondly, it performs the necessary function of selectively reducing the forward gain of the steering system 710 so that it can be rendered stable in operation, as will be fully explained below. In any case, a primary applied steering torque sensor 14 is connected either to the steering shaft 172 or to the primary pinion shaft 176, and generates an electrical or electronic signal $V_{TT1}$ representative of the magnitude and direction of a net steering torque T equal to the steering torque $T_s$ applied to the steering wheel 12 less any torque required for acceleration of the steering wheel 12 itself.

As is conventional, the application of an applied steering torque $T_s$ to the steering wheel 12 results in the application by the system 710 of an assisted steering force to the dirigible wheels 13 via the gear rack 17. More particularly, the gear rack 17 is partly contained within a steering gear housing 66, the steering gear housing 66 being fixed to a conventional steering assembly sub-frame 57. The sub-frame 57 includes a plurality of mounts 59 for connecting the steering assembly sub-frame 57 to the vehicle chassis (not shown). The dirigible wheels 13 are rotatably carried on wheel spindles 64 connected to vehicle steering knuckles 65 and vehicle struts 61. The steering knuckles 65 are pivotally connected to the sub-frame 57 by lower control arms 63. A portion 67 of each steering knuckle 65 defines a knuckle arm radius $R_w$ about which the assisted steering force, comprising both mechanically derived steering force and powered assist to steering as respectively provided by the primary pinion shaft 176 and the speed reduction means 712.

Many methods for implementing the speed reduction means 712 are known in the art and any of them can be utilized in conjunction with the power steering system 710. Depicted in FIGS. 1 and 2 is an exemplary speed reduction means 712 comprising a gear reduction means 722 with an input node 714 and an output node 716. The output node 716 is implemented by a supplemental pinion shaft 178 driving a second set of gear teeth (not shown) on the gear rack 17. The system 710 further comprises an electric motor 26 operatively connected to and capable of reversibly driving the input node of the gear reduction means, and an electronic control means 32a which controls actuation of the electric motor 26 in a manner described in more detail below. The electric motor 26 may, for instance, be permanent magnet D.C. servomotor under regenerative control by the electronic control means 32a.

The power steering system 710 of the present invention next comprises at least a primary applied steering torque sensor 14. The primary applied steering torque sensor 14 is shown in FIG. 1 as being connected to the steering gear housing 66. Alternatively, as shown in FIG. 2, the primary applied steering torque sensor 14 can be operatively connected to the steering shaft 172.

More particularly, the electronic control means 32a establishes servo control over the powered assist to steering supplied by the speed reduction means 712 in dependence upon an internally calculated assist torque signal $V_{TT2}$ representative of instant values of steering assist torque $T_a$ present at the output node 716, which are, in turn, dependent upon the product of instant values of net torque actually applied to the input node 714 by the electric motor 26 and the reduction ratio of the reduction means 712. The net torque can be calculated from input voltage and current to the electric motor 26 as follows:

Calculated motor air gap torque is directly determined from the product of the motor's torque constant and the input current. Calculated rotor accelerating torque is determined from the product of the rotor inertia and the differential of the motor's rotational speed (the rotational speed having a rad./sec. dimension) with respect to time. The motor's rotational speed is determined from the product of the motor's back EMF and the inverse of the motor's voltage constant. The motor's back EMF, in turn, is determined by subtracting the I R drop from the input voltage, where I is the motor current an R is the motor resistance. The calculated net torque then, is simply the difference between the calculated motor air gap torque and the calculated rotor accelerating torque.

In general, servo control of the power steering system 710 is established by a driver between his, or her, inputs of an applied steering torque $T_s$ to the steering wheel 12, and his, or her, observation of actual resulting rotational motion of tire patches 19. However, the electronic control means 32a establishes actual servo control over only a portion of the steering system 710 within an internal loop as will be fully described below with reference a flow chart disclosed in FIG. 3, and a block diagram disclosed in FIGS. 4A–4C. In very general terms, the primary applied torque sensor 14 provides a primary applied torque signal $V_{TT1}$ to the electronic control means 32a. In response to the primary applied torque signal $V_{TT1}$, the electronic control means 32a then establishes servo control over the powered assist to steering supplied by the speed reduction means 712 in dependence upon the internally calculated assist torque signal $V_{TT2}$ representative of instant values of assist torque present at the output node 716.

For further safety and reliability, it is highly preferred that the power steering system 710 of the preferred embodiment include redundant measures of various operating parameters. Such redundancy serves at least two purposes: it provides a direct check on the proper operation of various individual components of the system 710; and it ensures the rapid termination of the powered assist to steering provided by the system 710, in case one or more individual components should fail, thereby affirmatively preventing runaway within the system 710 and an unintended steering event commonly known in the industry as "auto steer".

Thus, the power steering system 710 of the present invention preferably further comprises a redundant applied steering torque sensor 15 different from the primary applied steering torque sensor 14. "Different from" means that the redundant applied steering torque sensor 15 comprises separate elements from those comprised in the primary applied steering torque sensor 14. While the redundant applied steering torque sensor 15 can act on a different operating principle than does the primary applied steering torque sensor 14, that is, that the primary and redundant applied steering torque sensors 14 and 15 can be of different fundamental types, it is preferred that they are the same type of sensor. In any event, the electronic control means 32a terminates the powered assist to vehicle steering provided by the system 710 when the redundant applied torque signal $V_{TT3}$ from the redundant applied steering torque sensor 15 fails to correlate with the applied torque signal $V_{TT1}$ from the primary applied steering torque sensor 14.

The electronic control means also generates a redundant expected but fictitious assist torque signal $V_{TT4}$ representative of the value of the calculated assist torque $T_a$ present at the output node 716. The redundant expected but fictitious assist torque signal $V_{TT4}$, of course, must correspond to the calculated assist torque signal $V_{TT2}$ indicative of the assist torque $T_a$. The electronic control means 32a compares the redundant expected but fictitious and calculated net torque signals, and terminates the powered assist provided by the system 710 when the redundant signals fail to correlate acceptably. A difference between these signals may indicate a fundamental failure within the system 710, including a failure of the electronic control means 32a itself. In any case, should such a difference between these two signals corresponding to the net torque occur, the electronic control means terminates the powered assist provided by the system 710.

It is highly desirable that, should the powered assist to steering provided by the system 710 be terminated by the electronic control means 32a in this manner, or should the system 710 otherwise fail, the vehicle can still be steered manually. Isolating the gear reduction means 722 and the electric motor 26 from the mechanical path of manual steering, however, substantially improves the ease of such manual steering. Without isolation, the driver would have to apply an additional torque, over and above that required for steering, in order to overcome the hindrance to steering presented by needing to manually drive the gear reduction means 722 and the electric motor 26. Accordingly, as shown in FIGS. 1 and 2, it is preferred that the system 710 further comprise clutch means 724 between the reduction gear means 722 and the supplemental pinion shaft 178. As is standard, the clutch means 724 is electrically activated during normal operation of the system 710, and reverts to its default disengaged condition should the system 710 become inoperative.

As indicated above, it is also preferred that the power steering system 710 (as well as the power steering systems 760, 810 and 910 to be described later) of the present invention be a system which employs the energy regeneration principles of the system shown in the co-pending '560 application. For brevity, the details of the disclosure of that application will not be repeated here. By way of summary, however, such a system is alternatively operable in an unassisted straight steering mode, a powered assist mode in which a powered assist to steering is provided by the speed reduction means 712 during entry of the host vehicle into a turn, and an energy regeneration mode which recovers energy while the vehicle exits a turn. Because of the regeneration mode requirement, it is preferred that the gear reduction means is capable of being driven in the reverse direction by the gear rack 17 and supplemental pinion shaft 178.

Reference to the '560 application should be made for further details about regenerative systems in general. One major difference between the systems 710, 760, 810 and 910 of the present invention and the system shown in the '560 application, however, is that the present systems 710, 760, 810 and 910 do not employ differences between actual and ideal pressure-effort curves to switch among the straight steering, powered assist and energy regeneration modes. The system shown in the '560 application required such switching because it was desirable that the electric motor (26) disclosed in that application was not driven in a reverse direction. In the systems 710, 760, 810 and 910 of the present invention, in contrast, the electric motor 26 is in fact reversible; this eliminates the need for any controls for switching between modes and eliminates the need for any calculation of pressure-effort curves or ratios. Instead, by allowing the electric motor 26 to be driven in either of two directions, the regeneration of energy upon recovery from a vehicle turn is automatic. This is an appreciable improvement over the system shown in the '560 application.

The power steering systems 710, 760, 810 and 910 of the present invention are thus preferably regenerative systems, operable in the three modes indicated above, such that the electronic control means 32a (and electronic control means 32b, 32c and 32d to be described below) controls the electric motor 26 so as to deliver a positive flow of energy to the dirigible wheels 13 during the powered assist mode of the systems 710, 760, 810 and 910, and so as to permit the electric motor 26 to generate energy recovered from a reversed flow of energy during the regeneration mode of the systems 710, 760, 810 and 910. (As indicated above, this regeneration occurs automatically in the preferred embodiments of the systems 710, 760, 810 and 910 as described in detail herein.) Preferably, the electric motor 26 does not rotate during the straight steering mode of the system 710.

When configured as regenerative systems, the systems 710, 760, 810 and 910 preferably further comprise an electrical energy means 82 for storing and delivering electrical power, such that electrical energy is delivered from the electrical energy means 82 to the electric motor 26 during the powered assist mode of the systems 710, 760, 810 and 910, and is stored to the electrical energy means 82 by the electric motor 26 during the energy regeneration mode of the systems 710, 760, 810 and 910. The electrical energy means 82 most conveniently comprises a conventional alternator (not shown) and storage battery.

Figure 3:
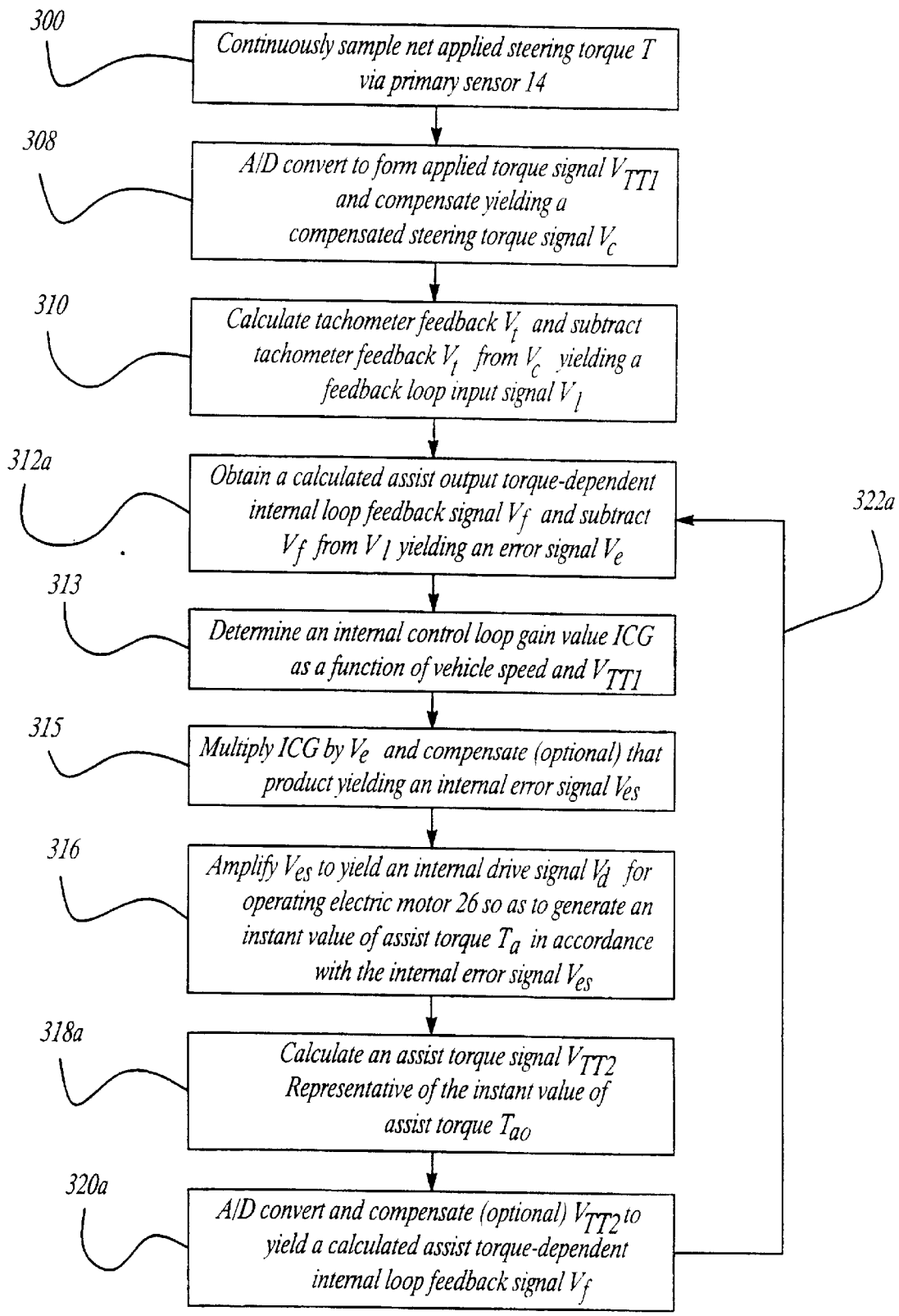
FIG. 3 is a flow chart of the control applied by a portion of the preferred embodiment of the present invention during operation.

In any case, a better understanding of the details of the feedback and servo control provided in the system 710 of the present invention may be had with reference to the flow chart shown in FIG. 3. Such feedback and servo control is provided in the path between the application of an applied steering torque $T_s$ to the steering wheel 12 and the powered assist to steering provided by speed reduction means 712, that is, between net applied steering torque T and the steering force assist provided to the dirigible wheels 13 by the output node 716. More particularly, the electronic control means 32a employs the calculated assist torque signal $V_{TT2}$ to establish an internal servo control loop, such as an internal servo control loop 322a over the electric motor 26. This is achieved by establishing such an internal servo control loop 322a between an input signal $V_i$ derived from the application of the net steering torque T, and a calculated value substantially equal to the assist torque applied to the supplemental pinion shaft 178, and thus, a value nominally linearly related to the assist force applied to the dirigible wheels 13. In this manner, the electronic control means 32a can achieve a substantially linear relationship between the applied steering torque $T_s$ and the powered assist to steering supplied by the speed reduction means 712.

More particularly, in establishing such feedback and servo control, the net applied steering torque T is continuously sampled by the primary applied steering torque sensor 14 at block 300 of the flow chart shown in FIG. 3. The generation of the assist torque $T_a$ derived from the electric motor 26 at block 316 results from the supply of a net torque $T_{net}$ to the input node 714 of the speed reduction means 712, in turn resulting in a powered assist to steering the dirigible wheels 13 of the host vehicle.

The flow chart shows the significant steps performed by the system 710 of the present invention between the application of net applied steering torque T to the steering shaft 172 (resulting from the application of the applied steering torque $T_s$) and the powered assist to steering. The electronic control means 32a A/D converts an analog signal provided by the primary applied steering torque transducer 14 to a digital applied torque signal $V_{TT1}$ representative of net applied steering torque T delivered to the steering shaft 172 and provides a compensation of the signal $V_{TT1}$ (that is, a compensation of the magnitude of the applied net steering torque T) at block 308, yielding a compensated steering torque signal $V_c$. The specific nature and purpose of this compensation is described in more detail below.

Next, at block 310 actuation speed calculating means operatively comprised within the electronic control means 32a provides a tachometer signal $V_t$ representative of rotational speed of the host vehicle's steering wheel 12 and the electric motor 26, and thus, steering movement of the dirigible wheels 13. The electronic control means 32a then modifies the compensated steering torque signal $V_c$ in dependence upon the tachometer signal $V_t$. As mentioned above, computation of the actuation speed can conveniently comprise calculation of the rotational speed of the electric motor via the product of the motor's back EMF and the inverse of the motor's voltage constant. The calculated actuation speed, then, is actually calculated tachometer information monitoring the rotational speed of the electric motor 26. (Alternately, the actuation speed could be obtained via a tachometer 62 measuring the rotational speed of at least one of the vehicle steering wheel 12 and the electric motor 26.) As described below, the purpose of the feedback information is to provide tactile damping of the system 710 as controlled by the driver. In addition, the actuation speed information can also be used to provide a redundant signal, which permits monitoring of system safety (but not direct system control) in a similar manner to that permitted by the redundant applied steering torque sensor 15.

Without regard to its source, the tachometer information is provided to the electronic control means 32a at block 310 of the flow chart shown in FIG. 3 as a tachometer signal $V_t$. The electronic control means 32a then subtracts this tachometer signal $V_t$ from the compensated steering torque signal $V_c$ to yield an input signal $V_i$ for the internal feedback loop 322a. The internal feedback loop 322a starts at block 312a at which the electronic control means 32a obtains a calculated assist torque internal loop dependent feedback signal $V_f$ which is dependent upon the calculated assist torque signal $V_{TT2}$ and generated later in the loop 322a. Also at block 312a, the electronic control means 32a subtracts this calculated assist torque internal loop dependent feedback signal $V_f$ from the input signal $V_i$ to yield an error signal $V_e$. The electronic control means 32a then determines an internal control loop gain value ICG (block 313). The gain value ICG is a function of at least the speed of the host vehicle and the steering torque signal $V_{TT1}$ (in a manner to be explained below), and can be obtained from a look-up table or can be made as a real-time calculation according to algorithms presented below. (The electronic control means 32a could, of course, use a series of net torque-effort curves stored in look-up tables for directly acquiring a target assist torque value, but it is believed that this is a less than satisfactory way to implement the principles of the present invention as will become clear below.)

Once the internal control loop gain value ICG is determined, the electronic control means 32a operates the electric motor 26 so as to generate an instant value of steering assist torque $T_a$ in accordance with the product of the error signal $V_e$ and the gain value ICG. More particularly, the electronic control means 32a multiplies the gain value ICG by the error signal $V_e$ to yield an internal error signal $V_{es}$ (block 315). The electronic control means 32a then amplifies the internal error signal $V_{es}$ to yield an internal drive signal $V_d$ for operating the electric motor 26 (block 316). Finally, the electric motor 26 provides the net torque to the input node 714 which results in the actual steering assist torque $T_a$ being present at the output node 716.

As indicated above, such compensated operation of the electric motor 26 driving the speed reduction means 722 results in the application of supplemental thrust to the gear rack 17 via the supplemental pinion shaft 178 and rack teeth, and a consequent assist to vehicle steering. The electronic control means 32a, however, also calculates at block 318a, the instant value of an assist torque signal $V_{TT2}$. At block 320a, the electronic control means 32a then compensates the assist torque signal $V_{TT2}$, yielding the calculated assist torque internal loop dependent feedback signal $V_f$ mentioned above. (Such compensation is usually performed at this point, but instead, alternate compensation at block 315 could be utilized.) The calculated assist torque internal loop dependent feedback signal $V_f$ is then fed back via loop 322a to block 312a enabling block 312a to yield the error signal $V_e$ by subtraction of the feedback signal $V_f$ from the input signal $V_i$ to the internal closed servo control loop 322a, from which the internal drive signal $V_d$ is derived.

As further indicated above, the electronic control means 32a calculates a tachometer signal $V_t$ equal to $\theta_m$ s/$K_c$, in which $\theta_m$ is the rotational position of the electric motor 26 and s is the first-order Laplace variable whereby the product $\theta_m$ s is the rotational speed of the electric motor 26, while 1/$K_c$ is a tachometer feedback damping factor. The electronic control means, 32a subtracts $\theta_m$ s/$K_c$ (that is, $V_t$) from the compensated signal $V_c$ generated by the primary applied steering torque sensor 14 and the electronic control means 32a and employs the resulting difference as the input signal $V_i$ to the internal closed servo control loop 322a.

The steps outlined in the flow chart shown in FIG. 3 enable the electronic control means 32a to achieve a substantially linear relationship between the net applied steering torque T and the powered assist to vehicle steering supplied by the system 710, and in particular, by the speed reduction means 712. It should also be noted, however, that the system 710 also generates the torque signal $V_{TT1}$ in response to inputs at the dirigible wheels 13 of the host vehicle, for example, from jostling from chuckholes or the like. These perturbations could be considered as inputs (not shown) to the flow chart of FIG. 3 at block 316a, and as outputs at block 300. As explained in detail below with regard to the block diagram shown in FIGS. 4A–4C, such perturbations are handled well by the system 710 of the present invention.

The primary principle of the present invention, employing a torque- or force-dependent error signal for establishing internal servo control over the drive motor of a power steering system, is decidedly different from and has decidedly more stability in operation, and is therefore superior to the prior use of the prior method of establishing a delivered torque target therefore. As described in more detail below, the use of a torque- or force-dependent error signal for closed loop feedback control effectively decouples the spring-like steering load, that all power steering systems are subjected to, from the moment of inertia of the electric motor 26.

This principle allows the power steering systems 710, 760, 810 and 910 of the present invention to counteract a specific resonance present in vehicles equipped with EPS systems, whose existence appears not to have been appropriately dealt with in the automotive industry: an electro-mechanical resonance occurring predominantly between the moment of inertia $J_m$ of the rotor of the drive motor of a power steering system on the host vehicle (here, the rotor of electric motor 26) and a system spring rate presented by the steering load stiffness presented to the power steering system by the host vehicle. In the system 710, the electronic control means 32a employs the internal feedback loop 322a to counteract this resonance via appropriate servo control of the electric motor 26.

More particularly, the electronic control means 32a treats the electro-mechanical resonance as a resonance between a mass element predominated by the moment of inertia of the rotor of the electric motor 26 and a theoretical spring element dominated by tire loading characteristics associated with the tires 21. In system 710, the electronic control means 32a employs the calculated assist torque $T_a$ in the internal feedback loop 322a in order to control the electric motor 26 so that the speed reduction means 712 is not driven in harmony with the mechanical resonance. The dominant tire characteristics are determined by the tire side walls 23 of the tires 21 of the dirigible wheels 13, and by the tire patches 19 where the tires 21 contact the surface on which the host vehicle is located. At moderate to high vehicle speed, the dominant tire characteristics can be considered as arising from the product of the front end centrifugal force of the host vehicle and the effective caster offset of the dirigible wheels 13.

In general, the various compensations mentioned above are intended to isolate the above described electro-mechanical resonance within the internal control loop and counteract other specific resonances which are believed to exist in the host vehicle and which affect steering. The compensations mentioned above and described in more detail below are believed to be dependent upon the specific structural characteristics of the steering gear, chassis, suspension and dirigible wheels of the particular host vehicle on which of the system 710 of the preferred embodiment (as well as the systems 760, 810 and 910 of the alternate preferred embodiments) is employed. The effect of particular compensation constants can be effectively modeled by a variety of readily available computer programs. While some amount of modeling or experimentation with compensation will be required in order to meet any particular or perceived system resonance, the amount of such modeling or experimentation is believed not to be undue, but is instead believed to be the routine implementation of engineering skills once a person skilled in the art has assimilated the teachings comprised within the description of the block diagrams shown in FIGS. 4A–4C, 8A–8C, 12A–12C and 16A–16C and has assigned values to all of the above-described structural characteristics of the host vehicle.

Figure 4A:
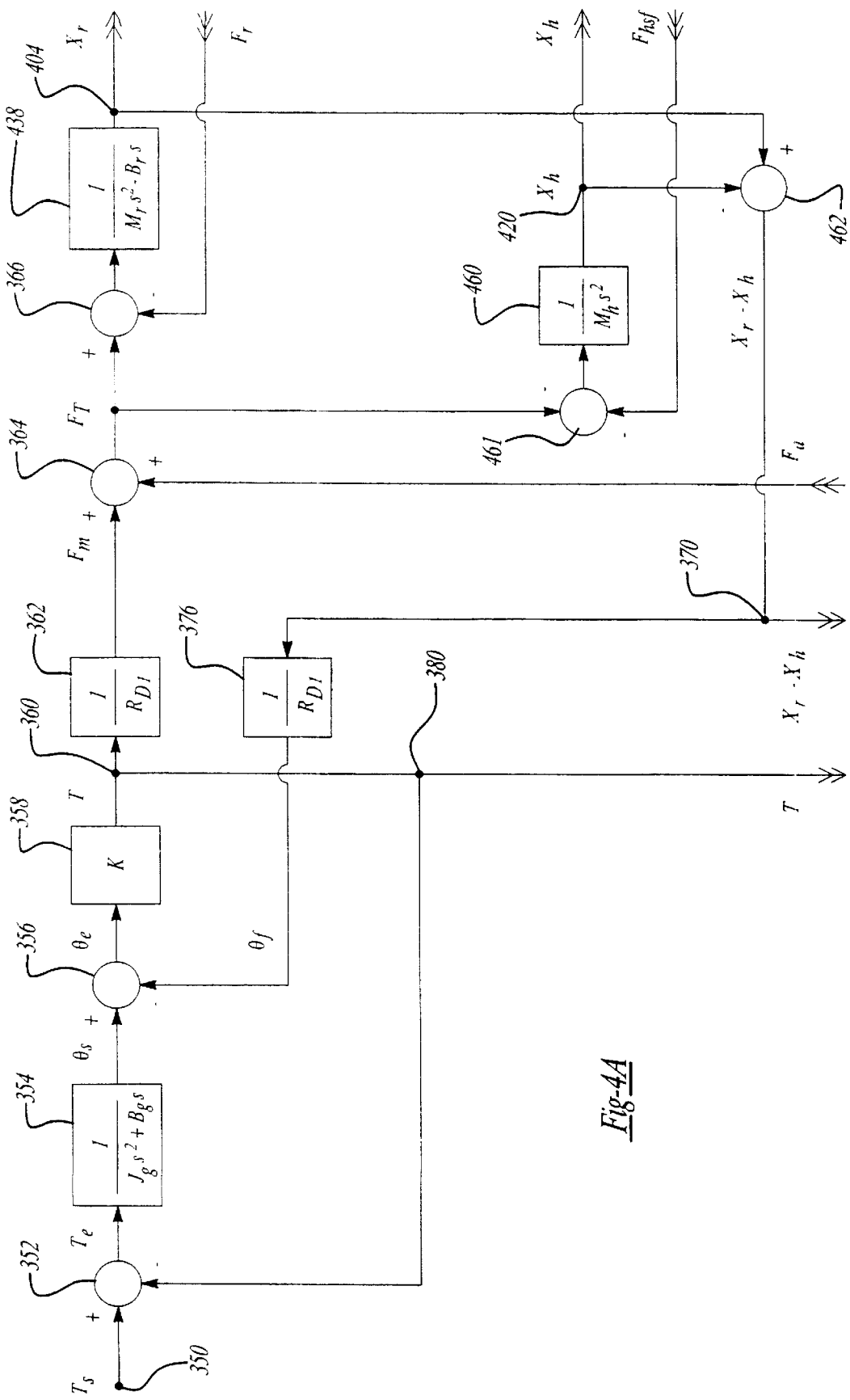
FIGS. 4A–4C constitute a single block diagram representing various mechanical, electrical and electronic connections and relationships existing in a host vehicle which includes in it the preferred embodiment of the present invention.
Figure 4B:
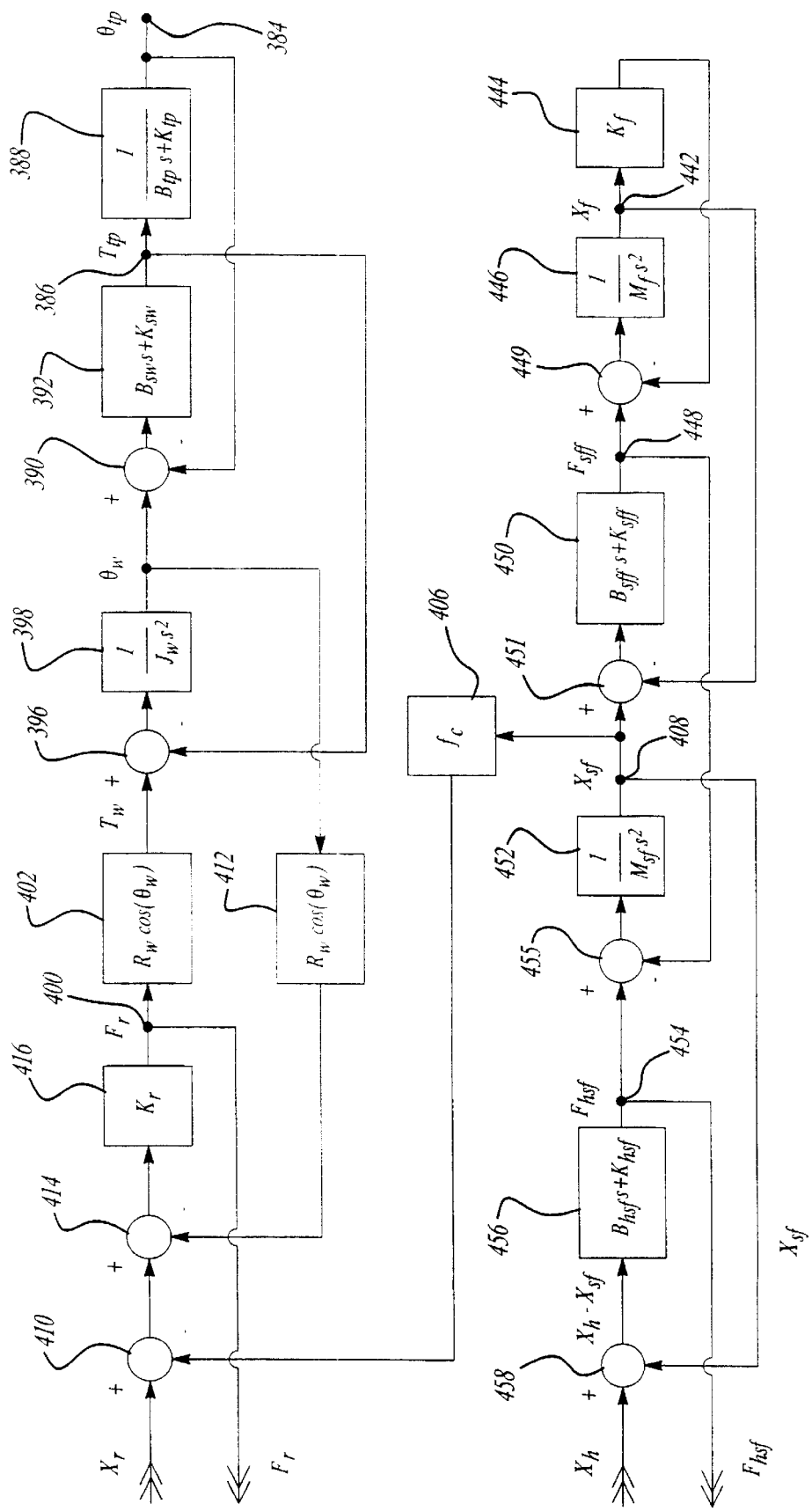
Figure 4C:
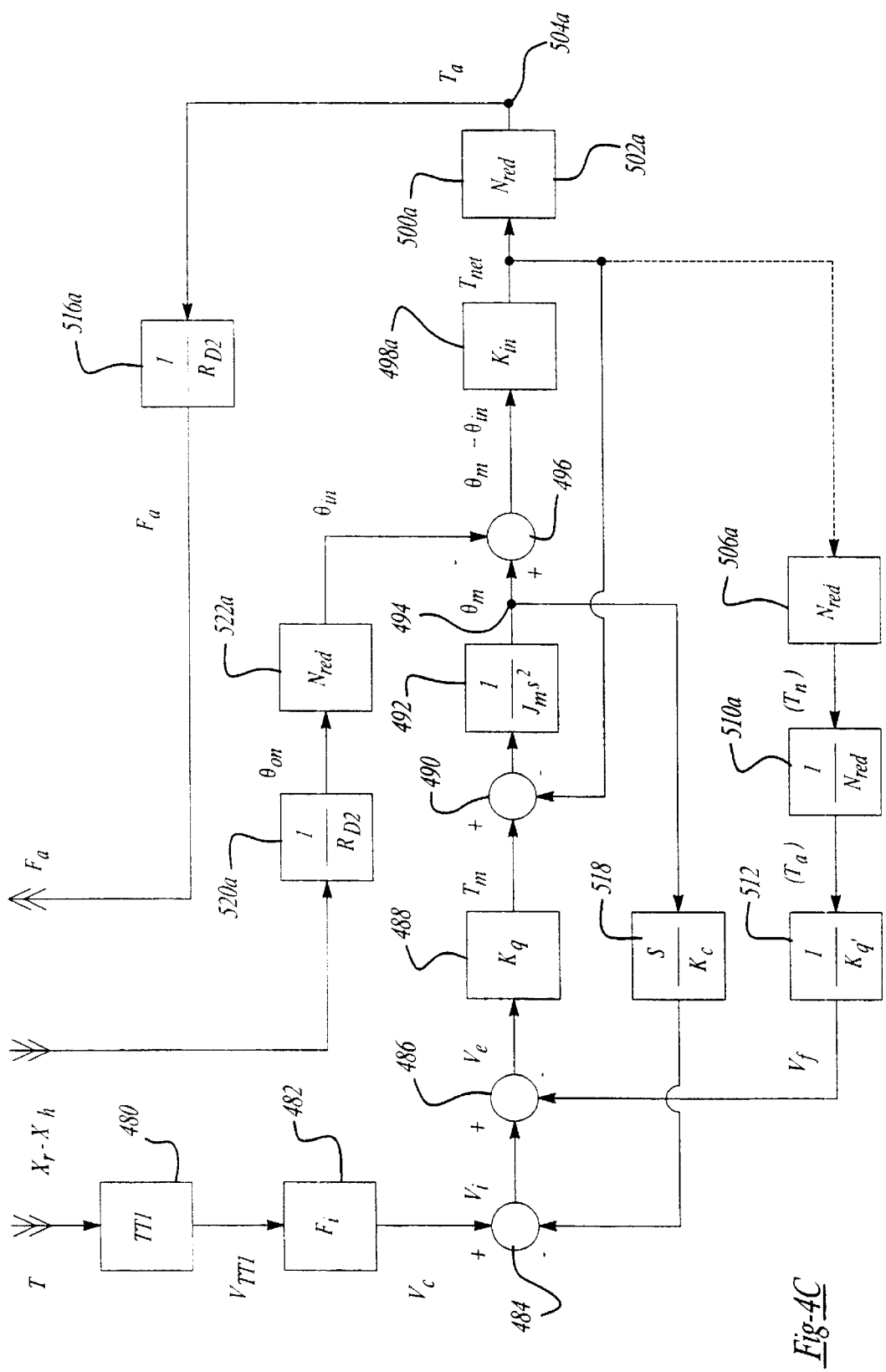

Specifically, FIGS. 4A–C constitute a single block diagram depicting various mechanical, electrical and electronic connections and relationships existing in a host vehicle which control the dynamic linkage between the actual torque $T_s$ applied by a vehicle operator to the steering wheel 12, and the output tire patch steering angle $\theta_{tp}$. (This block diagram is comparable to the block diagram 80 disclosed in FIG. 3 of the Phillips '715 patent.) Such a block diagram is useful in that it allows an assessment of the response of any represented system to a perturbation arising anywhere between the system input (here, the steering torque $T_s$) and the tire patches 19 (including jostling of the dirigible wheels 13 by rough pavement, chuckholes or the like). The arrangement of the power steering system 710 according to the present invention isolates the moment of inertia $J_m$ of the electric motor 26 in the internal servo control loop 322a from the pinion-rack interface, and thus from the steering wheel 12 and the driver of the host vehicle.

The block diagram includes a terminal 350 (FIG. 4A) at which the actual torque $T_s$ applied to the steering wheel 12 by the vehicle operator serves as an input to the block diagram. The block diagram also includes a terminal 384 providing an output corresponding to the tire patch steering angle $\theta_{tp}$. The designation of terminals 350 and 384 as being respectively associated with an input and an output of the block diagram is arbitrary, however, since the block diagram also provides for an analysis of a perturbing force applied to the terminal 384 (for example, from jostling of the dirigible wheels 13 from road roughness or the like) and experienced by the driver at terminal 350. Therefore, while the block diagram of FIGS. 4A–4C will be described in a forward direction from the input terminal 350 to the output terminal 384 (a direction associated with actually steering the vehicle), concomitant relationships in the opposite direction should be assumed to be present. A description of such opposite, concomitant relationships is omitted herein for the sake of brevity.

With particular reference to the portion of the block diagram shown in FIG. 4A, the applied steering torque T measured by the primary applied steering torque sensor 14 is subtracted from $T_s$ at a summing point 352. The algebraic sum ($T_s$–T) is then divided by (or, rather, multiplied by the reciprocal of) the sum of the moment of inertia term $J_s s^2$ of the steering wheel 12 and the front end damping term $B_s s$ at block 354. The block 354 yields a steering wheel angle $\theta_s$ which serves as the positive input to a summing point 356. The negative input to the summing point 356 is a pinion feedback angle $\theta_f$ derived in part from the linear motion $X_r$ of the rack 17 at a terminal 370 described below. The summing point 356 yields an error angle $\theta_e$ equal to ($\theta_s$–$\theta_f$), which when multiplied by the stiffness K (block 358) of the whole steering column connecting the steering wheel 12 to the primary pinion shaft 176 gives the applied steering torque T (at terminal 360) which is present anywhere along the steering shaft 172 or is present at the primary pinion shaft 176 itself. K can be considered as a series gain element in this regard. T is fed back at terminal 380 for subtraction from $T_s$ at the summing point 352 in the manner described above. T is also supplied from terminal 380 to the portion of the block diagram shown in FIG. 4C, for a purpose described in more detail below. Division of T at block 362 by the radius $R_{p1}$ of the pinion gear portion of the primary pinion shaft 176 (or, rather, multiplication by its reciprocal) gives the mechanical force $F_m$ applied to the rack 17 via the primary pinion shaft 176.

The total steering force $F_T$ applied to the rack 17 is generated at summing point 364 and is the sum of the mechanical force $F_m$ applied to the rack 17 via the primary pinion shaft 176 and an assist force $F_a$ provided by the assist force of the particular system modeled by the block diagram. The assist force $F_a$ is derived from the applied steering torque T (again, supplied from terminal 380 to the portion of the block diagram shown in FIG. 4C) in a manner described in more detail below. The assist force $F_a$ is summed with the mechanical force $F_m$ at summing point 364 to yield the total force $F_T$ in the manner indicated above.

The sum of the forces applied to the effective steering linkage radius, $F_r$, is derived at terminal 400 (FIG. 4B) and is subtracted from the total force $F_T$ at a summing point 366. The resulting algebraic sum ($F_T$–$F_r$) from the summing point 366 is divided by (or, rather, multiplied by the reciprocal of) a term $M_r s^2+B_r s$ at block 438, where $M_r$ relates to the mass of the rack 17 and $B_r$ is a parallel damping coefficient term associated with motion of the rack 17. The resulting product is the longitudinal movement $X_r$ of the rack 17 and is available at terminal 404 for two purposes. $X_r$ is supplied from terminal 404 to a summing point 410 (FIG. 4B) for a purpose described in more detail below. $X_r$ also serves as the positive input to a summing point 462, from which the lateral motion $X_h$ of the steering gear housing 66 is subtracted. The algebraic sum ($X_r$–$X_h$) taken at terminal 370 is divided by (that is, multiplied by the reciprocal of) the primary pinion gear radius $R_{p1}$ at block 376 to yield the rotational feedback angle $\theta_f$, which serves as the negative input to the summing point 356 as described above. The algebraic sum ($X_r$–$X_h$) also relates to an angle $\theta_{IN}$ associated with the angular position of the input node 714, which is described in more detail below with respect to FIG. 4C.

The lateral motion $X_h$ of the steering gear housing 66 depends upon $F_T$. more particularly, $F_T$ is a negative input to a summing point 461, from which a force $F_{hsf}$ applied to the sub-frame as a housing-to-sub-frame force is subtracted. (The force $F_{hsf}$ is derived from terminal 454 (FIG. 4B) in a manner described in more detail below.) The lateral housing motion $X_h$ is then determined by the product of the algebraic sum ($-F_T$–$F_{hsf}$) and a control element $1/(M_h s^2)$ at block 460, where $M_h$ is the mass of the steering gear housing 66. $X_h$ is taken from terminal 420 as the negative input to summming point 462 to yield the algebraic sum ($X_r$–$X_h$) in the manner described above.

With reference then to that portion of the block diagram shown in FIG. 4B, the output tire patch steering angle $\theta_{tp}$ at terminal 384 is determined by the sum of torque's $T_{tp}$ applied to the tire patches 19 (located at terminal 386) multiplied by a control element $1/(B_{tp} s+K_{tp})$ shown at block 388, where $K_{tp}$ and $B_{tp}$ are exemplary tire patch torsional stiffness and damping coefficient terms, respectively, determined in a manner explained in more detail below, and s is the first-order Laplace variable. The sum of tire patch torque's $T_{tp}$ at terminal 386 is determined by the difference, achieved via summming point 390, between the average dirigible wheel angle $\theta_W$ and the average output tire patch angle $\theta_{tp}$ multiplied by a control element ($B_{SW} s+K_{SW}$) shown at block 392, where $K_{SW}$ and $B_{SW}$ are torsional stiffness and torsional damping coefficients, respectively, associated with torsional deflection of the tire side walls 23 with respect to the dirigible wheels 13. $\theta_w$ is determined by the difference (achieved via summing point 396) between the sum of the torques $T_w$ applied to the dirigible wheels and the sum of tire patch torques $T_{tp}$, multiplied by a control element $1/(J_w s^2)$ (where $J_w$ is moment of inertia of the dirigible wheels) shown at block 398.

The sum of the torques $T_w$ applied to the dirigible wheels is determined by the sum of the forces $F_r$ applied at the effective steering linkage radius (located at a terminal 400) multiplied by a control element $R_w$ Cos ($\theta_w$) (where $R_w$ is the effective steering linkage radius of the steering knuckles) shown at block 402. The sum of forces $F_r$ is determined in three steps. First, a difference is achieved via summing point 410 between $X_r$ taken from terminal 404 (FIG. 4A) and ($f_c X_{sf}$), the latter being obtained by multiplying (at block 406) the lateral motion $X_{sf}$ of the sub-frame at terminal 408 by a coupling factor $f_c$ between the sub-frame of the system 710 and the dirigible wheels 13. Second, the product $R_w$ Cos($\theta_w$) (obtained by multiplication at block 412) is subtracted from the algebraic sum ($X_r$–$f_c X_{sf}$) at summing point 414. Finally, this difference ($X_r$–$f_c X_{sf}$)–($R_w$ Cos($\theta_w$)) is multiplied by a control element $K_r$ shown at block 416 to yield the sum of rack forces $F_r$, where $K_r$ is the stiffness of the connecting elements between the rack 17 and the dirigible wheels 13. $F_r$ is then returned to summing point 366 and the subsequent derivation of $X_r$ at terminal 404 in the manner described above with respect to FIG. 4A.

The balance of the portion of the block diagram shown in FIG. 4B models the structural elements disposed in the path of reaction forces applied to the steering gear housing 66, and provides the lateral motion $X_{sf}$ of the subframe (terminal 408) and the sub-frame force $F_{hsf}$ (terminal 454) mentioned above. Ultimately, these reaction forces are applied to a substantially "stationary" portion of the host vehicle's frame as a frame reaction force $F_f$ derived from block 444. More particularly, $F_f$ is determined by the product of the displacement $X_f$ of a "mobile" portion of the host vehicle's frame (located at terminal 442) and a control element $K_f$ (where $K_f$ is a stiffness factor separating "mobile" and "stationary" portions of the host vehicle's frame) shown at block 444. $X_f$ is determined by the product of a control element $1/(M_f s^2)$ (shown at block 446) and an algebraic sum $(F_{sff}-F_f)$ generated by summing point 449, where $M_f$ is mass of the "mobile" portion of the host vehicle's frame, and $F_{sff}$ is the force applied to the "mobile" portion of the host vehicle's frame as subframe to frame force, located at terminal 448. $F_{sff}$ is determined by the product of a control element $(B_{sff} s + K_{sff})$ shown at block 450 and an algebraic sum $(X_{sf}-X_f)$ generated by summing point 451, where $K_{sff}$ and $B_{sff}$ are stiffness and series damping coefficient terms, respectively, associated with the interface between the sub-frame and "mobile" portion of the host vehicle's frame. $X_{sf}$ at terminal 408 is determined by the product of control element $1/(M_{sf} s^2)$ shown at block 452, where $M_{sf}$ is the mass of the sub-frame, and an algebraic sum $(F_{hsf}-F_{sff})$ generated by summing point 455, where $F_{hsf}$ is a force applied to the sub-frame as a housing-to-sub-frame force located at terminal 454. $F_{hsf}$ is determined by the product of a control element $(B_{hsf} s + K_{hsf})$ (where $K_{hsf}$ and $B_{hsf}$ are stiffness and series damping coefficient terms, respectively, associated with the interface between the steering gear housing 66 and the sub-frame), shown at block 456, and an algebraic sum $(X_h-X_{sf})$ generated by summing point 458. The positive input to summing point 458, $X_h$, is taken from terminal 420 in FIG. 4A, while the negative input, $X_{sf}$ is taken from terminal 408 in FIG. 4B.

With reference now to that portion of the block diagram shown in FIG. 4C, FIG. 4C completes the block diagram and models the internal servo control loop established by the electronic control means 32a, motor 26, speed reduction means, and calculated net torque. The input $V_i$ to the loop is the positive input to a summing point 486 and is derived in part from the applied steering torque T at terminal 380, less tachometer feedback information such as a subtracted tachometer feedback voltage $V_t$. The output from the loop is an assist torque $T_a$ at terminal 504a which, when multiplied by the reciprocal of the radius $R_{p2}$ of the pinion gear portion of the supplemental pinion shaft 178 yields the assist force $F_a$ summed with the mechanically derived force $F_m$ at summing point 364 in the manner disclosed above.

More particularly, the steering torque T at terminal 380 is converted at block 480 by the primary applied steering torque sensor 14 to an applied torque signal $V_{TT1}$, the sensor conversion constant TT1 being associated with the sensor 14 and having suitable units such as volts/in.-lb. The applied torque signal $V_{TT1}$ is multiplied by suitable compensation $f_i$ at block 482 to yield a compensated signal $V_c$. $V_c$ serves as a positive input to a summing point 484; the negative input to summing point 484 is the tachometer signal $V_t$, derived in a manner described in detail elsewhere herein. The input signal $V_i$ to the servo control loop is thus the algebraic sum $(V_c-V_t)$ from summing point 484.

At the summing point 486, an instant calculated assist torque-dependent feedback signal $V_f$ is subtracted from $V_i$ to yield an error signal $V_e$, $V_f$ being derived in a manner described in more detail below. $V_e$ multiplied by a gain factor $K_q$ in block 488 provides the actual air gap motor torque $T_m$ of the electric motor 26. The gain factor $K_q$ in block 488 is the product of many factors, including the internal control gain value ICG, any compensation, amplification (to drive the electric motor 26) and the torque constant of the electric motor 26.

The actual net torque $T_{net}$, obtained at terminal 500a in a manner described in more detail below, is subtracted from $T_m$ at a summing point 490 to give an algebraic sum $(T_m-T_{net})$ representing net rotor acceleration torque for accelerating $J_m$, the moment of inertia of the electric motor 26. A motor angle $\theta_m$ at terminal 494, associated with the rotor (not shown) of the electric motor 26, is the product of the net rotor acceleration torque $(T_m-T_{net})$ and an inertia term $1/(J_m s^2)$ shown in block 492. The motor angle provides tachometer feedback by being multiplied by a damping factor $s/K_c$ in block 518 (comprising differentiation with respect to time and division by the term $K_c$ described in more detail below in connection with FIG. 21) to yield the tachometer signal $V_t$ supplied as the negative input to the summing point 484.

The motor angle $\theta_m$ serves as the positive input to a summing point 496. The negative input to the summing point 496 is an input node angle $\theta_{IN}$ derived from the algebraic sum $(X_r-X_h)$ at terminal 370. More particularly, the product of the algebraic sum $(X_r-X_h)$ and the inverse of the supplemental pinion gear radius $R_{p2}$ identified in block 520a yields the output node angle, $\theta_{ON}$, of the gear reduction means 722. The product of $\theta_{ON}$ and the reduction ratio of the gear reduction means 722 $N_{red}$ in block 522a in turn yields the input node angle $\theta_{IN}$ to be subtracted from $\theta_m$ at the summing point 496. The resulting algebraic sum $(\theta_m-\theta_{IN})$ from summing point 496 is multiplied by the stiffness $K_{IN}$ shown at block 498a of the shaft and coupling (not shown) which connect the rotor (not shown) of the electric motor 26 to the gear reduction means 722, to yield the net torque $T_{net}$ at terminal 500a. It may be of interest to note that the feedback loop of $T_{net}$ from terminal 500a to summing point 490 has infinite gain at D.C., as the Laplace variable s goes to zero. This is natural, since it implies that the rotor of the electric motor 26 reaches a terminal speed without further acceleration.

The product of $T_{net}$ and the reduction ratio $N_{red}$ at block 502a yields the assist torque $T_a$ at terminal 504a. The further product of the assist torque $T_a$ and the inverse of the supplemental pinion gear radius $R_{p2}$ at block 516a yields the assist force $F_a$ provided by the speed reduction means 712. As indicated above with respect to FIG. 4A, $F_a$ is summed with the mechanical force $F_m$ at the summing point 364 to yield the total steering force $F_T$.

The internal servo control feedback loop in the system 710 of the present invention is established between $V_i$ as the positive input to the summing point 486 and the instant calculated value of assist torque $T_a$ at terminal 508a. Upon determining the instant value of assist torque $T_a$ via calculation (including multiplication by $N_{red}$ in block 506a) as described above, $T_a$ is divided by (that is, multiplied by the reciprocal of) $N_{red}$ at block 510a and by $K_q'$ at block 512 to yield the feedback signal $V_f$ supplied as the negative input to summing point 486. (The dashed line connecting terminal 500a with block 506a serves to indicate that a calculated value rather than an actual measured value has been utilized for this purpose.)

As explained in more detail below, in general $K_q'$ has differing value and compensation, from the value and any compensation associated with $K_q$ in block 488. The parenthetical indications of $T_a$ at terminal 508a and $T_{net}$ after block 510a show the relationships that exist at those locations. Unlike the other parameters identified in the block diagram, however, these parameters should be considered as merely virtual at these locations, because unlike the other parameters, they are not subject to actual measurement at those locations.

The reverse analysis of the block diagrams shown in FIGS. 4A–C from $\theta_{tp}$ at output terminal 384 to $T_s$ at input terminal 350 will, for brevity, be omitted.

The vehicular power steering systems 760, 810 and 910 comprise many of the same features and operate in a similar manner as the vehicular power steering system 710 and, for brevity, the systems 760, 810 and 910 as depicted in the various drawings 5 through 16C will be described in detail only with regard to their functional differences from system 710 as depicted in FIGS. 1 through 4C. Further, similar features will utilize numerical indicators differing only in suffix. For instance, the letters "b", "c" and "d" will be used to identify similar features peculiar to vehicular power steering systems 760, 810 and 910, respectively.

Figure 5:
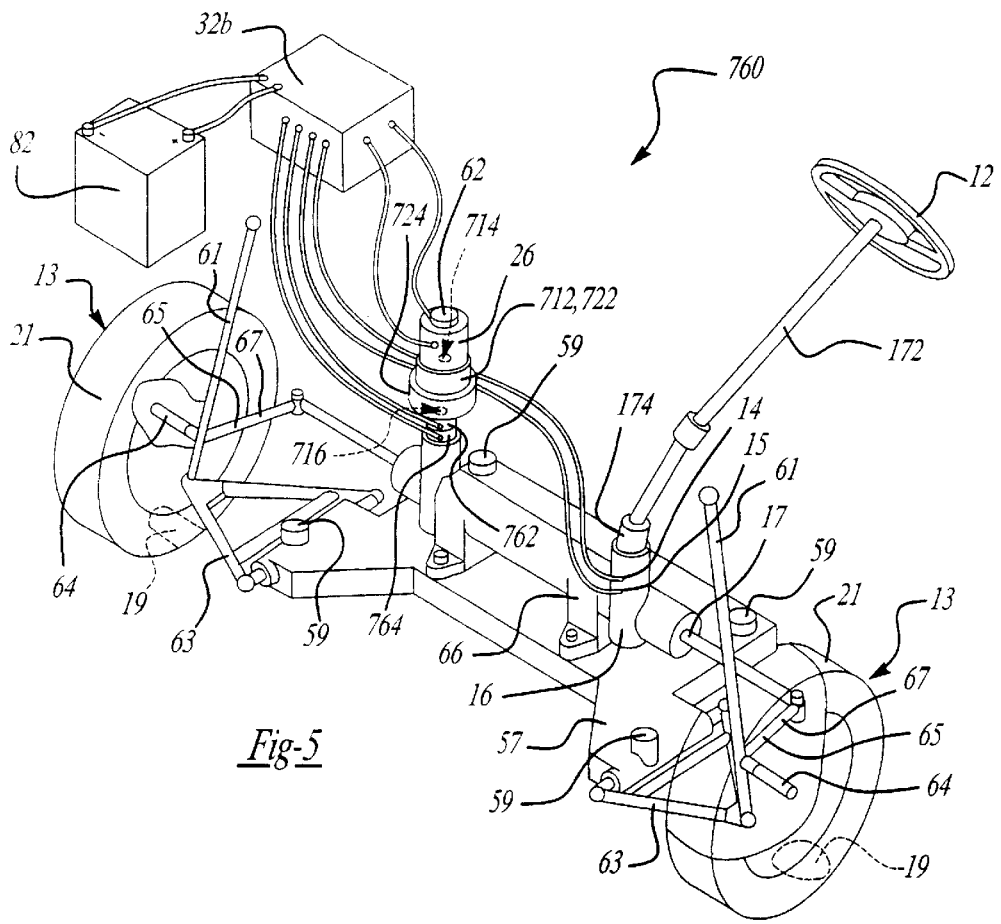
FIG. 5 is a perspective view of a portion of a host vehicle in which the first alternate preferred embodiment of the present invention is incorporated.
Figure 6:
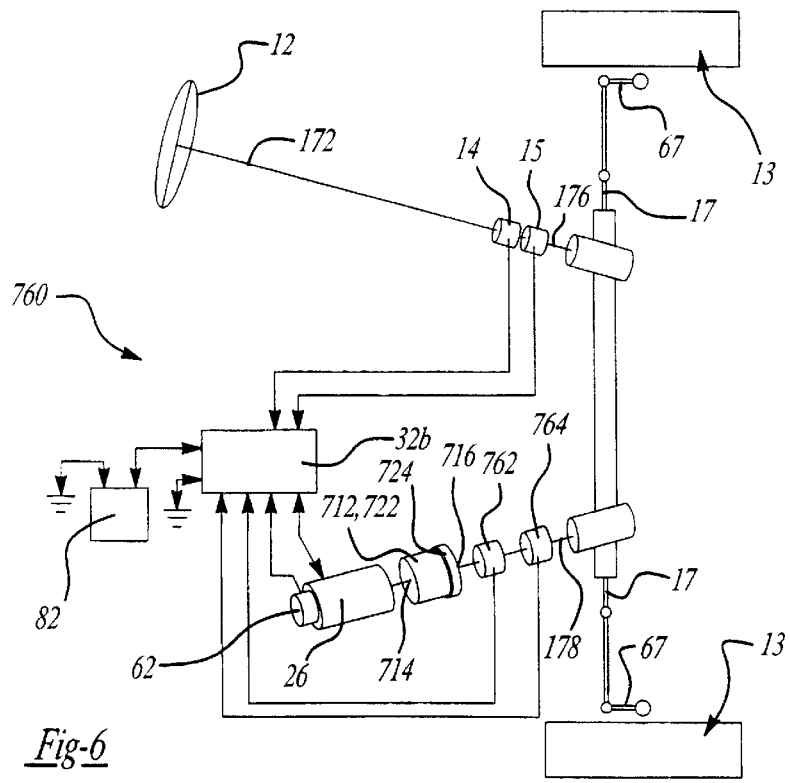
FIG. 6 is a schematic view of the first alternate preferred embodiment of the present invention.

With reference now to FIGS. 5 and 6, the power steering system 760 according to the first alternate preferred embodiment of the present invention is thereshown, in perspective and schematically, respectively, in conjunction with various constituents of the host vehicle in which the system 760 is located. As opposed to the system 710, the system 760 does not utilize a calculated value for the assist torque $T_a$. Instead, the system 760 additionally comprises a primary assist torque sensor 762 for directly measuring the steering assist torque $T_a$ delivered from the output node 716 to the supplemental pinion shaft 178 and providing a primary assist torque signal $V_{TT2}'$ based upon actual measurement. The primary assist torque signal $V_{TT2}'$, which is directly measured at some cost penalty with respect to the simpler system 710, is used for control purposes in the system 760 instead of the calculated net torque signal utilized by the system 710. That cost penalty is offset however, by a considerable improvement in measurement accuracy and system control precision. This is because the effects of backlash and Coulomb friction associated with the speed reduction means 712 are substantially overcome by servo control based upon the primary assist torque signal $V_{TT2}'$ which is representative of torque $T_a$ actually present at the output node 716. (The prime in the designation $V_{TT2}'$ is utilized to indicate that the assist torque signal $V_{TT2}'$ is actually a measured signal.)

For further improvement in safety and reliability, it is preferred that the power steering system 760 also comprise a redundant assist torque sensor 764 for redundantly measuring the steering assist torque $T_a$ present at the output node 716. This provides a check on the failure of the primary assist torque sensor 762, and can be employed by electronic control means 32b to prevent an erroneous voltage signal issued by a failed primary assist torque sensor 762 from generating an inappropriate error signal and causing system runaway.

Figure 7:
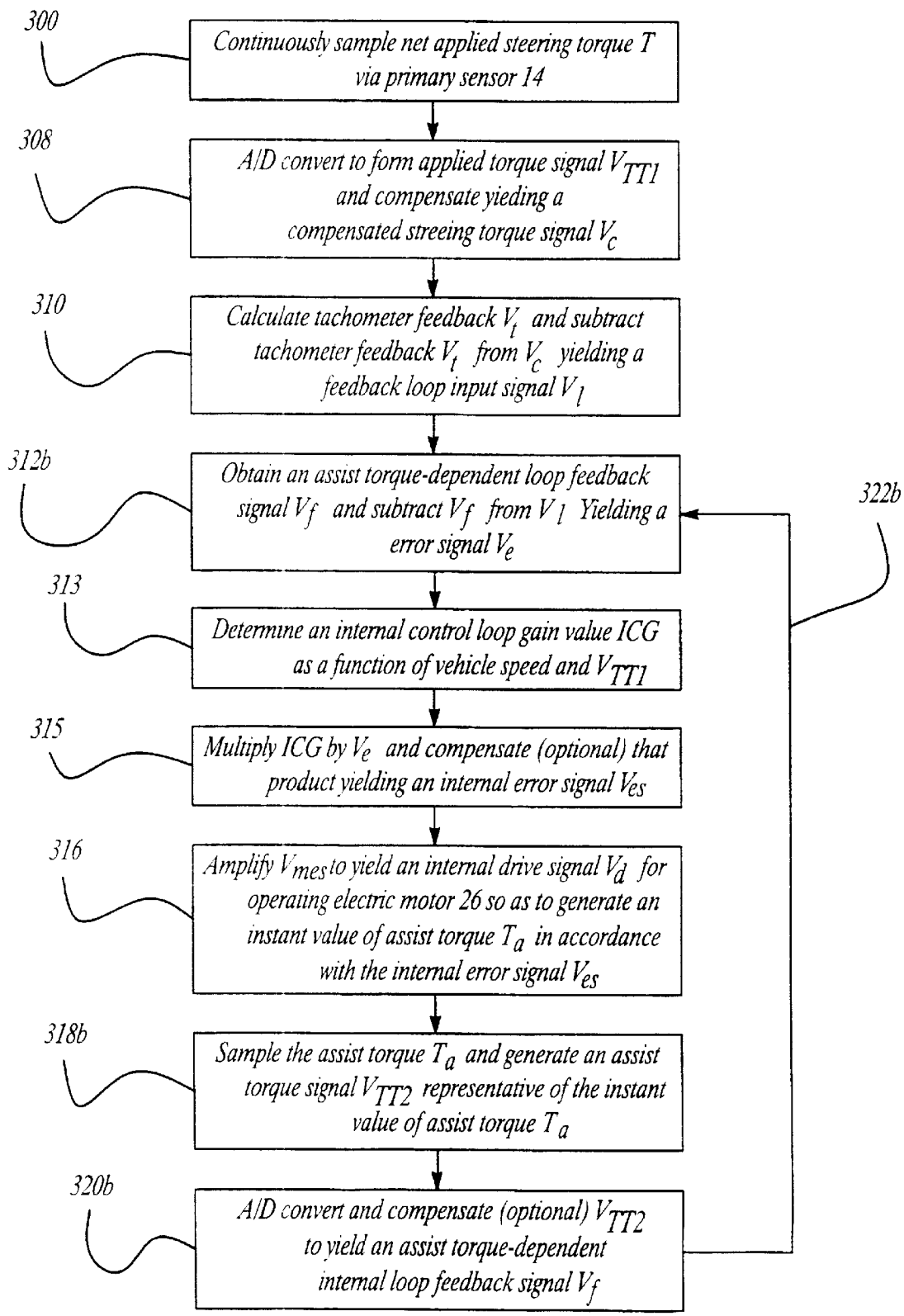
FIG. 7 is a flowchart of the control applied by a portion of the first alternate preferred embodiment of the present invention during operation.

As with system 710, a better understanding of the details of the feedback and servo control provided in the system 760 of the present invention may be had with reference to the flow chart shown in FIG. 7. FIG. 7 is very similar to FIG. 3, differing in detail only in that the signal $V_{TT2}$ of FIG. 3 is replaced in FIG. 7 by a measured primary assist torque signal $V_{TT2}'$ indicative of actual measured assist torque $T_a$. And, the primary assist torque signal $V_{TT2}'$ has been used in conjunction with blocks 318b and 320b, and internal servo control loop 322b. Thus, the control functions of electronic control means 32b, including the use of the signals $V_{TT1}$ and $V_{TT2}'$, are substantially the same as those described above for electronic control means 32a, and thus, further description of FIG. 7 will be omitted for brevity.

Figure 8A:
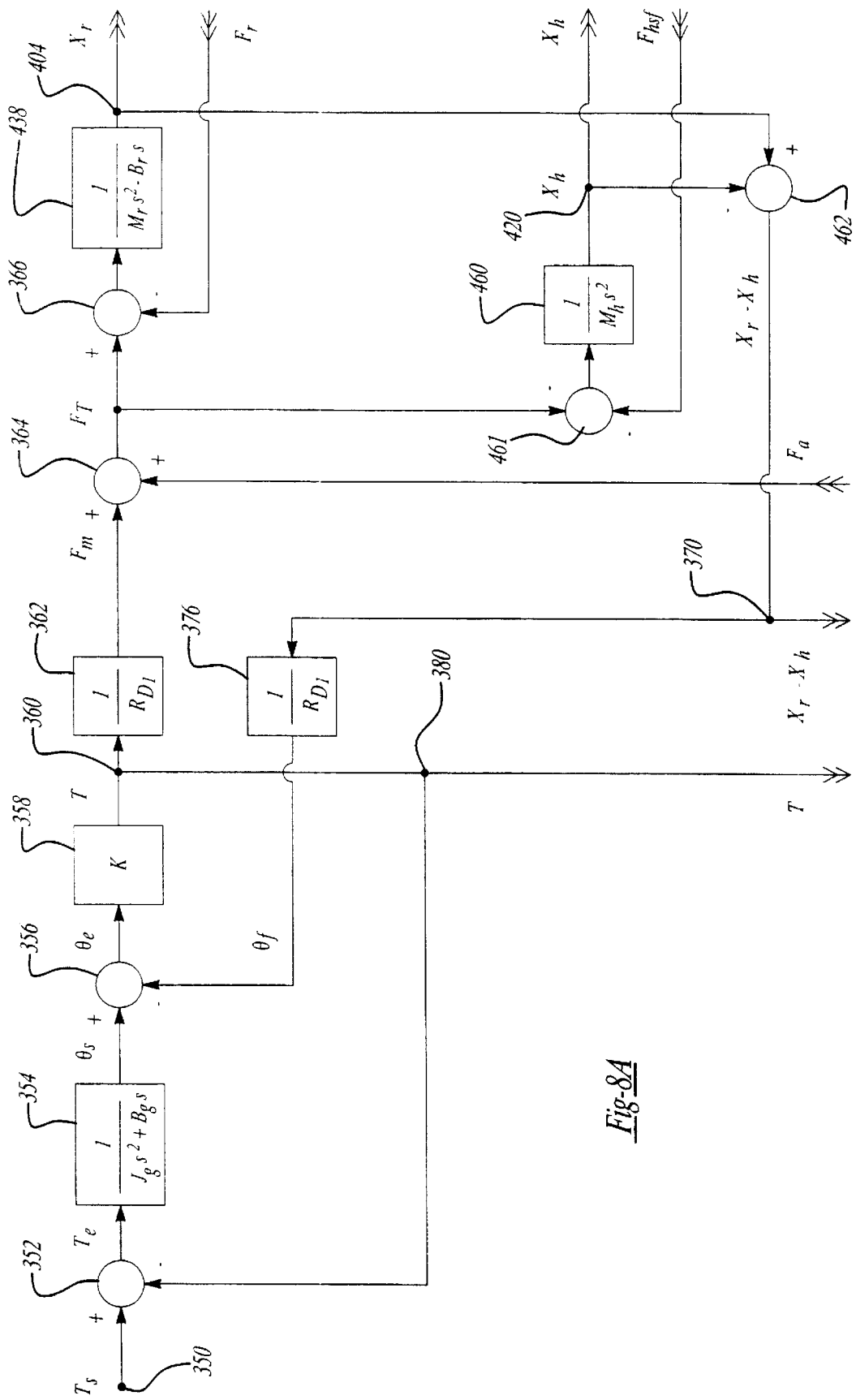
FIGS. 8A–8C constitute a single block diagram representing various mechanical, electrical and electronic connections and relationships existing in a host vehicle which includes in it the first alternate preferred embodiment of the present invention.
Figure 8B:
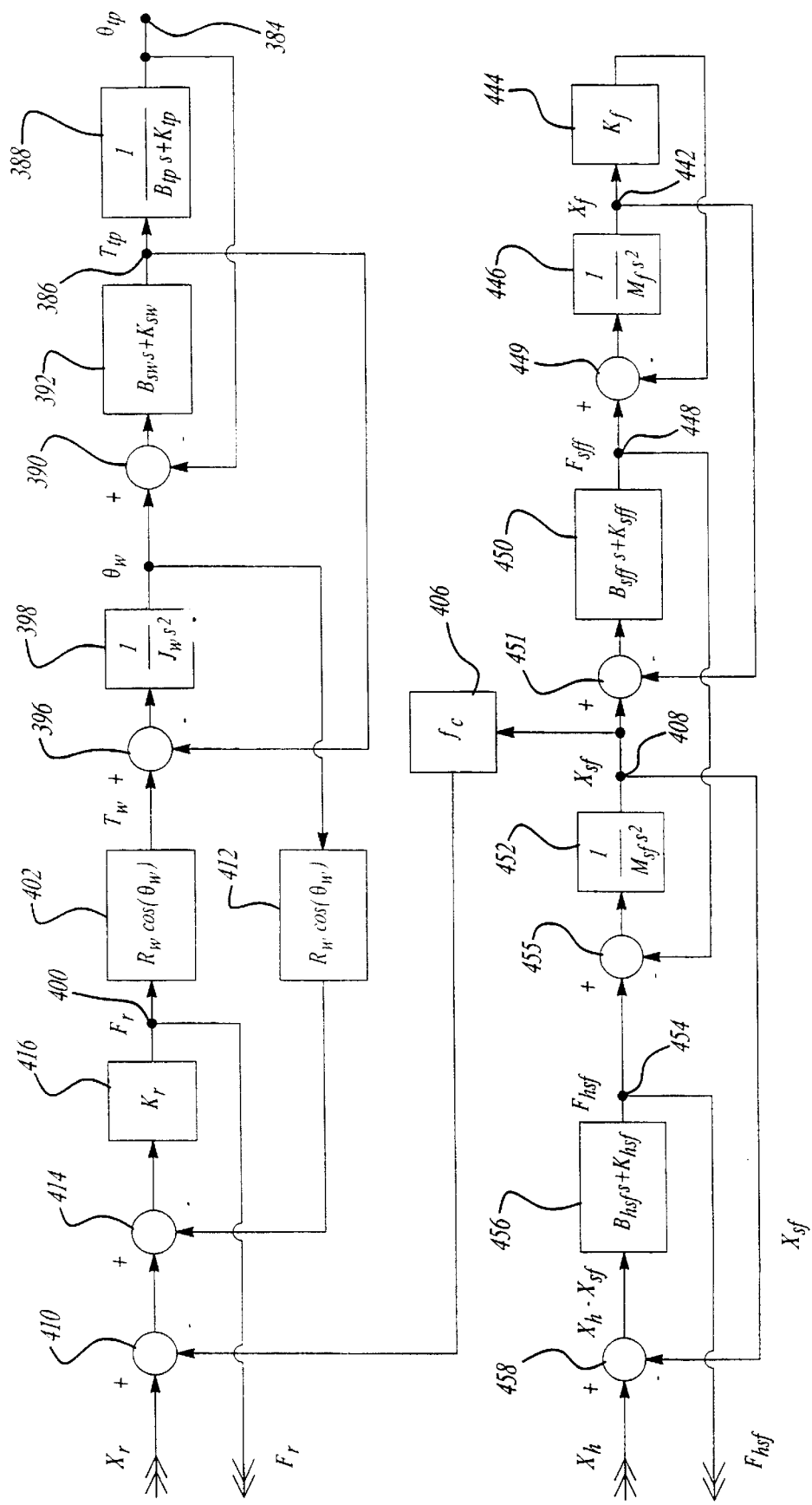
Figure 8C:
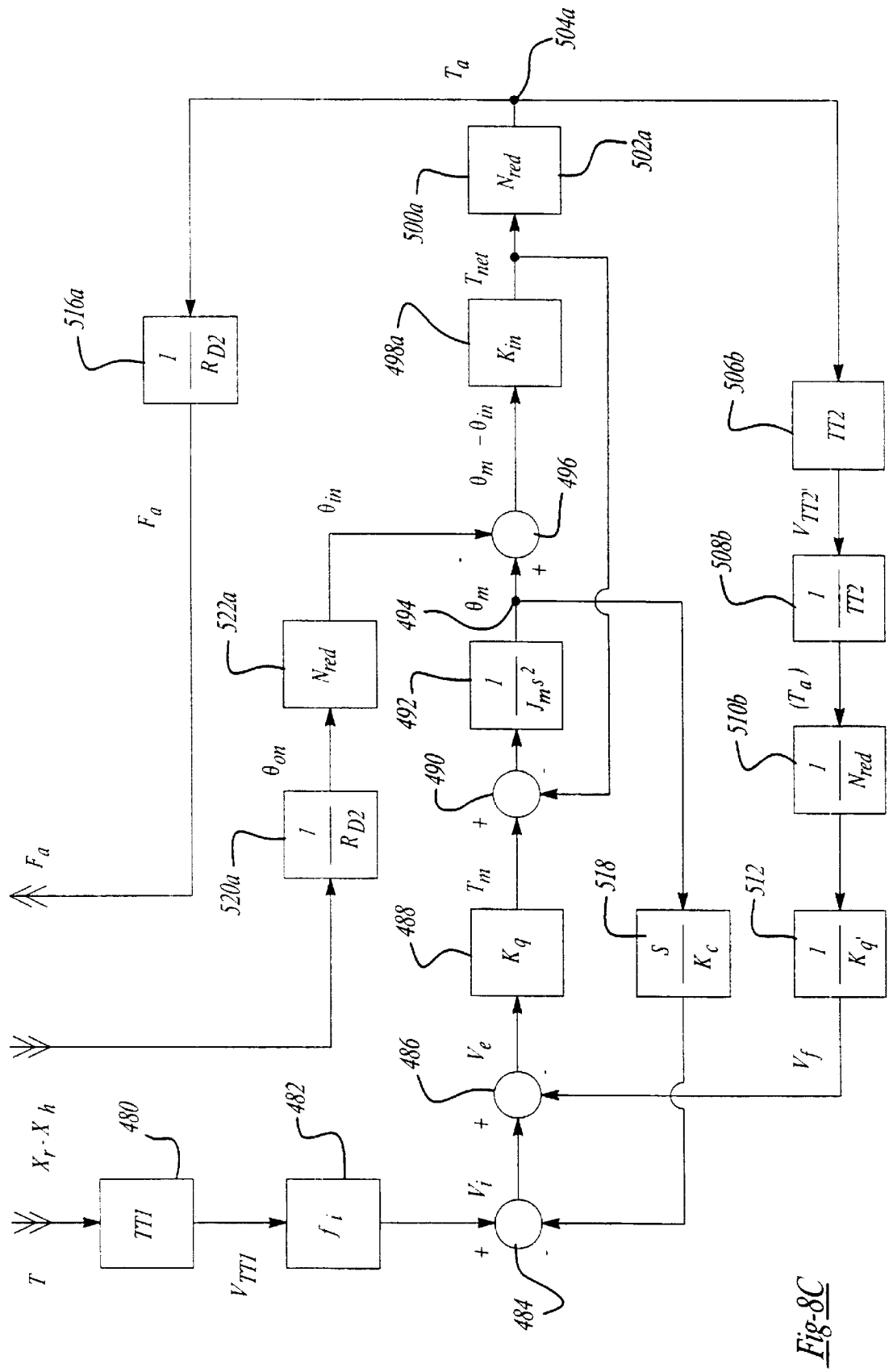

Similarly, the block diagram depicting the operation of system 760 shown in FIGS. 8A–8C is almost the same as that depicting the operation of system 710 shown in FIGS. 4A–4C. Specifically, the assist torque $T_a$ is multiplied by an appropriate conversion factor TT2 at block 506b to yield a torque transducer assist torque signal $V_{TT2}'$. The assist torque signal $V_{TT2}'$ is then divided by (that is, multiplied by the reciprocal of) the conversion factor TT2 at block 508b to form the virtual assist torque signal $T_a$ to next be divided by (that is, multiplied by the reciprocal of) $N_{red}$ in block 510b as is described above with respect to FIG. 4C. Other than these few details, the block diagrams and their functions are the same. Thus, further description of FIGS. 8A–8C will also be omitted for brevity.

With reference now to FIGS. 9A, 9B and 10, the power steering system 810 according to the second alternate preferred embodiment of the present invention is thereshown, in perspective and schematically, respectively, in conjunction with various constituents of the host vehicle in which the system 810 is located. In the system 810, a torque summing means 812 is located along the steering column 814 of the host vehicle. The torque summing means 812 includes an input node 816 driven by the steering wheel 12 via an upper portion 172u of the steering shaft 172 and an upper compliant coupling 174u, an electric motor input node 818 driven by the electric motor 26, and an output node 820 providing steering motion and summed torque to a lower portion 172l of the steering shaft 172 and on to a lower compliant coupling 174l and the pinion shaft 176.

As particularly shown in FIG. 9B, the internal elements of the torque summing means comprise a gear reduction means 822 driving the pinion 824 of a bevel gear set 826. Then the gear 828 of the bevel gear set 826 is coupled to the lower portion 172l of the steering shaft 172 via a clutch 830. Thus, the assisted output torque $T_{ao}$ present in the lower portion 172l of the steering shaft 172, and delivered to the lower compliant coupling 174l and the pinion shaft 176, is equal to the sum of the net applied steering torque T present in the upper steering shaft 172u and an assist torque $T_a$ transmitted by the clutch 830 comprised in the torque summing means 812. (And, of course, the speed reduction means 712 is no longer required and is not present.)

The power steering system 810 comprises at least the primary applied steering torque sensor 14, and preferably, the redundant applied steering torque sensor 15 as well. In addition, the system 810 also comprises at least a primary assisted output torque sensor 832, and also preferably, a redundant assisted torque sensor 834 as well. These various sensors function in a basically similar manner to their respective counterpart sensors 14, 15, 762 and 764 utilized in system 760 except that the primary and redundant assisted output torque sensors 832 and 834 measure the total assisted output torque $T_{ao}$ including both mechanical and assist torque portions rather than simply the assist torque $T_a$ measured by the primary and redundant assist torque sensors 762 and 764 of system 760.

Figure 11:
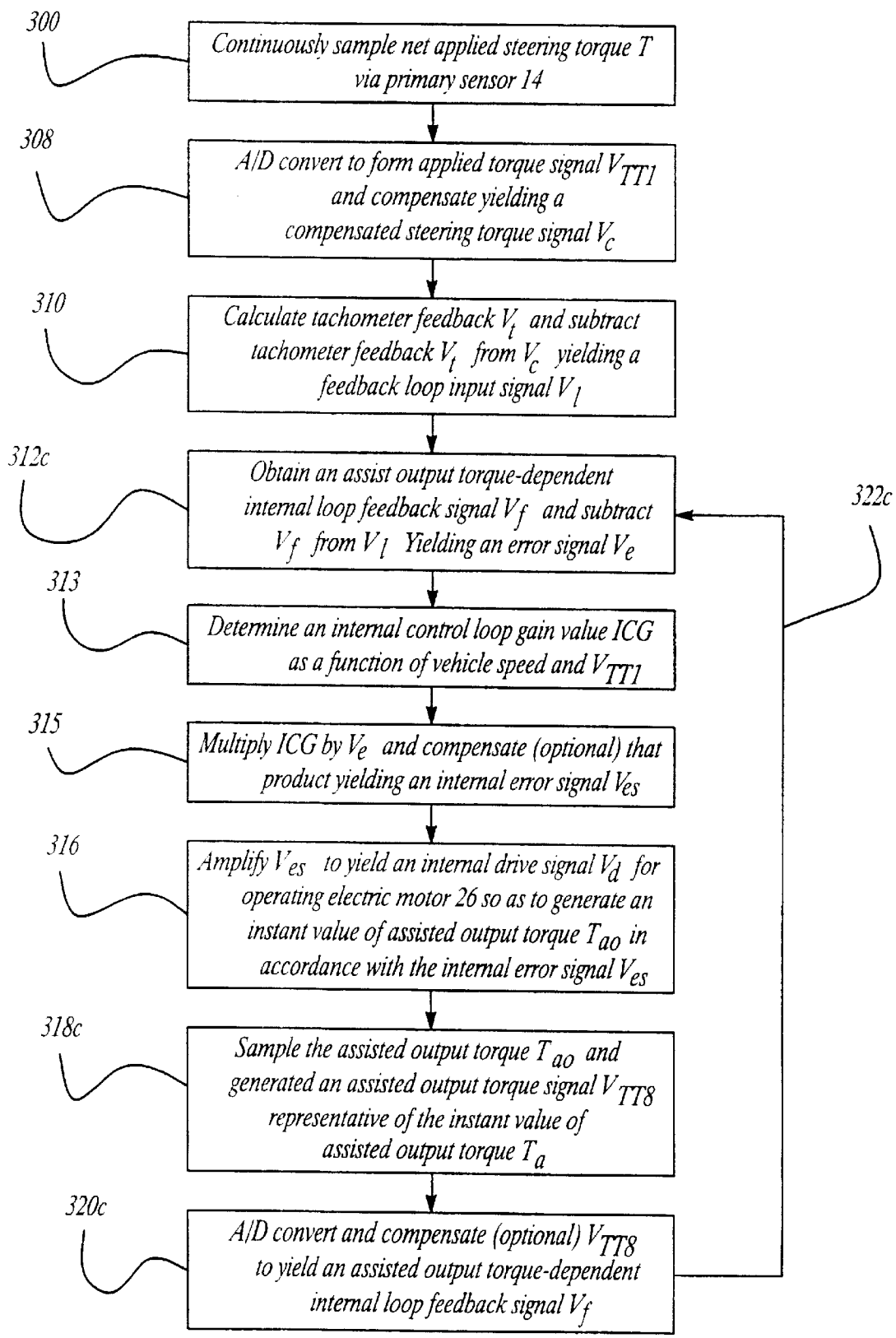
FIG. 11 is a flow chart of the control applied by a portion of the second alternate preferred embodiment of the present invention during operation.

As with the other systems, a better understanding of the details of the feedback and servo control provided in the system 810 of the present invention may be had with reference to the flow chart shown in FIG. 11. FIG. 11 is very similar to FIGS. 3 and 7, differing in detail only in that a primary assisted output torque signal $V_{TT6}$ is utilized and is indicative of the measured assisted output torque $T_{ao}$. And, the primary assisted output torque signal $V_{TT6}$ has been used in conjunction with blocks 318c and 320c, and internal servo control loop 322c. In addition, an expected but fictitious assisted output torque signal $V_{TT7}$ and a redundant assisted output torque signal $V_{TT8}$ are utilized for the same functions as the signals $V_{TT4}$ and $V_{TT5}$ in the system 760. Thus, the control functions of electronic control means 32c, including the use of the signals $V_{TT1}$ and $V_{TT6}$ (as well as the signals $V_{TT3}$, $V_{TT7}$ and $V_{TT8}$) are substantially the same as those described above for electronic control means 32a and 32b, and thus, further description of FIG. 11 will be omitted for brevity.

Figure 12A:
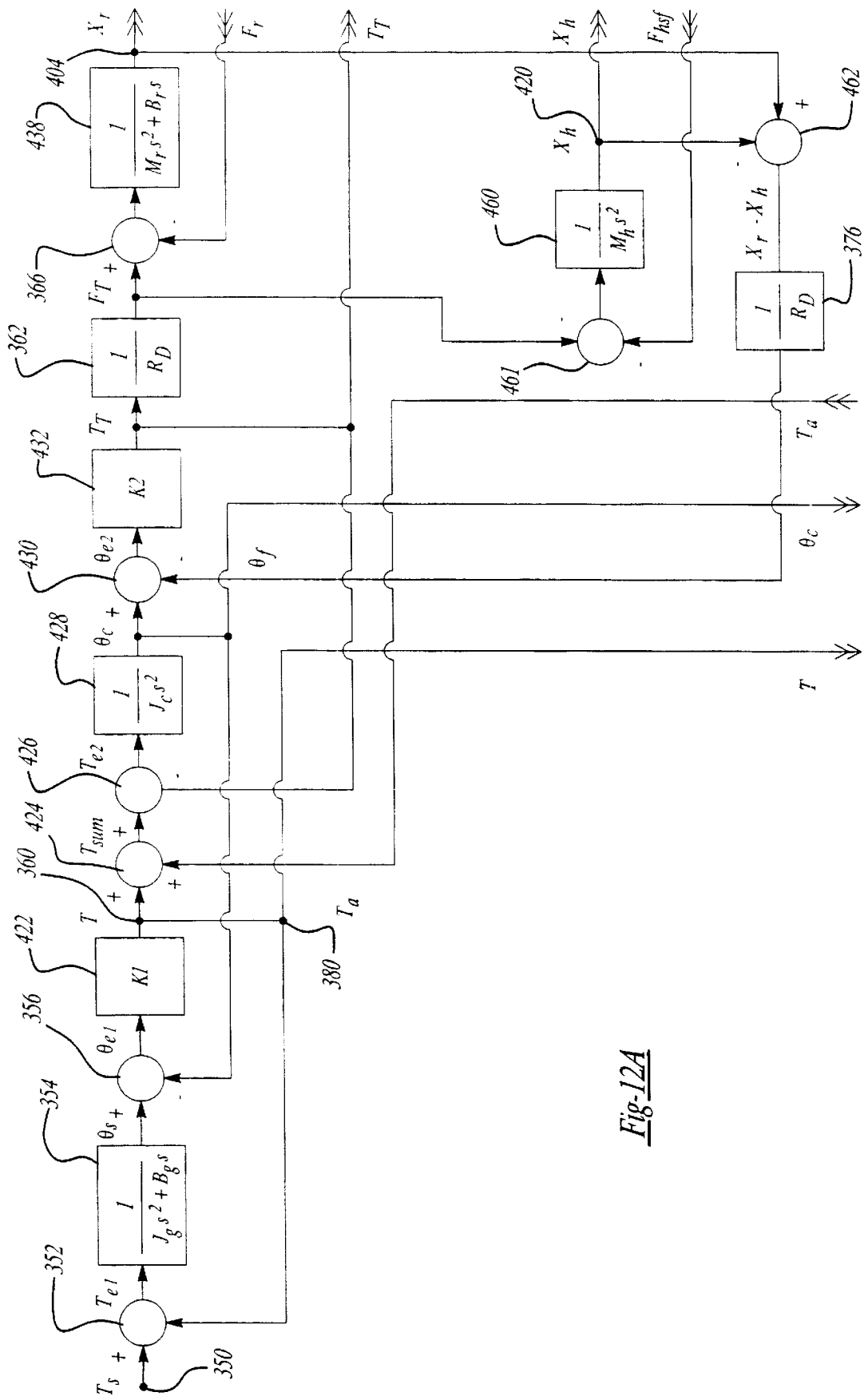
FIGS. 12A–12C constitute a single block diagram representing various mechanical, electrical and electronic connections and relationships existing in a host vehicle which includes in it the second alternate preferred embodiment of the present invention.
Figure 12B:
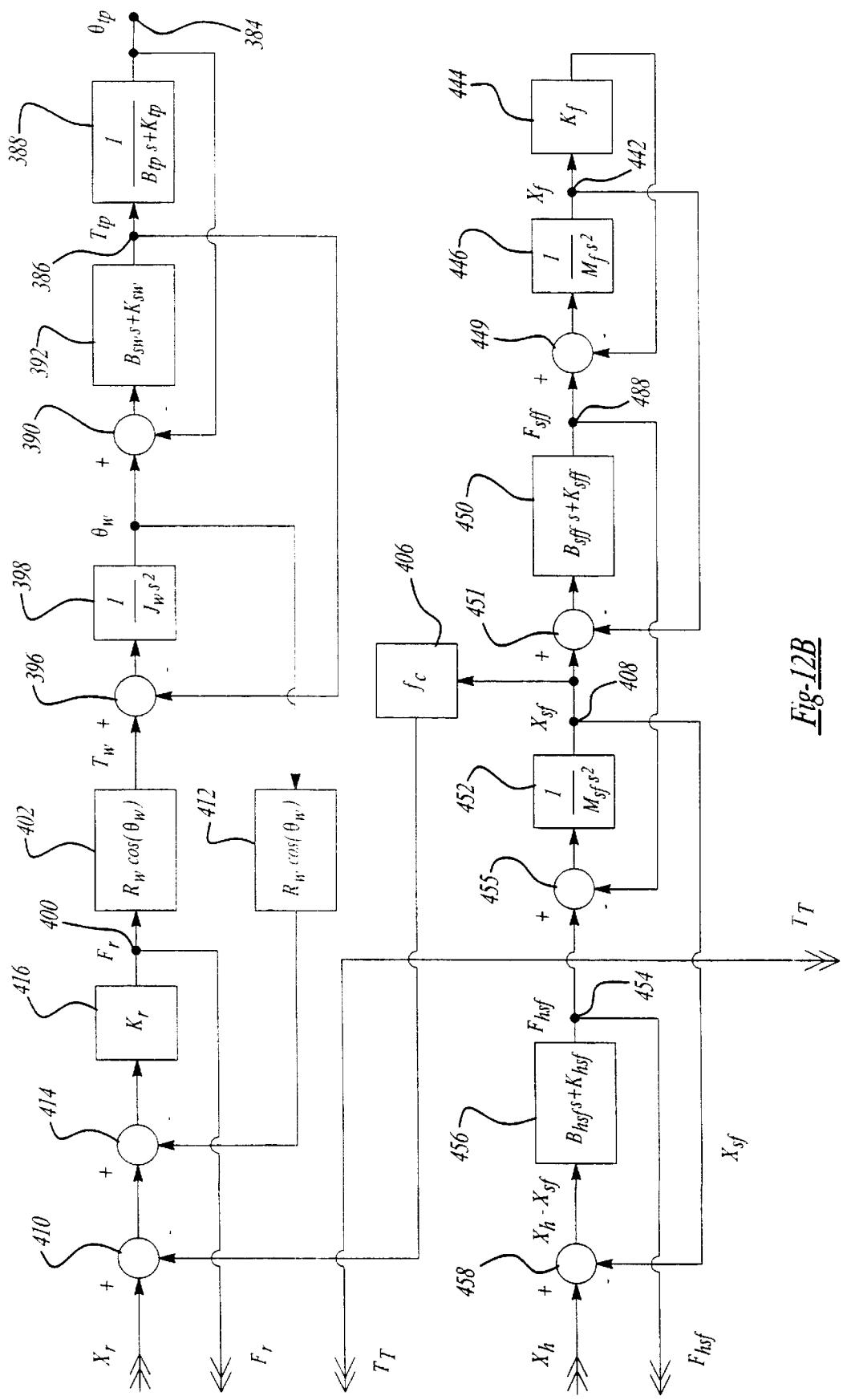
Figure 12C:
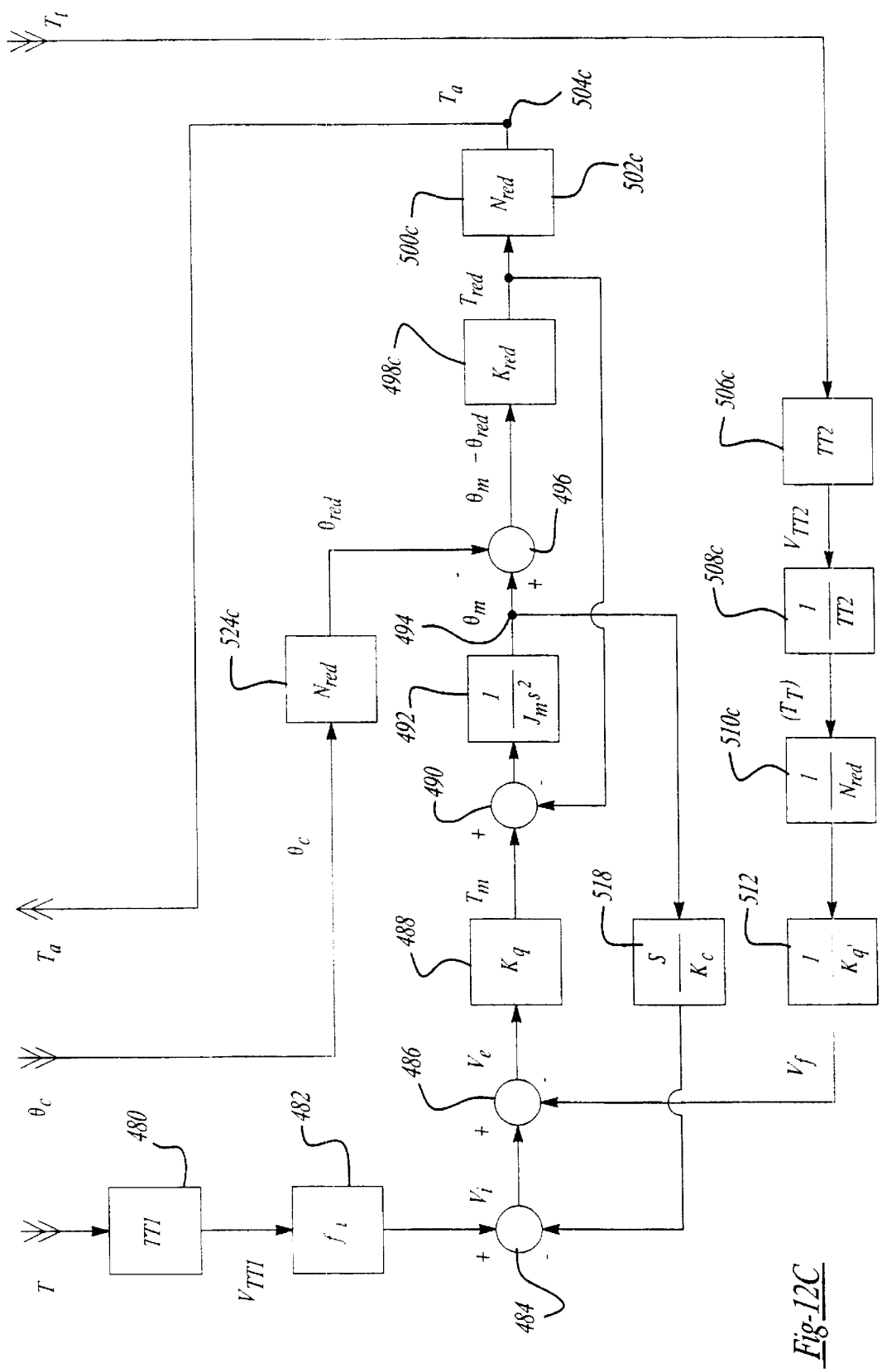

On the other hand, the block diagram depicting the operation of system 810 shown in FIGS. 12A–12C differs significantly as compared to those block diagrams depicting the operation of systems 710 and 760 as respectively shown in FIGS. 4A–4C and 8A–8C. Specifically, the negative input to the summing point 356 is a clutch angle $\theta_c$ indicative of the instant angular position of the clutch 830. The summing point 356 yields a first error angle $\theta_{e1}$ equal to $(\theta_s-\theta_c)$, which when multiplied by stiffness $K_1$ (block 422), principally derived from the stiffness of the upper compliant coupling 174u, gives the net applied steering torque T (at terminal 360). T is fed back at terminal 380 for subtraction from $T_s$ at the summing point 352 to form a first error torque $T_{e1}$. (T is also supplied from terminal 380 to the portion of the block diagram shown in FIG. 12C in a manner similar to that described above with respect to FIGS. 4A and 4C.)

The net applied steering torque T and the assist torque $T_a$ from terminal 504c are added together at a summing point 424 to form a summed torque $T_{sum}$. A second error torque $T_{e2}$ results from subtracting a net total torque $T_T$ (which is that torque actually delivered to the lower steering shaft 172l) from the summed torque $T_{sum}$ at summing point 426. The second error torque $T_{e2}$ is next divided by (or, rather, multiplied by the reciprocal of) a moment of inertia term $J_c s^2$ (block 428), relating to the moment of inertia of the clutch 830, to obtain the clutch angle $\theta_c$. A second error angle $\theta_{e2}$ is obtained by subtracting the feedback angle $\theta_f$ from $\theta_c$ at summing point 430. The second error angle $\theta_{e2}$ is next multiplied by stiffness $K_2$ (block 432) to form the net total torque $T_T$. Finally, the total force $F_T$ actually delivered by the gear rack 17 is obtained by dividing the net total torque $T_T$ by (or, rather, multiplied by the reciprocal of) the pinion radius $R_p$. Although it is necessary to selectively reduce system gain by utilizing finite stiffness and thus allowing some error angle, it is apparent that this necessary compliance should predominantly occur at block 422. This is because the resulting first error angle $\theta_{e1}$ is a function of $T_s$ only, while $\theta_{e2}$ is a function of $T_T$ and would thus be subject to much larger angular values if the stiffness $K_2$ were equally compliant. It is believed herein that $K_2$ should have at least 5 times the value as $K_1$.

Otherwise, the reduction gear train angle $\theta_{red}$ to be subtracted from the motor rotor angle $\theta_m$ at summing point 496 is determined by multiplying the clutch angle $\theta_c$ by the total reduction ratio of the combination of the gear reduction means 822 and the bevel gear set 826 $N_{red}$ in block 524c. And of course, it is that same reduction ratio $N_{red}$ that is multiplied by the net torque $T_{net}$ in block 502c for obtaining the assist torque $T_a$ at terminal 504c.

Figure 13:
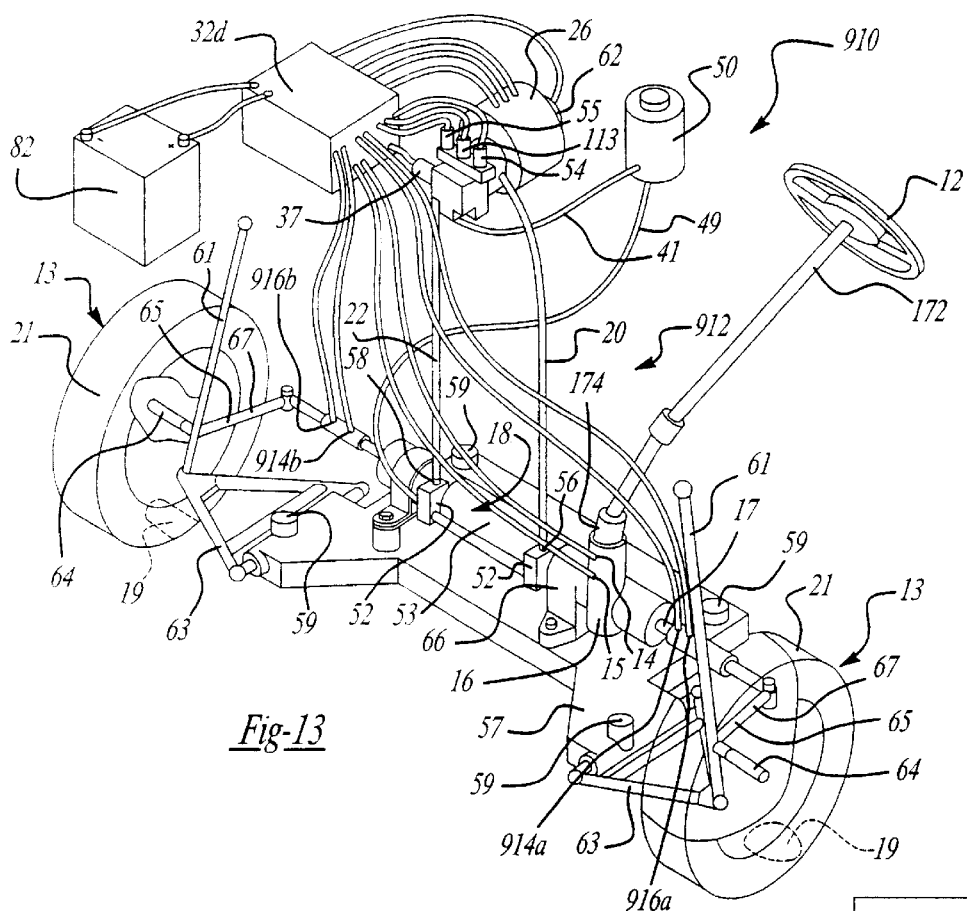
FIG. 13 is a perspective view of a portion of a host vehicle in which the third alternate preferred embodiment of the present invention is incorporated.
Figure 14:
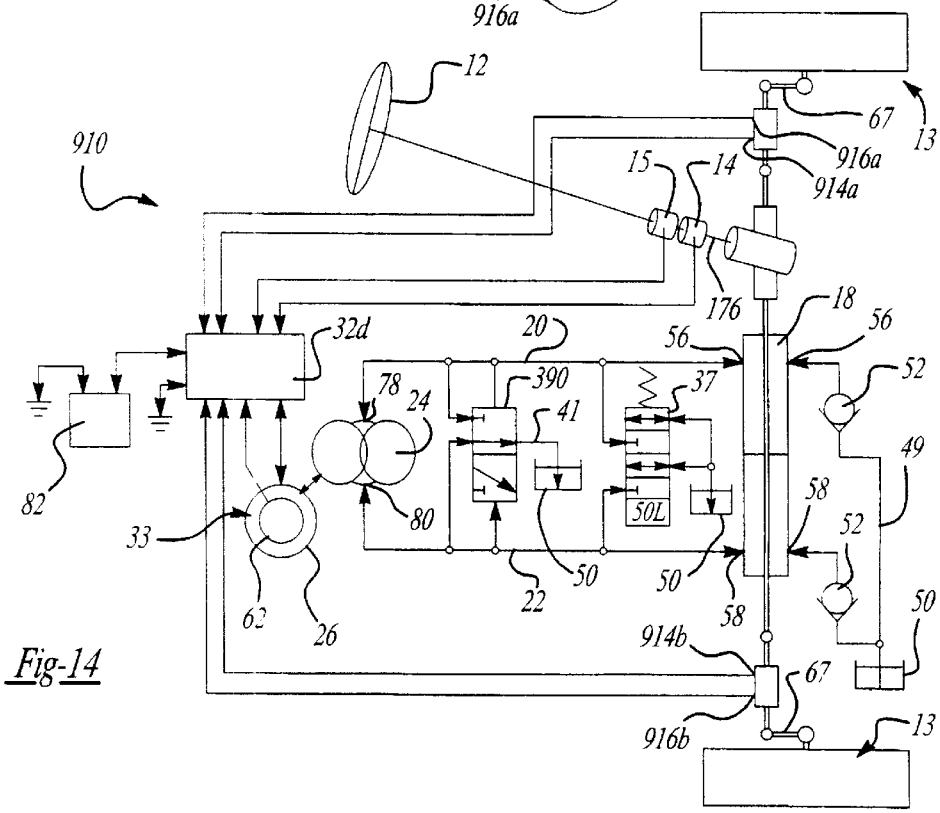
FIG. 14 is a schematic view of the third alternate preferred embodiment of the present invention.

With reference now to FIGS. 13 and 14, the power steering system 910 according to the third alternate preferred embodiment of the present invention is thereshown, in perspective and schematically, respectively, in conjunction with various constituents of the host vehicle in which the system 910 is located. As differentiated from any of the systems 710, 760 and 810, steering force generating means 912 for connecting the electric drive motor to the dirigible wheels 13 of the system 910 is implemented by a hydraulic transmission means 922, rather than by a mechanically implemented speed reduction means. This is not just for variety. The power steering system 910 is intended to be a premium power steering system. As such, it needs to overcome the difficulty of imposing speed reduction means between the motor and the steering linkage of the vehicle without also imposing either or both of mechanical over constraint and mechanical backlash between the motor and steering linkage. The purely mechanical speed reduction means previously utilized in the art (and used above in the systems 710, 760 and 810) tend to be flawed in this respect as is fully explored in incorporated Provisional U.S. patent application Ser. No. 60/090,311. Further described in that application is the utilization of such a hydraulic transmission to provide a smooth flow of power steering assist force to the system 10 of that application (or, of course, to the system 910 of the present invention). It should be clear, however, that the control principles described below with reference to the system 910 could also be utilized in an EPS system comprising purely mechanical speed reduction means.

As with the systems 710, 760 and 810, the system 910 comprises the primary applied steering torque sensor 14, and preferably, the redundant applied steering torque sensor 15 as well. However, as opposed to any of the systems 710, 760 and 810, as well as the system 10 of the '311 application, the total steering force $F_r$ delivered by the gear rack 17 is directly measured in system 910 by summing the outputs of first and second primary steering force sensors 914a and 914b to provide a primary steering force signal $V_{FT1}$, and preferably, is also measured in a redundant fashion by first and second redundant steering force sensors 916a and 916b for providing a redundant steering force signal $V_{FT3}$. In addition, an expected but fictitious steering force signal $V_{FT2}$ is preferably generated by electronic control means 32d. Alternately for such redundancy purposes and because of the utilization of the hydraulic transmission means 912, an acceptable verification of the magnitude of the steering force can be made by one or more pressure sensors 54 and 55, or 113 as is mentioned below and fully described in the co-pending '311 application. Again, such expected but fictitious and redundant steering force signals are utilized for the same purposes in system 910 as the signals $V_{TT4}$, $V_{TT5}$, $V_{TT7}$ and $V_{TT8}$ respectively described above in reference to systems 710, 760 and 810.

Although a full description of the operation of the hydraulic transmission means 912 is given in the incorporated '311 application, an overview of it (wherein the same reference numerals are used herein as in the '311 application) will now be given for continuity:

A power cylinder 18 having a left port 56 and a right port 58 is connected to the gear rack 17. Upon the supply of a pressurized fluid to one of the left and right ports 56 and 58, the power cylinder 18 assists longitudinal movement of the gear rack 17 by applying an assistive force to it, and thereby is adapted to supply a powered assist to steering the dirigible wheels 13 of the vehicle about the knuckle arm radius $R_w$. Of course, mechanical steering force derived from the mesh of the pinion shaft 176 and gear rack 918 is concurrently supplied to the dirigible wheels 13 about the knuckle arm radius $R_w$ through the steering gear 16 as well. Thus, the total steering force applied to the dirigible wheels 13, and comprised in the signals $V_{FT1}$, $V_{FT2}$ and $V_{FT3}$, is the sum of the manual steering force and the powered assist provided by the power cylinder 18.

The power steering system 910 of the present invention also includes a fluid supply means 53, comprising the electric motor 26 and a reversible fluid is pump 24, for selectively supplying pressurized fluid to the left and right ports 56 and 58 of the power cylinder 18 from the appropriate one of first and second ports 78 and 80 of the fluid pump 24. The fluid is ultimately supplied from a fluid reservoir 50. To clarify the presentation of the various connections to the reservoir 50, the reservoir 50 is shown in FIG. 14 at a plurality of locations. All of these constitute the same reservoir 50, however, not separate reservoirs. Preferably, the fluid supply means 53 is chosen so as to permit the system 910 to be alternatively operated in powered assist, straight steering and energy regeneration modes, such as in the manner disclosed in the co-pending '560 application.

In addition, it is highly desirable to have a way to bleed air from the system 910 when fluid is first introduced into it; to vent or replace fluid from or to the system 910 upon changes in temperature, for example, during operation of the system 910; and to eliminate any foam or bubbles which may occur during operation of the system 910, particularly if the system 910 is operated in alternative modes. These and other objectives can be achieved in the power steering system 910 according to the present invention by including in it, for example, a two-position, three-way valve 39 connecting the first fluid line 20 and the second fluid line 22 to the fluid reservoir 50 via line 41. As shown in FIG. 14, the three-way valve 39 is activated by that one of fluid supply lines 20 or 22 having the higher pressure and is operable to connect the line 20 or 22 having the lower fluid pressure to the reservoir; that is, the three-way valve 39 connects the second fluid line 22 to the fluid reservoir 50 when the fluid pressure in the first fluid line 20 is greater than the fluid pressure in the second fluid line 22, and connects the first fluid line 20 to the fluid reservoir 50 when the fluid pressure in the second fluid line 22 is greater than the fluid pressure in the first fluid line 20.

Alternatively, but preferably in addition, the system 910 can further comprise a suction line 49 selectively directly connecting one of the left and right ports 56 and 58 of the power cylinder 18 to the fluid reservoir 50. A pair of check valves 52 are disposed in the suction line 49, connected one each to the left and right ports 56 and 58 of the power cylinder 18. The check valves 52 are oriented so as to permit the flow of fluid from the reservoir 50, through the suction line 49 and to the connected left or right port 56 or 58 of the power cylinder 18, when the fluid pressure $LP_p$ or $RP_p$ at that left or right port 56 or 58 is less than the pressure in the reservoir 50 (that is, when the pressure on either side of the cylinder conventionally defined in the power cylinder 18 is less than the pressure in the reservoir 50). The suction line 49 is larger in diameter than the first and second fluid lines 20 and 22. The suction line 49 therefore has a lesser flow impedance (i.e., comprising both resistance and inductance) than the first and second fluid lines 20 and 22, thereby permitting the described flow of fluid from the fluid reservoir 50 through the suction line 49 to be returned to the fluid reservoir 50 through the three-way valve 39 and the line 41.

As fully described in (and depicted in FIG. 2 of) the '311 application, first and second pressure sensors (54) and (55) can be used to measure the higher valued one of fluid pressures $LP_p$ and $RP_p$ in order to provide the redundant verification of steering force called for above. Alternately, the two-position, three-way valve 39 and pressure sensors (54) and (55) can be replaced by a two-position, four-way valve (107) and pressure sensor (113) connected to an additional high pressure port thereof as shown in FIG. 3 of the '311 application. In operation, redundant verification of the magnitude of the steering force is obtained via the two-position, four-way valve (107) connecting the first fluid line 20 to pressure sensor (113) when the fluid pressure in the first fluid line 20 is greater than the fluid pressure in the second fluid line 22, and connecting the second fluid line 22 to the pressure sensor (113) when the fluid pressure in the second fluid line 22 is greater than the fluid pressure in the first fluid line 20. In this case, the higher pressure measurement is simply indicative of rectified pump output pressure $P_p$.

Figure 15:
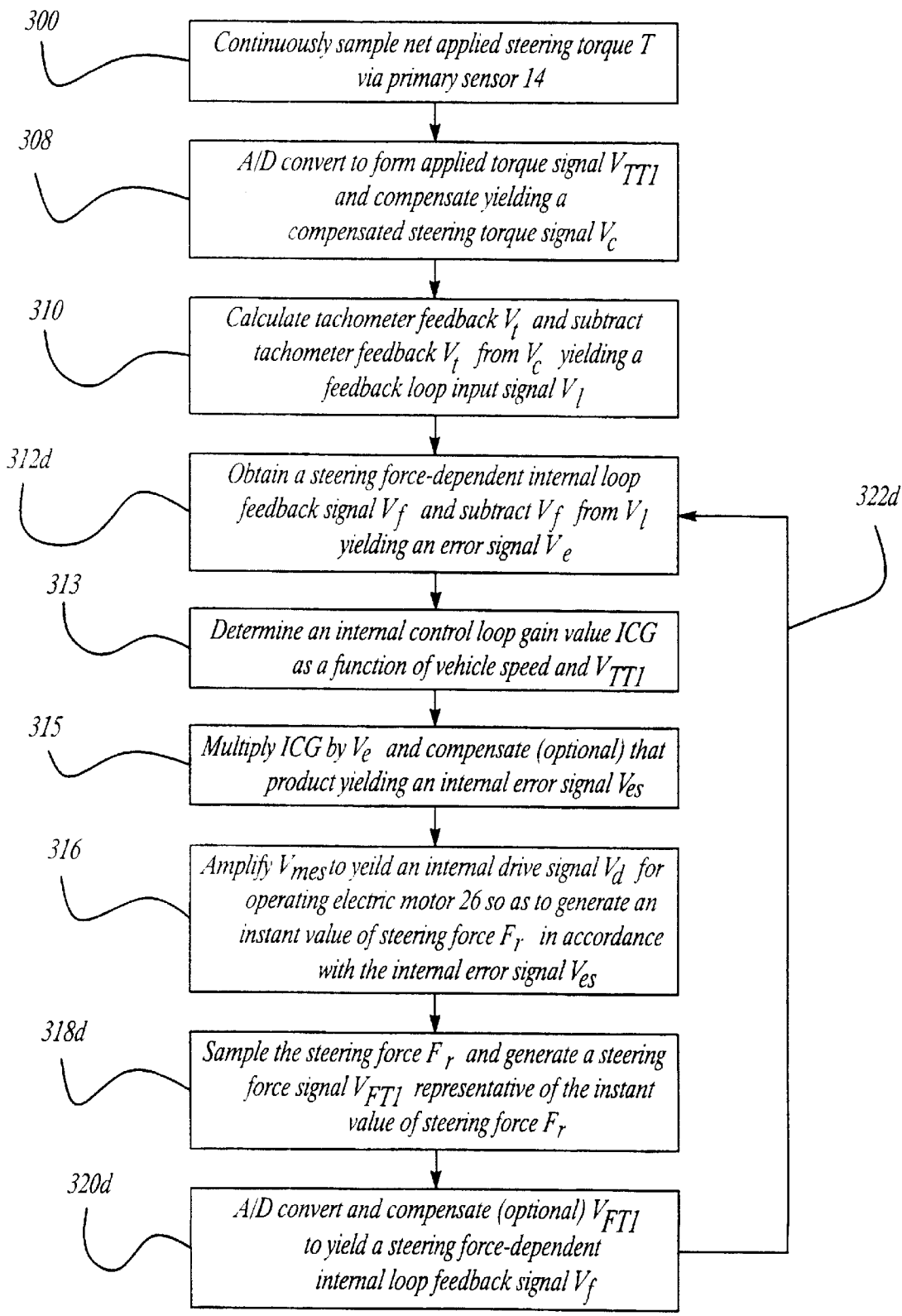
FIG. 15 is a flow chart of the control applied by a portion of the third alternate preferred embodiment of the present invention during operation.

As with the other systems, a better understanding of the details of the feedback and servo control provided in the system 910 of the present invention may be had with reference to the flow chart shown in FIG. 15. FIG. 15 is very similar to FIGS. 3, 7 and 11, differing in detail only in that the signal $V_{TT2}$, $V_{TT2}'$ or $V_{TT6}$ has been replaced by the steering force signal $V_{FT1}$ indicative of actual measured steering force $F_r$. And, the primary steering force signal $V_{FT1}$ has been used in conjunction with blocks 318*d* and 320*d*, and internal servo control loop 322*d*. Thus, the control functions of electronic control means 32*d*, including the use of the signals $V_{TT1}$ and $V_{FT1}$, are substantially the same as those described above for electronic control means 32*a*, 32*b* and 32*c*, and thus, further description of FIG. 15 will be omitted for brevity.

Figure 16A:
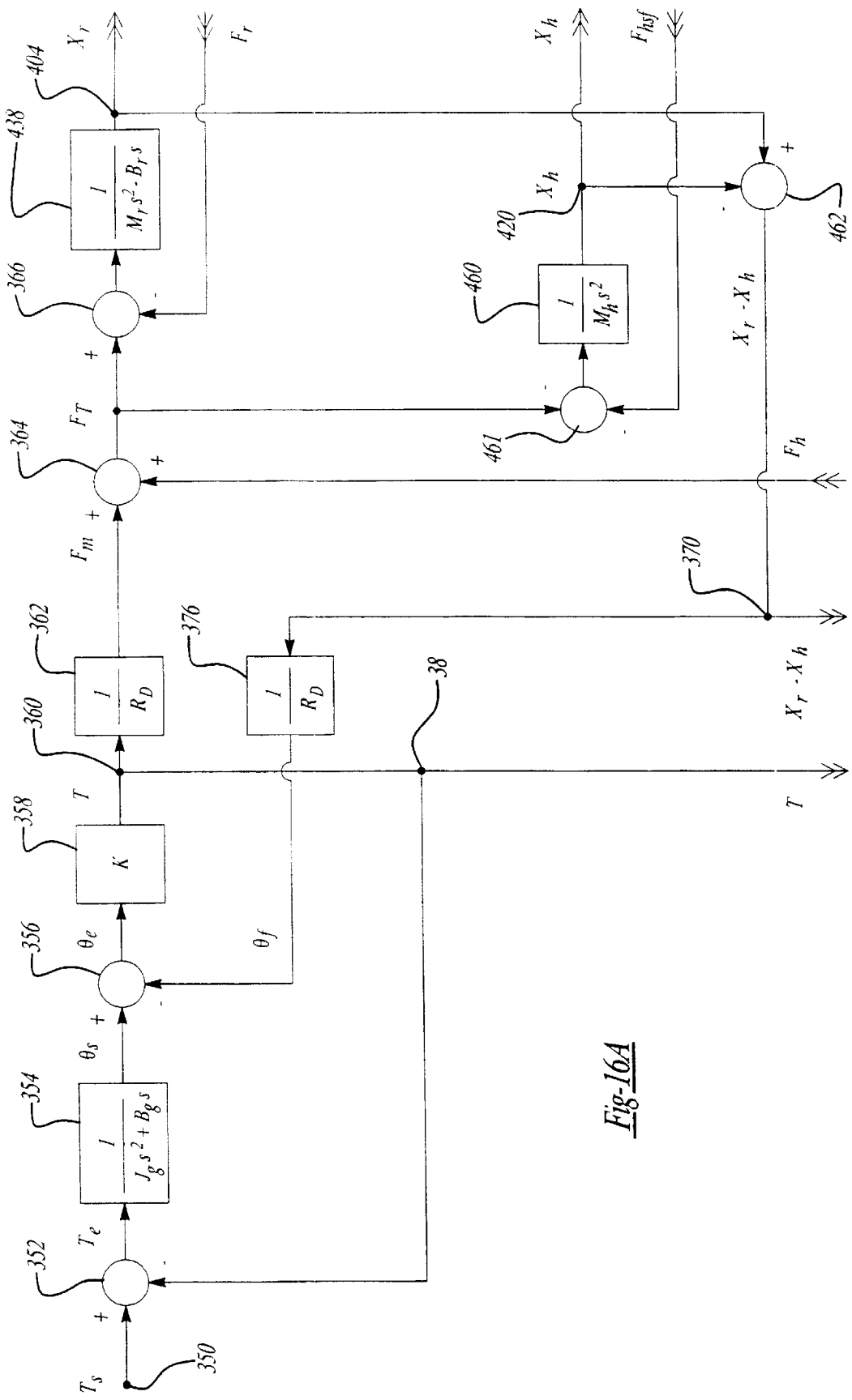
FIGS. 16A–16C constitute a single block diagram representing various mechanical, hydraulic, electrical and electronic connections and relationships existing in a host vehicle which includes in it the third alternate preferred embodiment of the present invention.
Figure 16B:
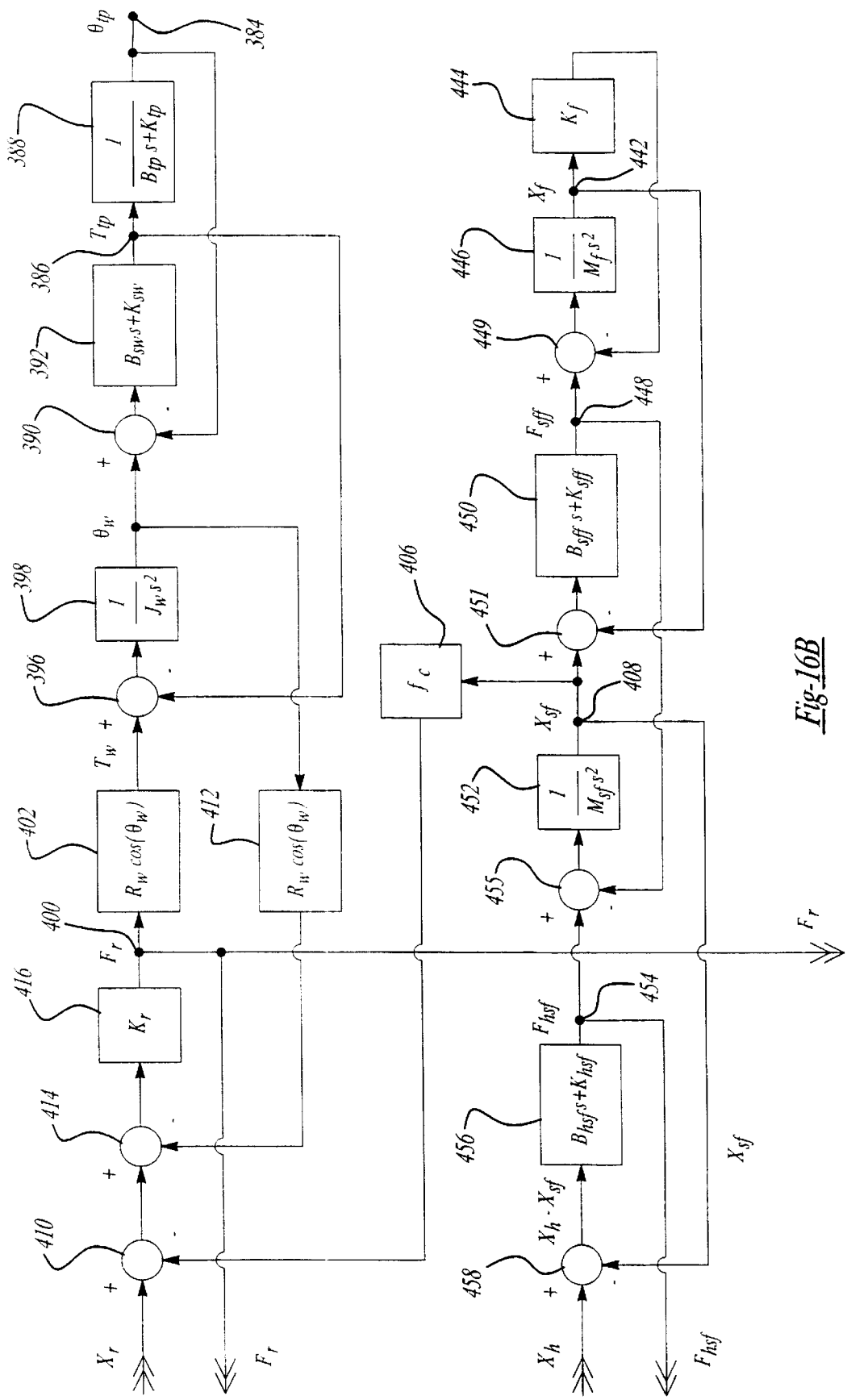
Figure 16C:
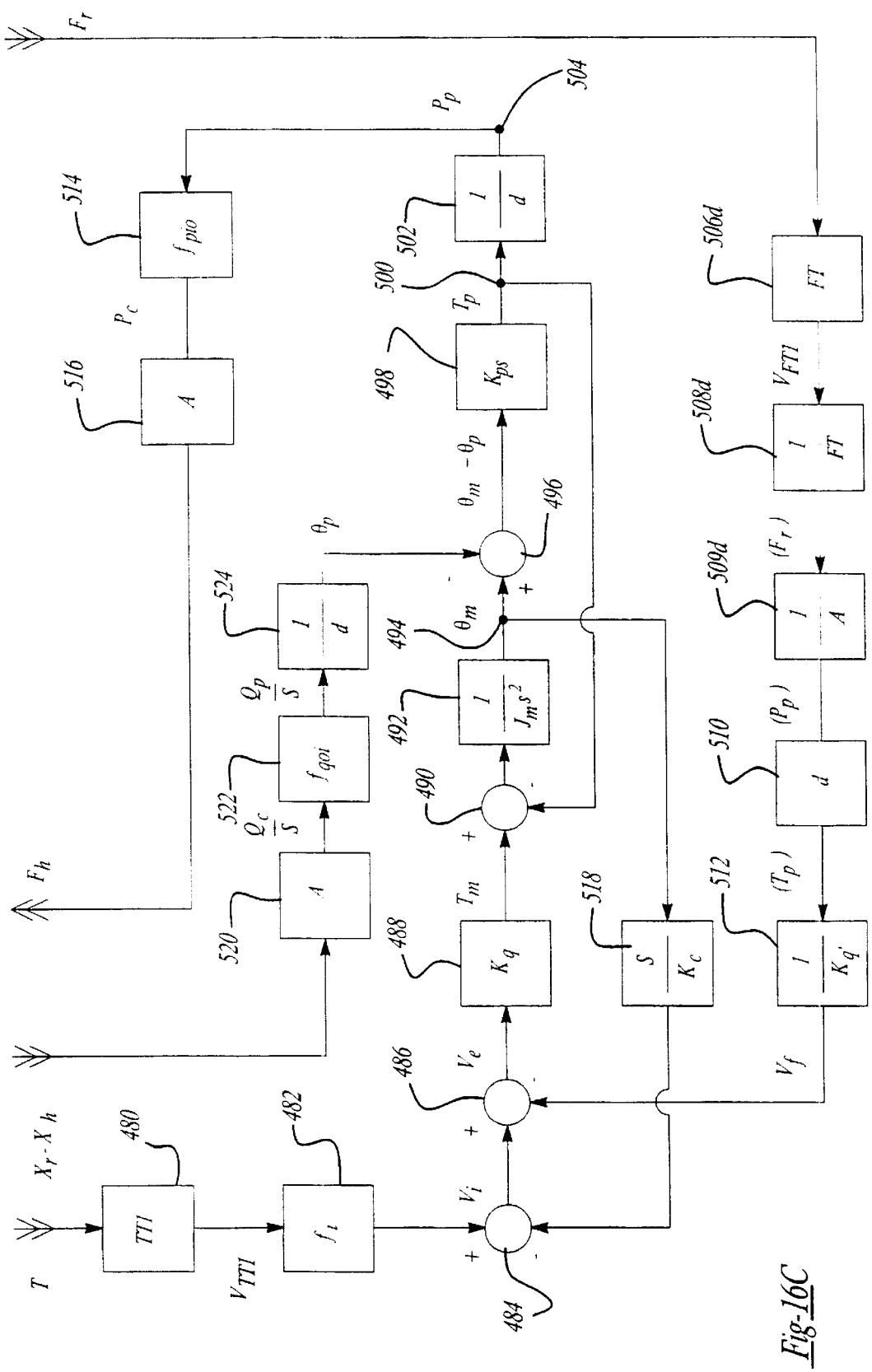

Similarly, the block diagram depicting the operation of system 910 shown in FIGS. 16A–16C is almost the same as that depicting the operation of system 10 of the '311 application shown in FIGS. 5A–5C thereof. Specifically however, the feedback signal $V_f$ utilized for the internal servo loop is derived from the primary steering force signal $V_{FT1}$, provided by a force sensor at block 506*d* having characteristic $F_T$, and indicative of the total steering force $F_r$ present at the terminal 400. Then virtual values $(F_r)$, $(P_p)$ and $(T_p)$ are progressively provided via multiplication of 1/FT, 1/A and d in blocks 508*d*, 509*d* and 510, respectively, where A is cylinder area and d is pump displacement per radian. A fall description of the other features of the block diagram shown in FIGS. 16A–16C then, can be found in the discussion relating to FIGS. 5A–5C of the '311 application. Other than these few details mentioned above, these block diagrams and their functions are the same. Thus, further description of FIGS. 16A–16C will be omitted for brevity.

The block diagrams of system 710, 760, 810 and 910 of the present invention respectively shown in FIGS. 4A–4C, 8A–8C, 12A–12C and 16A–16C can alternatively be reduced to a "canonical form" block diagram like that shown in FIG. 4 of the Phillips '715 patent. That figure is expressly incorporated by reference herein; the reference numerals in that figure will be referred to in parentheses. Reduction is carried out via computation of suitable forward and feedback transfer functions G and H, respectively, for each of the powered assist and energy regeneration modes. Such computation can be made, for example, via methods described by DiStefano, Stubberud, and Williams in *Schaum's Outline of Theory and Problems of Feedback and Control Systems*. In block diagram (370), an input signal I (equal in this case to $T_s$), is positively applied to a summing point (372) via an input terminal (374). Closed-loop response of block diagram (370) yields an output signal C (equal in this case to $\theta_{tp}$) at an output terminal (376). C multiplied by a control element feedback transfer function H shown at block (378) generates a feedback signal B which is negatively applied to the summing point (372) to generate an error signal E. Finally, the error signal E multiplied by a control element forward transfer function G shown at block (380) generates the output signal C. During the powered assist and energy regeneration modes of any of the present systems 710, 760, 810 and 910, the expressions for the forward transfer function G and the feedback function H will be very complex. However, in each case the equation $C/I=\theta_{tp}/T_s=G/(1+(G\,H))$ determines the dynamic relationship between $\theta_{tp}$ and $T_s$.

In general, the mass and spring elements of any of the mechanical speed reduction units or the mass of the piston-and-rack assembly, the transmissive character of tie-rod linkage assemblies, the moment of inertia of the dirigible wheels 13, the transmissive character of the tire side walls and the tire patches, the mass of housing, the transmissive character of the mounting bracket and bolts, the effective mass of the sub-frame, the effective transmissive character of the interface between the sub-frame and the host vehicle's frame, and the effective mass of the host vehicle's frame are comprised in a very complex sub-system. The dynamics associated with this sub-system heavily influence the stability criteria governing the shudder susceptibility of power steering system 710 of the present invention.

It is desirable for any servo system, as represented by block diagram (370), to operate in a stable manner. This will occur if the open-loop transfer function (G H) attains sufficient values of gain margin wherein its absolute value differs sufficiently from a value of 1.0 whenever its argument attains an angular value equal to an odd multiple of 180°; and attains sufficient values of phase margin wherein its argument differs sufficiently from a value equal to an odd multiple of 180° whenever its absolute value attains a value of 1.0. The stability enjoyed by the systems 710, 760, 810 and 910, of the present invention is described in more detail below, with regard to an exemplary set of performance curves (e.g., Bode plots) for the system 910 shown in FIGS. 18A through 19B.

Except for the tire patch torsional stiffness $K_{tp}$, and $K_q$ and $K_q'$ (described in detail below in conjunction with FIG. 17), the following values and units for the various constants and variables mentioned above can be considered exemplary for the regenerative power steering system 910 of the present invention, and a conventional host vehicle on which it is employed:

$1/(B_{tp}\,s+K_{tp})=1/(5{,}000\,s+K_{tp})$ rad./in.-lb.

$B_{sw}\,s+K_{sw}=30\,s+500{,}000$ in.-lb.

$1/(J_w\,s^2)=1/(5\,s^2)$ rad./in.-lb.

$1/(J_s\,s^2+B_s\,s)=1/(0.5\,s^2+3.5\,s)$ rad./in.-lb.

$R_w=5$ in/rad.

$1/(M_r\,s^2+B_r\,s)=1/(0.02\,s^2+3\,s)$ in./lb.

$1/R_p=1/0.315$ in.$^{-1}$ $K=800$ in.-lb.

$f_c=0.8$ (dimensionless)

$A=1.511$ in.$^2$ $1/(M_h\,s^2)=1/(0.02\,s^2)$ in./lb.

$B_{hsf}\,s+K_{hsf}=5.0\,s+150{,}000$ lb/in.

$1/(M_{sf}\,s^2)=1/(0.5\,s^2)$ in./lb.

$B_{sff}\,s+K_{sff}=25.0\,s+60{,}000$ lb./in.

$1/(M_f\,s^2)=1/(0.2\,s^2)$ in./lb.

$K_c=1{,}000$ rad./volt-sec.

$K_f=530{,}000$ lb./in.

$K_{ps}=19{,}300$ in.-lb.

$K_r=125{,}000$ lb.lin.

$TT=0.025$ volts/lb.

$1/(J_m\,s)=1/(0.00523\,s)$ in.$^{-1}$-lb.$^{-1}$sec.$^{-1}$ $d=0.0207$ in.$^3$/rad.

$1/d=1/0.0207$ rad./in.$^3$ $FT=0.00177$ volts/psi.

$1/PT=1/0.00177$ psi./volt $P_c,\,P_p=$lb./in.$^2$ $X_r,\,X_f,\,X_h,\,X_{sf}=$in.

$F_{hsf},\,F_h,\,F_{sff},\,F_f,\,F_T,\,F_r,\,F_m=$lb.

$T,\,T_{tp},\,T_m,\,T_e,\,T_p,\,T_s,\,T_w=$in.-lb.

$\theta_s,\,\theta_{tp},\,\theta_p,\,\theta_e,\,\theta_w,\,\theta_m,\,\theta_f=$rad.

$Q_c,\,Q_p=$in.$^3$/sec.

$V_{TT},\,V_t,\,V_f,\,V_{PT},\,V_c,\,V_e,\,V_i=$volts

For each of the combination terms mentioned above, the designated units apply to the entire term, and not merely to the last element of the term. Of course, the particular values given above are merely exemplary of the actual values which may be encountered in any particular, real-world steering system and host vehicle, and the particular values given above may be only rough approximations of those actual values. Many of the terms, particularly the compensation terms, are generally determined in an empirical manner.

The compensation term $f_i$ is dimensionless, and is defined by the following equation, where v is the host vehicle speed in mph:

$$f_i = \frac{(1+0.018s)\left(1+\dfrac{s}{63e^{-v/30}+19}\right)}{\left(1+\dfrac{s}{6.3-e^{-v/35}}\right)(1+0.0023s)(1+0.0018s)}$$

And the compensation $1/K_{qc}'$ applied to $1/K_q'$ also dimensionless, is defined by the following equation:

$$1/K_{qc}' = \frac{(1+0.055s)}{\left(1+\dfrac{s}{15e^{-v/35}+0.1v+5}\right)(1+0.0032s)(1+0.0027s)}$$

When the vehicle is stationary, $K_{tp}$ is related to the integrated product of the deflection rate of each tread block of the tire patch and its radial distance from the center of rotation of the tire patch. At high speed, it is related to the product of front end centrifugal force and caster offset while at low speeds there is a transition from stationary to high speed conditions. Actually, even the effective value for the caster offset should be determined empirically because it is dependent upon the instant characteristics of a dynamically varying tire patch. As lateral acceleration reaches high values, slippage begins primarily toward the rear of the tire patch-road interface. This serves to reduce the caster offset to the point where it can even achieve a zero value. This, of course, would result in a zero value of steering force. Should such a level of centrifugal force be reached that the caster offset becomes negative, then the direction of the tire loading stiffness $K_{tp}$ reverses and it increases in absolute value in the opposite direction with resulting steering force reversal as well.

A representative approximation for $K_{tp}$ values comprises an exponential term plus a square law term (i.e., with respect to vehicle velocity) according to the formula:

$$K_{tp} = \frac{250{,}000}{e^{(v/3)}} + \frac{(17.6)^2\,few\,co}{g\,wb}v^2$$

where e is the base of the natural logarithm, v is vehicle velocity in mph, "few" is front end weight in lbs., "co" is caster offset in inches, g is the acceleration of gravity (386.4 in./sec.$^2$), and "wb" is the vehicle's wheelbase in inches.

Of lesser impact on the reflected spring constant of the system as a whole is the torsional spring stiffness K of the steering column, which includes the effects of any compliant element in the steering gear itself, such as a torsion bar. This fact of lesser impact is especially significant herein, because one of the goals of the systems 710, 760, 810 and 910 of the present invention is to enable the use of higher values for K Use of the block diagrams disclosed above and the application of conventional analysis techniques to it comprise values for K on the order of 800 in.-lbs./rad. as indicated in the listing above. Thus, the net reflected spring constant $K_{rsc}$ in in.-lbs./rad. relates primarily to $K_{sw}$ and $K_{tp}$, and is substantially determined by the following equations for use in conjunction with the system 910:

$$K_{int} = \left(\frac{R_p}{R_w \cos\theta_w}\right)^2 \left(\frac{F_m}{F_m + F_h}\right)\left(\frac{K_{sw} K_{tp}}{K_{sw} + K_{tp}}\right)$$

and $$K_{rsc} = \frac{K_{sc} K_{int}}{K_{sc} + K_{int}}$$

where $R_p$ is the pinion radius in inches, $R_w$ is the knucle arm radius in inches, $\theta_w$ is average knuckle arm angle, $F_m$ is the mechanically derived force in lbs., $F_h$ is the hydraulically derived force in lbs., and $K_{int}$ is an intermediate approximation to the reflected spring constant in in.-lbs./rad. In the equation for determining $K_{rsc}$, the terms on the right hand side of the equation serve to combine $K_{sc}$ and $K_{int}$. In the equation for determining $K_{int}$, the term $(R_p/(R_w \cos \theta_w))^2$ can be thought of as representing a transformer whose ratio is $(R_p/(R_w \cos \theta_w))$, the term $(F_m/(F_m + F_h))$ can be thought of as being equivalent to a voltage divider, and the term $((K_{sw} K_{tp})/(K_{sw} + K_{tp}))$ serves to combine $K_{sw}$ and $K_{tp}$. It is the presence of the product of the first two of these terms that results in the reflected compliance of the tire side wall and tire loading characteristics being dominant over that of the steering column. Values for $K_{rsc}$ (utilizing values for $K_{tp}$ generated according to the above equation for same) as a function of vehicular speed (in mph) is depicted by curve 612 in FIG. 17. In calculating the functions depicted in FIG. 17, $\theta_w$ is taken as being equal to zero, while the values used for all of the other terms identified above correspond to those listed with reference to the block diagram shown in FIGS. 16A, 16B and 16C.

Again, in the power steering system 910 of the present invention the electronic control means 32d achieves its objects by employing the steering force signal $V_{FT1}$ determined from the sum of signals emanating from first and second steering force sensors 914a and 914b to counteract an electro-hydro-mechanical resonance occurring predominantly between the moment of inertia of the rotor of the electric motor 26 and a system spring rate consisting primarily of the dominant tire loading characteristics of the dirigible wheels 13. More particularly, the electronic control means 32d treats the electro-hydro-mechanical resonance as a mass element predominated by the moment of inertia of the rotor of the electric motor 26 and a theoretical spring element dominated by the tire loading characteristics of the tires 21, and employs the steering force signal $V_{FT1}$ to control the electric motor 26 so that the fluid pump 24 is not driven in harmony with the electro-hydro-mechanical resonance.

The electronic control means 32d (as well as any of the electronic control means 32a, 32b or 32c in systems 710, 760 or 810) provides compensation suitable to this end. More particularly, the electronic control means 32d provides compensation of at least one of the magnitude of the applied steering torque in determining the compensated signal $V_c$ (block 308 of FIG. 15), and the internal servo control loop comprising either, or both of, the operation of the electric motor 26, in particular, by compensation of the internal error signal $V_{es}$, the product of the gain value ICG and the error signal $V_e$ (block 315), or compensation of the steering force signal $V_{FT1}$ in determining the feedback signal $V_f$ (block 320d). Most preferably, the compensation (block 308) of the magnitude of the applied steering torque predominantly includes at least one pole to suppress the open loop gain $q_f/\theta_e$ of the overall control loop, while the remaining compensation associated with the internal servo control loop is predominated by a low-frequency zero to advance the phase angle of the motor inertia dominated resonance of the open loop gain $V_f/V_e$, followed by higher frequency poles to suppress the open loop gain $\theta_f/\theta_e$ of the overall control loop in order to suppress overall system high frequency resonances. Preferably this is by compensation (block 320d) of the steering force measured by first and second steering force sensors 914a and 914b. However, it is possible to change the manner in which the remaining compensation is placed or even to concentrate all of the terms in the step 315 with comparatively little degradation of the total compensation.

The electronic control means 32d also establishes base non-frequency dependent values for both the gain factor $K_q$ (block 488) and the feedback gain factor $1/K_q'$ (block 512) in part as functions of vehicle speed and torque sensor signal $V_{TT}$, and in part according to the ratio $u = K_q/K_q'$. In the systems 710 and 760 as well as the system 10 of the '311 application, for values of torque T less than 15 in./lbs., corresponding to $V_{TT}$ values less than 0.375 Volts, both $K_q$ and $K_q'$ are suppressed to zero values in a manner to be explained below. This is for the reason that only mechanically derived steering force is desired on-center. The ratio u may be fixed, or alternately, may vary with vehicle speed. In the systems 810 and 910, however, non-zero values for both $K_q$ and $K_q'$ are utilized in order to determine an on-center gain value corresponding to a desired simulation of mechanically derived steering force vs. steering wheel torque. Thus, in systems 810 and 910 $K_q$ and $K_q'$ are suppressed to non-zero values determined according to equations derived below.

Ideally, the ratio u would have a large value which would make the closed loop gain $P_p/V_i$ of the internal feedback loop equal to the inverse of the overall feedback value, and thus, totally independent of the motor inertia term. However, this would result in a large internal open loop gain $V_f/V_e$ which would be difficult to suppress and successfully bring through unity gain. Thus, the internal open loop gain $V_f/V_e$ must have a rather modest value (i.e., such as that obtained with a value of u=2, which value is used herein) so as to achieve stable operation of the internal servo control loop. However, the electro-mechanical and electro-hydro-mechanical resonances identified herein result in high "Q" resonances in the internal open loop gain $V_f/V_e$ at all vehicle speeds. This is shown for an exemplary system 910 utilizing the values listed above at both 0 mph and 100 mph by reference numerals 550d and 552d in FIGS. 18A and 19A, respectively, each depicting a significant localized increase in the internal open loop gain $V_f/V_e$ at its resonant frequency.

It is interesting to note that without utilization of the internal servo control loop there would of course be no feedback voltage $V_f$, with the result that $V_e$ would have the same value as $V_i$ and the high "Q" resonance would actually be present in the ratio $P_p/V_i$. This would result in the high "Q" resonance commingling with all of the nodes depicted in FIGS. 16A and 16B (and similarly, all of the nodes depicted in FIGS. 4A, 4B, 8A, 8B, 12A and 12B) except for the input node 350 where $T_s$ is located. Specifically, it would result in an inversely proportional notch in the node following summing point 356 where $\theta_e$ is located and the node 360 where T is located. In other words, an "inverse" resonance would be present in the overall servo control loop whereat the steering shaft torque would virtually disappear at the resonant frequency.

Figure 18A:
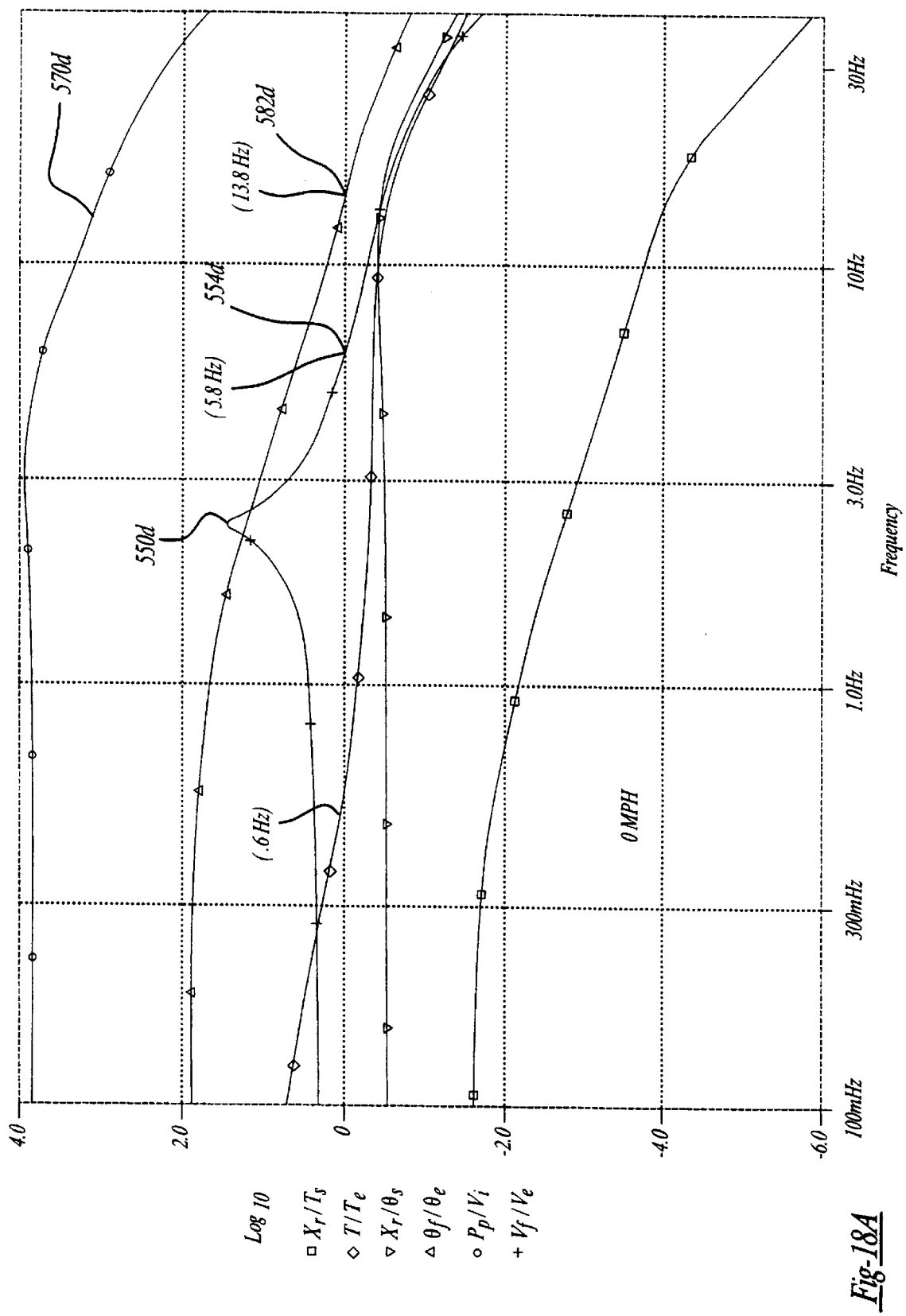
FIGS. 18A and 19A are graphic representations of the dependence of the logarithm of the absolute value of the ratios of various parameters of the third alternative preferred embodiment of the present invention at different vehicle speeds.
Figure 18B:
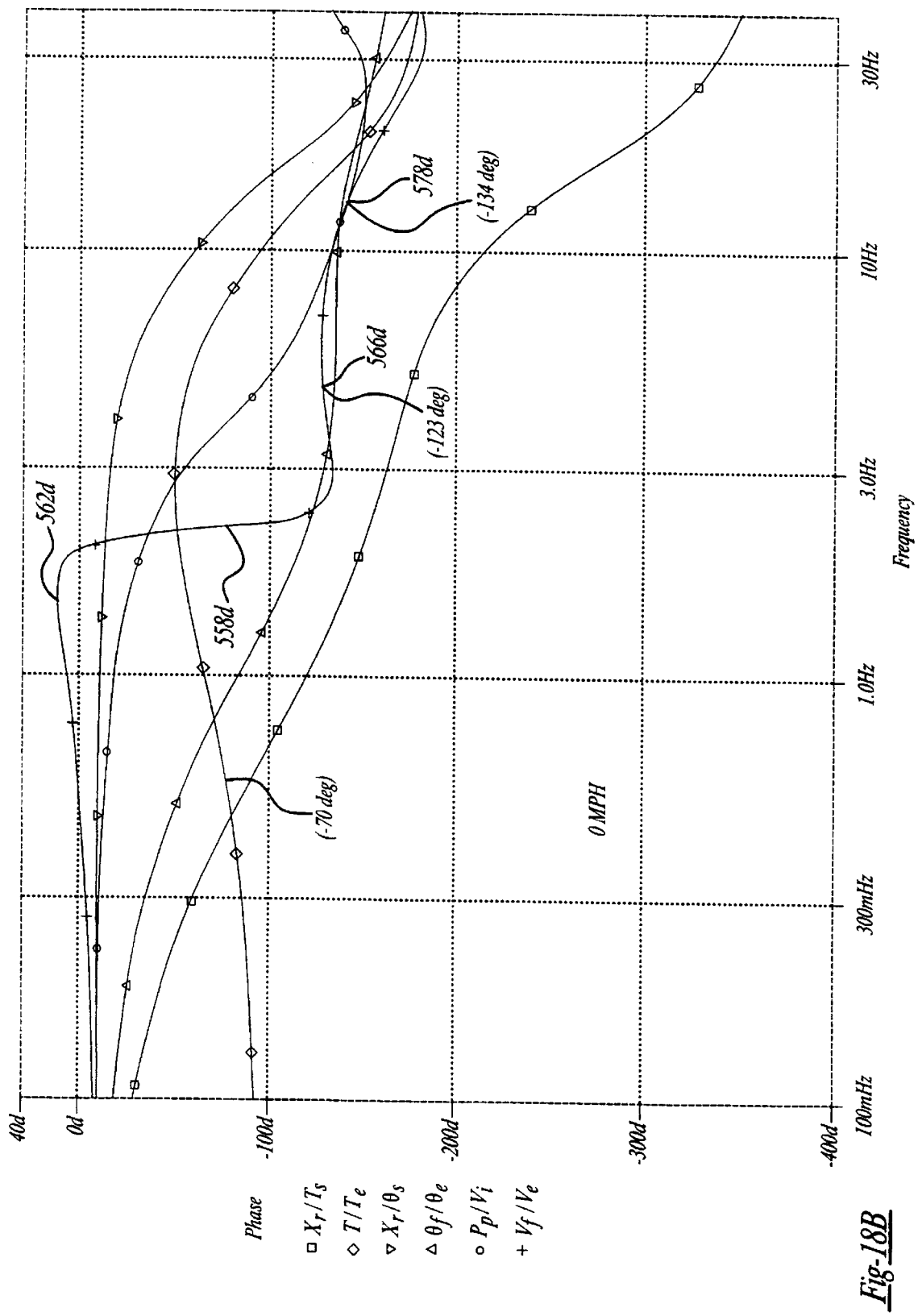
FIGS. 18B and 19B are corresponding graphic representations of the phase angle of the absolute value of the parameter ratios shown in FIGS. 18A and 19A, respectively.
Figure 19A:
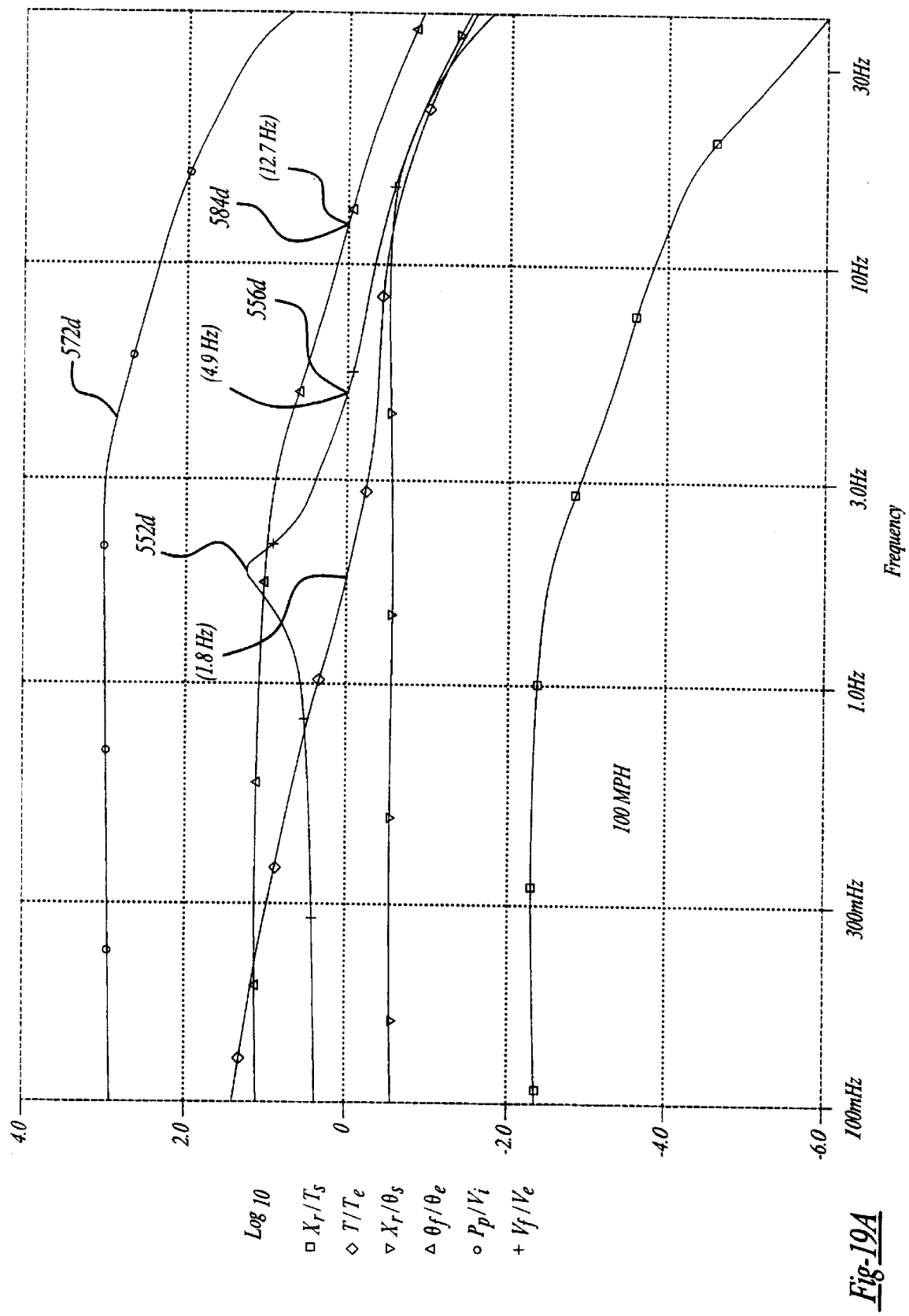
Figure 19B:
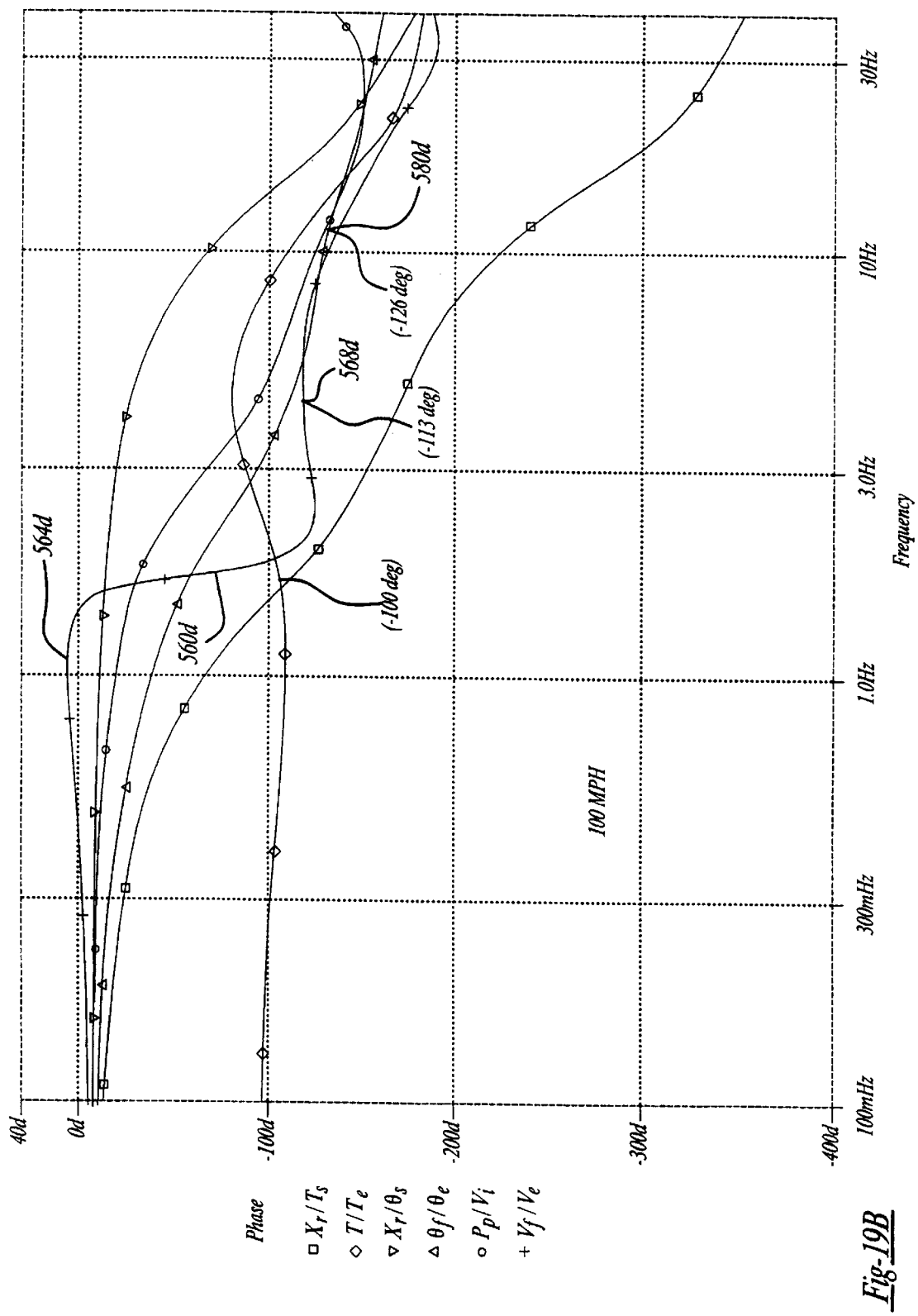

In any case, the preferred modest value for u utilized herein enables a relatively low-frequency unity gain crossover for the internal open loop gain $V_f/V_e$, as indicated by reference numerals 554d and 556d in FIGS. 18A and 19A, respectively. As indicated by reference numerals 558d and 560d in FIGS. 18B and 19B, again at 0 and 100 mph, respectively, this results in a sharp drop in phase angle at the high "Q" resonant frequency. Thus, the preferred compensation utilized in conjunction with the internal feedback gain factor $1/K_q'$ (block 512) comprises a dominant low-frequency zero. This is needed to advance the phase angle to a positive value before the electro-hydro-mechanical resonance (or similarly, the electro-mechanical resonances in systems 710, 760 and 810), thereby maintaining adequate phase margin following that resonance (as indicated by reference numerals 562d and 566d in FIG. 18B and reference numerals 564d and 568d in FIG. 19B, respectively). However, it is necessary to reduce the internal open loop gain following the resonance in order for it to decisively pass through unity gain, as indicated by reference numerals 554d and 556d. This is accomplished in a commingled manner by higher frequency zeros and poles comprised in the compensation terms $f_i$, and $K_{qc}'$ utilized herein with exemplary values according to the formulas for them given above.

With such compensation, adequate phase margins (on the order of 60°) are achieved at unity gain, as indicated by reference numerals 566d and 568d in FIGS. 18B and 199B, respectively. In conjunction with the modest internal open loop gain $V_f/V_e$, this results in a very modest increase in the closed loop gain $F_r/V_i$ of the internal servo control loop, as indicated by reference numerals 570d and 572d in FIGS. 18A and 19A, respectively. Corresponding perturbations in $\theta_e$ or T are dramatically moderated with reference to those hypothesized above. They are of substantially non-existent "Q" and "appear" at respective frequencies of about 6 and 5 Hz (554d and 556d).

Thus, the electro-hydro-mechanical resonance is substantially contained within the internal control loop, and is substantially transparent as viewed from the steering wheel 12. More particularly, smooth and stable overall control of the power steering system 910 (and again similarly, systems 710, 760 and 810) of the present invention, free of any shudder characteristics, is demonstrated by the large phase margins for the open loop gain $T/T_e$ along with the closed loop gain $X_r/T_s$. The fact that no higher frequency resonances are present in the closed loop gain $X_r/T_s$ is due to the acceptable phase margins of around 50° at about 13 Hz in the curves depicting open loop gain $\theta_f/\theta_e$, as indicated by reference numerals 578d and 580d in FIGS. 18B and 19B, and 582d and 584d in FIGS. 18A and 19A, respectively. In addition to smooth and stable overall control, however, these values indicate that the system 910 (as well as the systems 710, 760 and 810) of the present invention is also able to withstand external perturbations (for example, such as from chuckhole impacts and the like) in a controlled and stable manner.

Actual static values $K_{qs}$ for $K_q$ (that is, values of $K_q$ less any applied compensation) can be determined according to the formula:

$$K_{qs} = \frac{F_h(u+1)d}{AV_i} - \frac{Td}{AV_iR_p}$$

where the second term $(T\,d)/(A\,V_i\,R_p)$ accounts for the combined mechanically derived steering component (and which would be absent in systems 710 and 760). In general, the particular value for the ratio $F_r/V_i$ is dependent upon the individual characteristics of any particular host vehicle model being considered, and the other values being defined above. For instance, if pure manual steering is desired on-center, that ratio preferably has a value resulting in $K_{qs}$ having a value of $((u+2)\,d)/(A\,TT\,R_p)$, which value will nominally result in an on-center value of zero for $P_p$. This on-center condition requires the ratio $F_r/V_i$ to be equal to $1/(TT\,R_p)$. In general however, any positive non-zero on-center value for $F_r/V_i$ could be utilized. (And similarly, any positive non-zero on-center value for $F_r/V_i$ could be utilized in systems 710, 760 and 810 as well.) The result would be a different apparent gain value for on-center "mechanical" steering.

Figure 20:
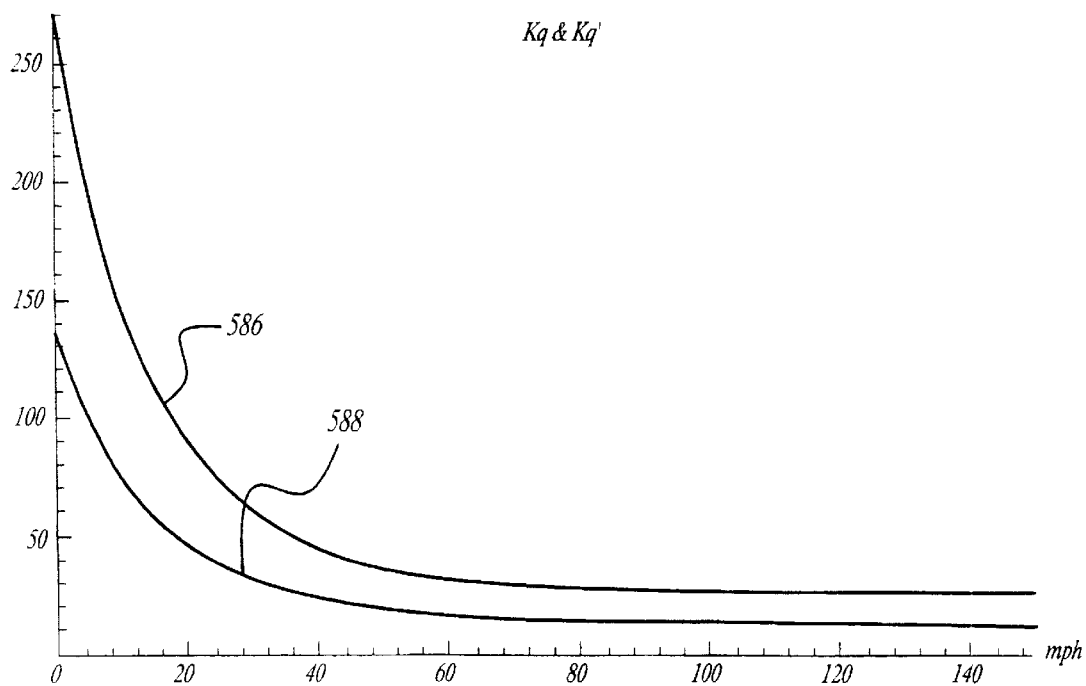
FIG. 20 is a graphic representation of the vehicle speed dependence of two gain factors employed in any of the preferred embodiments of the present invention.

Of greatest interest in the system 910, the on-center behavior would appear to the driver as being essentially frictionless mechanical steering. This is because of the fact that total force is measured and the pinion-rack interface friction is additionally obviated. As a matter of fact, even assisted steering would appear to be frictionless but with some higher selected value of steering gain. A particular example for assisted steering according to the algorithm $$\frac{F_h}{V_i} = 794 + \frac{5867}{e^{\left(\frac{v}{15}\right)}}$$

is plotted in FIG. 22 as is further described below. This algorithm yields typical off-center values for $K_{qs}$, $K_q$ and $K_q'$ for the system 910 and 810 wherein the slopes of the curves 622c/d–630c/d relate to the off-center values for $K_{qs}$, $K_q$ and $K_q'$. However, similar overall system results for systems 710 and 760 are plotted in FIG. 21. In this case however, the non-speed dependent gain value 794 is replaced by a gain value 667 because the manually derived steering force is separately accounted for and the slightly lesser slopes of the curves 622a/b–630a/b reflect the lower gain value. In any case, for the system 910 example, e is the base of the natural logarithm, v is the instant vehicle speed in mph, and u=2, d=0.0207 in.$^3$/rad. and A=1.511 in are taken as presumed values. The resulting calculated values for $K_q$ and $K_q'$ are shown in FIG. 20, indicated by the curves 586 and 588, respectively ($K_q'$ of course, equals $K_{qs}/u$.).

Again, the particular compensation required will depend upon characteristics of the specific host vehicle and the perceived resonances which are to be counteracted by any of the systems 710, 760, 810 and 910. It is believed that those skilled in this specialized art will be able to derive and employ compensation terms specific to any particular host vehicle by the use of commonly available modeling programs, in light of the present disclosure.

Figure 21:
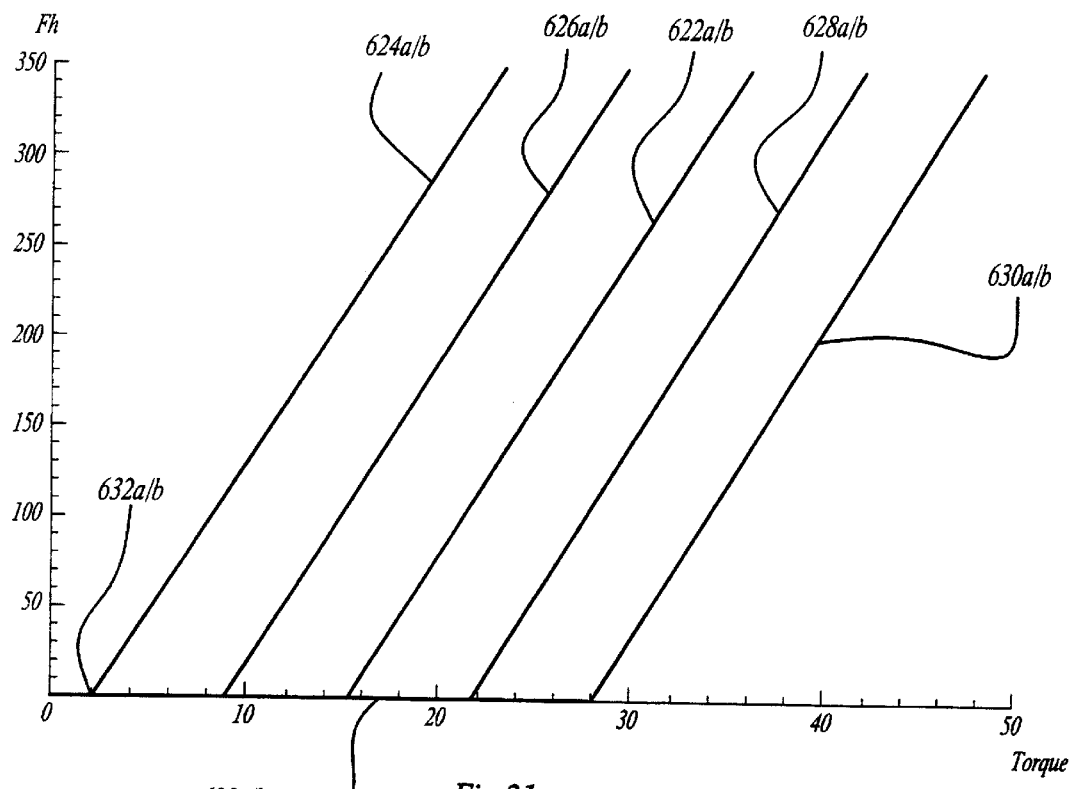
FIG. 21 is a graphic representation of the overall system gain of either of the preferred or the first alternate preferred embodiments of the present invention, such overall gain in part comprising dependence of a tachometer feedback damping factor employed in the preferred and first alternate preferred embodiments of the present invention.

FIG. 21 depicts a family of steering assist force-effort curves appropriate for systems 710 and 760 (where the steering assist force is $F_a'$ and the "effort" is the applied steering torque $T_s$) obtained from the values for d, A, u, TT, $R_p$, $F_r/V_i$ (including the value 667 noted directly above) and $K_c$ listed above. For brevity, only half of the entire field for the curves is shown in FIG. 21, associated with turns in one direction; for turns in the opposite direction, the curves shown in the first quadrant would be again formed as real images in the third quadrant. In dependence upon steering wheel applied torque values and obtained via compensated voltage $V_c$, the family of curves depicted in FIG. 21 is obtained by first suppressing $K_{qs}$ to a nominal zero value associated with on-center steering as called for before. In FIG. 21, the zero value is maintained to a $T_s$ value of about 15 in.-lb., as indicated by reference numeral 620a/b. A linear zone comprising static pressure-effort curve segment 622a/b is then plotted beginning at 15 in.-lb. This corresponds to the teachings presented above wherein the slope of curve 622a/b is $F_a/T_s$ given by the equation:

$$\frac{F_a}{T_s} = \frac{TT\,K_q N}{(1+u)R_{p2}}$$

where N is ratio of the speed reduction means 712, $R_{p2}$ is the radius of the supplemental pinion, and in this case $K_q$ has a particular desired value corresponding to a particular vehicle speed as derived from the above equations, including the 667 value. Alternately, the desired instant value for $K_q$ could be zero for on center conditions, and/or corresponding to an instant position along a smooth blend from zero to that value required for the final desired slope of the curve 622a/b, as a function of $V_{TT}$ values leading up to a 0.375 Volt value (i.e., 15×0.025), as mentioned above.

Figure 22:
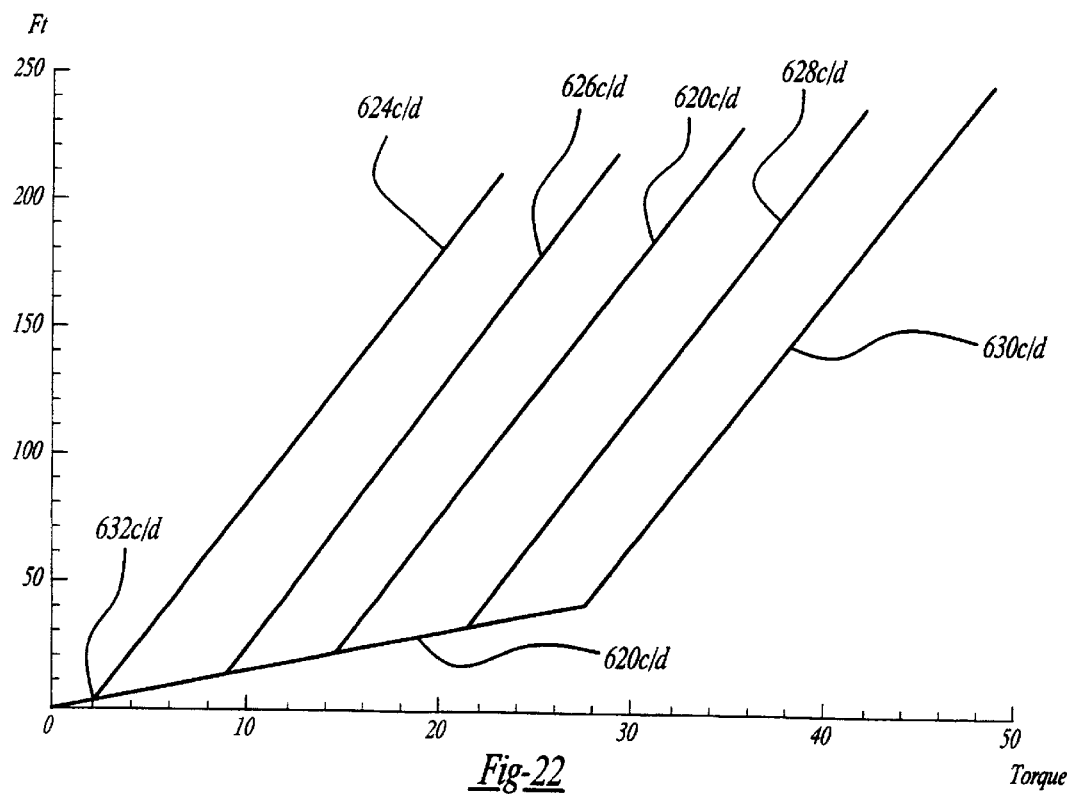
FIG. 22 is a graphic representation of the overall system gain of either of the second or the third alternate preferred embodiments of the present invention, such overall gain in part comprising dependence of a tachometer feedback damping factor employed in the second and third preferred embodiments of the present invention.

FIG. 22, on the other hand, depicts a similar family of total steering force-effort curves appropriate for systems 810 and 910 (where the total steering force is $F_r$, and the "effort" is the applied steering torque $T_s$) obtained from the values for d, A, u, TT, $R_p$, $F_r/V_i$ (including the value 794 instead of the value 667) and $K_c$ listed above. Again, only half of the entire field for the curves is shown in FIG. 22. And, the family of curves depicted in FIG. 22 is obtained by first suppressing $K_{qs}$ to a value of $((u+2)\,d)/(A\,TT\,R_p)$, or utilizing a static value for the ratio $F_r/V_i$ of $1/(TT\,R_p)$ as called for above for "pure manual steering". In FIG. 22, that value is maintained to a $T_s$ value of about 15 in.-lb., as indicated by reference numeral 620ac/d. A linear zone comprising static pressure-effort curve segment 622c/d is then plotted beginning at 15 in.-lb. This corresponds to the teachings presented above wherein the slope of curve 622c/d is $F_r/T_s$ given by the equation:

$$\frac{F_a}{T_s} = \frac{A}{(1+u)d}\left(TT\,K_q A - \frac{d}{AR_p}\right)$$

where in this case $K_q$ has a particular desired value corresponding to a particular vehicle speed as derived from the above equations including the 794 value. Alternately, the desired instant value for $K_q$ could be $((u+2)\,d)/(A\,TT\,R_p)$ for on center conditions, and/or corresponding to an instant position along a smooth blend from zero to that value required for the final desired slope of the curve 622c/d, as a function of $V_{TT}$ values leading up to a 0.375 Volt value (i.e., 15×0.025), as mentioned above.

In either case, concomitant with the subtraction of the tachometer signal $V_t$ from the compensated steering torque signal $V_c$, more "effort" $T_s$ is required to generate the same value of steering assist force $F_h$. Instant values of the rotational speed $\theta_m$ s of the electric motor 26 are related to the rotational speed $\theta_s$ s of the steering wheel 12 by the equation:

$$\frac{\theta_m s}{\theta_s s} = \frac{AR_p}{d}$$

And, the tachometer signal $V_t$ is determined by the equation:

$$V_t = \frac{AR_p \theta_s s}{dK_c}$$

Subtracting $V_t$ from the compensated signal $V_c$, in order to form input signal $V_i$, yields the family of curves for systems 710 and 760 shown in FIG. 22, wherein curves 624a/b, 626a/b, 628a/b and 630a/b depict the values of $F_a$ for steering wheel rotational velocities $\theta_s$ s of −800°/sec., −400°/sec., +400°/sec. and +800°/sec., respectively. (The polarity associated with the subtraction is, of course, dependent upon the direction of rotation of the motor 26.) It should be apparent that the curve 622a/b and the curves 624a/b–630a/b reflect the suppression of the internal control loop gain value ICG to zero when the steering wheel 12 is in an on-center position. At such an on-center position, for example, when the input signal $V_i$ (which equals $V_c$−$V_t$) is below a threshold value associated with a statically applied steering torque $T_s$ of less than about 15 in.-lb., the ratio $F_a/V_i$ is suppressed to zero as mentioned above, resulting in a zero value for $F_a$. When the input signal $V_i$ is above that threshold value, the curve 622a/b as well as the curves 624a/b–630a/b are linear in the fashion shown. (The curves 624a/b and 626a/b remain linear for values of $T_s$ less than 15 in.-lb. because the input signal $V_i$ still has a value above the threshold value.) Of course, the curves 622a/b–630a/b could be shaped in any manner desired, thereby altering the handling characteristics of the host vehicle. In fact, the curves 622a/b–630a/b are somewhat simplistic because in general, as is suggested above, $K_q$ is customized for values of T approaching 15 in.-lb. (or $V_{TT}$ approaching 0.375 Volts) in order to smoothly blend the on center condition into the linear zone static pressure-effort curve 622a/b.

Similarly, subtracting $V_t$ from the compensated signal $V_c$, in order to form input signal $V_i$, yields the family of curves for systems 810 and 910 shown in FIG. 22, wherein curves 624c/d, 626c/d, 628c/d and 630c/d depict the values of $F_r$ for steering wheel rotational velocities $\theta_s$ s of −800°/sec., −400°/sec., +400°/sec. and +800°/sec., respectively. It should be apparent that the curve 622c/d and the curves 624c/d–630c/d reflect the suppression of the internal control loop gain value ICG to a value compatible with $K_{qs}$ equal to $((u+2)\,d)/(A\,TT\,R_p)$ when the steering wheel 12 is in an on-center position. At such an on-center position, for example, when the input signal $V_i$ (which equals $V_c$−$V_t$) is below a threshold value associated with a statically applied steering torque $T_s$ of less than about 15 in.-lb., and the ratio $F_r/V_i$ is suppressed to the value $1/(TT\,R_p)$ as mentioned above, resulting in a mechanical steering like values for $F_r$. When the input signal $V_i$ is above that threshold value, the curve 622c/d as well as the curves 624c/d–630c/d are linear in the fashion shown. (Again, the curves 624c/d and 626c/d remain linear for values of $T_s$ less than 15 in.-lb. because the input signal $V_i$ still has a value above the threshold value.) And of course, the curves 622c/d–630c/d could be shaped in any manner desired, thereby altering the handling characteristics of the host vehicle.

Knowledge of the families of curves 624a/b–630a/b and 624c/d–630c/d which result from non-infinite values for $K_c$ is important because the changes in torque between the curves 624a/b–630a/b and 624c/d–630c/d for the same values of force $F_a$ or $F_r$ represent values of steering damping actually felt by the vehicle driver. This is equivalent to having a meaningful value for $B_s$ during macro steering maneuvers, in contrast to the incipient value listed above which is pertinent only for damping in the steering yoke assembly for very small steering motions. For instance, at a vehicle speed of 100 mph, the tachometer feedback damping constant $K_c$ of 1,000 rad./volt-sec. listed above results in damping equivalent to having a value of 0.92 in.-lb.-sec./rad. for $B_s$.

Of course, $K_c$ may be programmed with its value changing as a function of vehicle speed, and/or as a function of the applied steering torque $T_s$ in order to significantly increase on-center damping. Alternatively, values of $K_c$ used for negative steering wheel rotational speeds may be defined as selected functions of torque in order to avoid crossing over into the second and fourth quadrants, or even to avoid approaching the second and fourth quadrants as indicated by reference numerals 632a/b and 632c/d, thereby avoiding the need to apply negative steering wheel torque in order to achieve fall steering wheel recovery at the higher rotational speeds. This can be especially appropriate for customized $K_q$ curves utilized for blending the on center region into the linear zone as described above.

Thus, the power steering systems 710, 760, 810 and 910 of the present invention differ from the system disclosed in the Shimizu et al. '539 patent in a variety of ways, and possesses distinct advantages over that system. The control means 32a, 32b, 32c and 32d of the systems 710, 760, 810 and 910 never generate a target value of any system quantity (such as torque or force, or pressure either for that matter) and never generate an error signal based on the difference between actual and target values of that quantity. Instead, as described above, the systems 710, 760, 810 and 910 of the present invention generate an error signal $V_e$ (equal to $V_i$ minus $V_f$) in a way that is different from the way in which the error signal is generated in the Shimizu et al. '539 patent (based on the direct feedback of actual torque or force, rather than on generating a difference between target and actual assistive torque), and control the electric motor 26 in a different way (according to the desired gain, for example, and not according to a torque or force-difference error signal) to give a different result (most likely improved stability).

Figure 17:
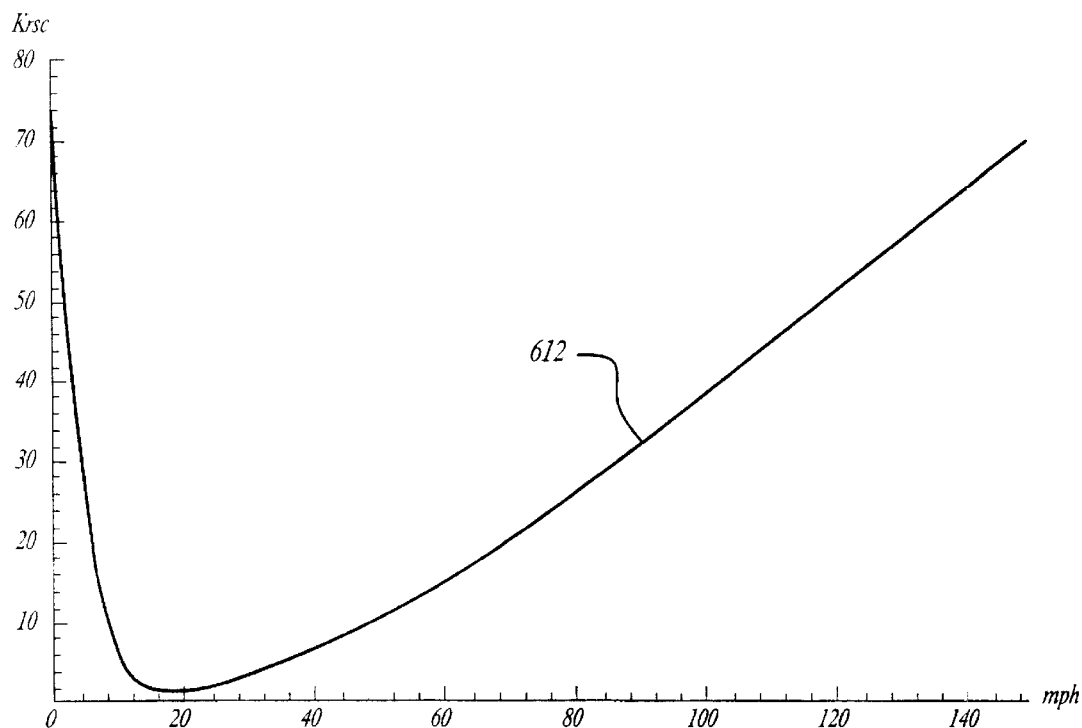
FIG. 17 is a graphic representation of a pertinent parameter of an exemplary host vehicle incorporating any of the preferred embodiments of the present invention.

Indeed, it appears that the Shimizu et al. '539 patent may be incorrect in utilizing a dynamic model which expressly ignores the rigidity of the tires and considers the torsion bar spring constant to be the dominant compliant element of the system. FIG. 17 herein clearly shows the dominant influence of upon any of the systems 710, 760, 810 and 910. Moreover, FIGS. 18A–19B herein clearly show that the steering wheel related resonance can be controlled on solely a mechanical basis (via damping associated with the coefficient $B_s$), and that the motor related resonance can be controlled solely on a servo control basis. It therefore appears clear that the two resonances can each be adequately controlled in completely different ways, strongly suggesting that they are not related as implied in FIG. 11 of the Shimizu et al. '539 patent, but instead arise from independent mechanical and electromechanical or electro-hydro-mechanical causes, respectively, as identified herein.

Again, the power steering systems 710, 760, 810 and 910 of the present invention possess numerous advantages over prior EPS systems. The system 710, 760, 810 and 910 provide full time independent verification of the instant values of steering boost, substantially eliminating concerns relating to auto-steer. The systems 710, 760, 810 and 910 also substantially eliminate low frequency stability control problems previously encountered in EPS systems. And for the first time, the system 910 provides "frictionless" steering. Further, other than the similar electro-hydro-mechanical system 10 utilized in the incorporated '311 application, in system 910 the reversible fluid pump, fluid lines and associated valves provide a completely new arrangement for coupling the drive motor of an EPS system to the balance of the system, such that concerns about mechanical over constraint, Coulomb friction, wear and backlash are eliminated. Advantageously, an absolutely optimum tactile relationship between the vehicle, the vehicle driver and the steering system is established by the linear relationship of the steering force output from the system 910 to the applied steering torque. All of the systems 710, 760, 810 and 910 possess high efficiency and recover a significant portion of the energy returned from the dirigible wheels when the host vehicle exits a turn. The systems naturally move between their powered assist and energy regeneration modes in order to permit good steering control during both modes, and during changing between those modes. Such varying between modes is carried out with excellent smoothness. Finally, the systems 710, 760, 810 and 910 of the present invention allow safe operation of the vehicle during failure of powered assist provided by the systems because of the presence of adequate control and steering assist signal redundancy.

Having described the invention, however, many modifications thereto will become immediately apparent to those skilled in the art to which it pertains, without deviation from the spirit of the invention. Such modifications fall within the scope of the invention.

Industrial Applicability

The instant systems are capable of regenerating and recovering a substantial amount of the energy developed in vehicle power steering systems, and accordingly find industrial application in motor vehicles and other devices having a powered assist generated as a function of applied torque.

What is claimed is:

1. A power steering system (710) for a vehicle having dirigible wheels (13), comprising:

speed reduction means (712) having an input node (714) and an output node (716), the output node (716) being adapted to supply a powered assist to steering the dirigible wheels (13) of the vehicle upon the application of torque to the input node (714);

a primary applied steering torque sensor (14) which generates an applied torque signal ($V_{TT1}$) in response to at least an applied steering torque ($T_S$);

an electric motor (26) operatively connected to the input node (714) and capable of reversibly driving the speed reduction means (712); and an electronic control means (32a) comprising torque calculation means responsive to input voltage and current input to the electric motor (26) which generates an assist torque signal ($V_{TT2}$) in response to assist torque ($T_a$) delivered via the output node (716), and to which the primary applied torque sensor (14) is operatively connected, and which controls actuation of the electric motor (26);

wherein the electronic control means (32a) establishes servo control (322a) over the powered assist to steering supplied by the speed reduction means (712) in dependence upon the assist torque signal ($V_{TT2}$) generated by the torque calculation means.

2. A power steering system (760) for a vehicle having dirigible wheels (13), comprising:
- speed reduction means (712) having an input node (714) and an output node (716), the output node (716) being adapted to supply a powered assist to steering the dirigible wheels (13) of the vehicle upon the application of torque to the input node (714);
- a primary applied steering torque sensor (14) which generates an applied torque signal ($V_{TT1}$) in response to at least an applied steering torque ($T_s$);
- a primary assist torque sensor (762) which generates an assist torque signal ($V_{TT2}'$) in response to assist torque ($T_a$) delivered via the output node (716);
- an electric motor (26) operatively connected to the input node (714) and capable of reversibly driving the speed reduction means (712); and
- an electronic control means (32b) to which the primary assist torque sensor (762) and the primary applied steering torque sensor (14) are operatively connected, and which controls actuation of the electric motor (26);
  - wherein the electronic control means (32b) establishes servo control (322b) over the powered assist to steering supplied by the speed reduction means (712) in dependence upon the assist torque signal ($V_{TT2}'$) generated by the primary assist torque sensor (762).

3. A power steering system (810) for a vehicle having dirigible wheels (13), comprising:
- torque summing means (812) having an applied torque input node (816), an electric motor input node (818) and an output node (820), the output node (820) being adapted to supply an assisted output toque for steering the dirigible wheels (13) of the vehicle upon the application of torque to the applied torque input node (816);
- a primary applied steering torque sensor (14) which generates an applied torque signal ($V_{TT1}$) in response to at least an applied steering torque ($T_s$);
- a primary assisted output torque sensor (832) which generates an assisted output torque signal ($V_{TT6}$) in response to assisted output torque ($T_{ao}$) delivered from the output node (820);
- an electric motor (26) operatively connected to the electric motor input node (818) and capable of reversibly driving the torque summing means (812); and
- an electronic control means (32c) to which the primary assisted output torque sensor (832) and the primary applied steering torque sensor (14) are operatively connected, and which controls actuation of the electric motor (26);
  - wherein the electronic control means (32c) establishes servo control (322c) over the assisted output torque supplied by the torque summing means (812) in dependence upon the assisted output torque signal ($V_{TT6}$) generated by the primary assisted output torque sensor (832).

4. A power steering system (910) for a vehicle having dirigible wheels (13), comprising:
- steering force generating means (912) having an applied torque input node (816), an electric motor input node (818) and a steering force output node (920), the steering force output node (920) being adapted to supply an assisted steering force for steering the dirigible wheels (13) of the vehicle upon the application of torque to the applied torque input node (816);
- a primary applied steering torque sensor (14) which generates an applied torque signal ($V_{TT1}$) in response to at least an applied steering torque ($T_s$);
- a primary steering force sensor (914) which generates a steering force signal ($V_{FT1}$) in response to steering force ($F_r$) delivered via the steering force output node (920);
- an electric motor (26) operatively connected to the electric motor input node (818) and capable of reversibly driving the steering force generating means (912); and
- an electronic control means (32d) to which the primary steering force sensor (914) and the primary applied steering torque sensor (14) are operatively connected, and which controls actuation of the electric motor (26);
  - wherein the electronic control means (32d) establishes servo control (322d) over the steering force supplied by the steering force generating means (912) in dependence upon the steering force signal ($V_{FT1}$) generated by the primary steering force sensor (914).

* * * * *